US012628058B2

(12) United States Patent (10) Patent No.: US 12,628,058 B2
Lu (45) Date of Patent: May 12, 2026

(54) GROUP MIGRATING METHOD AND APPARATUS AND SYSTEM

(71) Applicant: 1FINITY Inc., Kawasaki (JP)

(72) Inventor: Yang Lu, Beijing (CN)

(73) Assignee: 1FINITY Inc., Kawasaki (JP)

( * ) Notice: Subject to any disclaimer, the term of this patent is extended or adjusted under 35 U.S.C. 154(b) by 385 days.

(21) Appl. No.: 18/215,216

(22) Filed: Jun. 28, 2023

(65) Prior Publication Data

US 2023/0345326 A1 Oct. 26, 2023

Related U.S. Application Data

(63) Continuation of application No. PCT/CN2021/071957, filed on Jan. 14, 2021.

(51) Int. Cl.
*H04W 36/08* (2009.01)
*H04W 36/30* (2009.01)
(52) U.S. Cl.
CPC ......... *H04W 36/08* (2013.01); *H04W 36/305* (2018.08)
(58) Field of Classification Search
None
See application file for complete search history.

(56) References Cited

U.S. PATENT DOCUMENTS

2020/0053629 A1 2/2020 Majmundar et al.
2020/0351854 A1 11/2020 Wang et al.

2021/0092667 A1 3/2021 Zhu et al.
2021/0368409 A1 11/2021 Liu et al.
2022/0322464 A1 10/2022 Luo et al.
(Continued)

FOREIGN PATENT DOCUMENTS

CN 110475267 A 11/2019
CN 111093286 A 5/2020
(Continued)

OTHER PUBLICATIONS

International Search Report and Written Opinion of the International Searching Authority issued by the China National Intellectual Property Administration for corresponding International Patent Application No. PCT/CN2021/071957, mailed on Oct. 14, 2021, with an English translation.

(Continued)

*Primary Examiner* — Kodzovi Acolatse
(74) *Attorney, Agent, or Firm* — Myers Wolin, LLC

(57) ABSTRACT

A group migrating apparatus, configured in a second donor device, wherein the apparatus includes processor circuitry configured to, when a migrating IAB-node moves from a first donor device to the second donor device, perform at least one of the following processing enabling the migrating IAB-node to update a first TNL address used for a first F1-C connection to a second TNL address, enabling the migrating IAB-node to update a third TNL address used for a second F1-C connection to a fourth TNL address, configuring the migrating IAB-node with a fourth TNL address used for setting up a second F1-C connection, adding for the migrating IAB-node a second TNL address used for a first F1-C connection, configuring the migrating IAB-node with a third TNL address used for setting up a second F1-C connection, and adding for the migrating IAB-node a fourth TNL address used for a second F1-C connection.

16 Claims, 15 Drawing Sheets

(56)          References Cited

U.S. PATENT DOCUMENTS

| | | | | |
|---|---|---|---|---|
| 2023/0239754 A1* | 7/2023 | Barac | ................ | H04W 36/0088 |
| | | | | 370/331 |
| 2023/0239755 A1* | 7/2023 | Teyeb | ................... | H04W 40/24 |
| | | | | 370/331 |
| 2023/0247495 A1* | 8/2023 | Teyeb | ................... | H04W 40/24 |
| | | | | 370/331 |
| 2023/0269630 A1* | 8/2023 | Teyeb | ............... | H04W 36/0016 |
| | | | | 370/331 |
| 2024/0224133 A1* | 7/2024 | Wang | ................. | H04W 36/305 |

FOREIGN PATENT DOCUMENTS

| | | |
|---|---|---|
| CN | 111586744 A | 8/2020 |
| CN | 111866988 A | 10/2020 |

OTHER PUBLICATIONS

ZTE et al., "Discussion on inter-Donor IAB Node Migration procedure", Agenda Item: 13.2.1, 3GPP TSG-RAN WG3 Meeting #110-e, R3-206559, Online, Nov. 2-12, 2020.
First Notification of Office Action and Search Report issued by the China National Intellectual Property Administration for corresponding Chinese Patent Application No. 202180085102.6, mailed on Jan. 20, 2026, with an English translation.

\* cited by examiner

Fiber transport

FIG. 8

/—801 when the migrating IAB-node moves from the first donor device to the second donor device, the second donor device performs at least one of the following processing:

enabling the migrating IAB-node to update a first TNL address used for a first F1-C connection to a second TNL address;

enabling the migrating IAB-node to update a third TNL address used for a second F1-C connection to a fourth TNL address;

configuring the migrating IAB-node with a fourth TNL address used for setting up a second F1-C connection;

adding for the migrating IAB-node a second TNL address used for a first F1-C connection;

configuring the migrating IAB-node with a third TNL address used for setting up a second F1-C connection; and adding for the migrating IAB-node a fourth TNL address used for a second F1-C connection.

FIG. 9

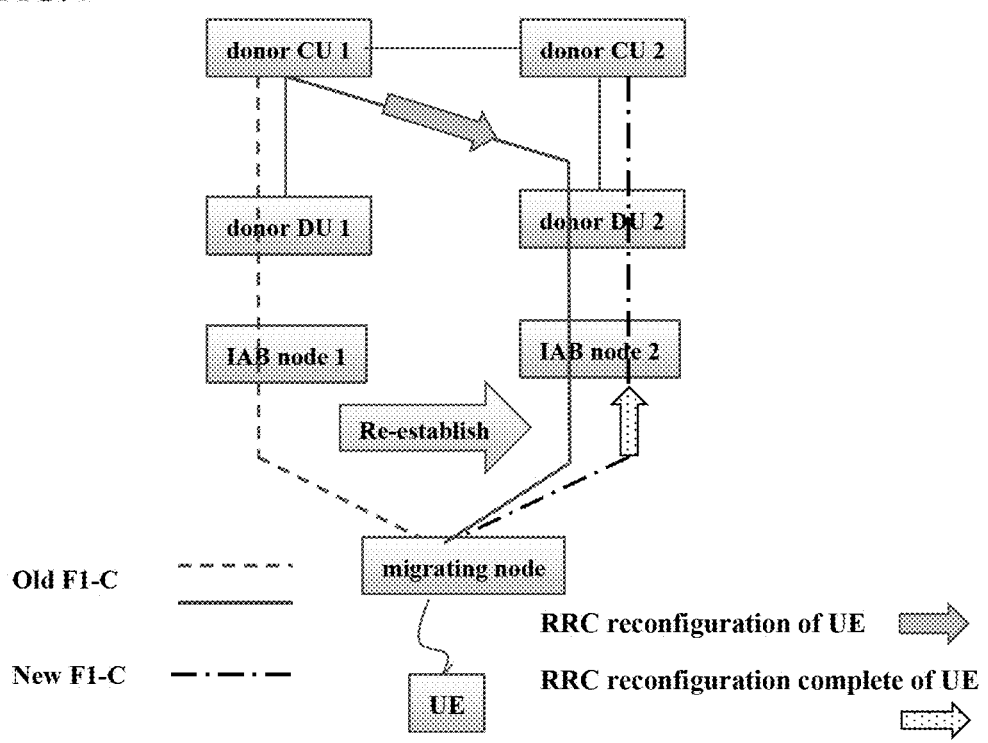

donor CU 1      donor CU 2 donor DU 1      donor DU 2

IAB node 1      IAB node 2

Re-establish migrating node

Old F1-C

New F1-C

UE

RRC reconfiguration of UE

RRC reconfiguration complete of UE

GROUP MIGRATING METHOD AND APPARATUS AND SYSTEM

CROSS-REFERENCE TO RELATED APPLICATION

This application is a continuation application of International Application PCT/CN2021/071957 filed on Jan. 14, 2021, and designated the U.S., the entire contents of which are incorporated herein by reference.

FIELD

This disclosure relates to the field of communications.

BACKGROUND

Seamless cellular network deployment in the future needs very flexible and ultra-dense NR cell deployment. An ultra-dense network is one of goals of 5G, and deployment of an NR network with no wired backhaul is very important for the realization of 5G ultra-dense network. As coverage of a cell is reduced by a 5G millimeter wave, it is further needed that a wireless self-backhauling system is of multi-hop to meet deployment requirements. High bandwidth, large-scale MIMO and beam system of 5G make it easier for 5G to develop the wireless self-backhauling system of ultra-dense NR cells than LTE. In order to develop such multi-hop system with wireless self-backhauling, 3GPP began research and standardization of an IAB (integrated access and backhaul) project in R16.

FIG. 1 is a schematic diagram of an IAB system. As shown in FIG. 1, in the IAB system, a relay node supports both access and backhaul functions. A wireless transmission link of the relay node multiplexes an access link and backhaul link in the time domain, frequency domain or spatial domain. The access link and backhaul link may use identical or different frequency bands.

In an IAB network architecture, the relay node refers to an IAB-node, which supports both access and backhaul functions. A last hop of access node at the network side is referred to as an IAB-donor, which supports function of a gNB and supports IAB-node access. All UE data may be backhauled to the IAB-node in one or more hops via the IAB-node.

Functions of the IAB-node are divided into two parts, one is a gNB-DU function, referred to as an IAB-DU, and the other is a UE function, referred to as an IAB-MT. The IAB-DU realizes function of a network side device, is connected to a downstream child IAB-node, provides NR air access to the UE and the downstream child IAB-node, and sets up F1 connection with the IAB donor-CU. The IAB-MT realizes some functions of a terminal equipment and is connected to an uplink parent IAB-node or IAB-donor DU. The IAB-MT includes physical layer, layer 2, RRC (Radio Resource Control) and NAS (Non-Access Stratum) layer functions, and is further indirectly connected to the IAB donor-CU and a core network.

In IAB system, the IAB-node may access to the network in a standalone (SA) mode or a non-standalone (E-UTRA-NRDualConnectivity, EN-DC) mode. FIG. 2 is a schematic diagram of an IAB architecture of the SA mode. FIG. 3 is a schematic diagram of an IAB architecture of the EN-DC mode.

FIG. 4 is a schematic diagram of an IAB-node, a parent IAB-node and a child IAB-node. As shown in FIG. 4, as a network side, an IAB-DU of the IAB-node is connected to IAB-MT to the child IAB-node, and as a terminal side, an IAB-MT of the IAB-node is connected to the IAB-DU of the parent IAB-node.

FIG. 5 is a schematic diagram of an F1 user plane (F1-U) protocol stack between the IAB-DU and IAB-donor CU. FIG. 6 is a schematic diagram of an F1 control plane (F1-C) protocol stack between the IAB-DU and IAB-donor CU.

As shown in FIG. 5 and FIG. 6, the F1-U and F1-C are built above a transmission (IP) layer between the IAB-DU and IAB-donor-CU. Two hops of wireless backhaul and one hop of wired backhaul are performed in FIG. 5 and FIG. 6. On the backhaul link, the transmission (IP) layer is carried on a backhaul adaptive protocol (BAP) sublayer. A BAP entity in the IAB-node realizes a routing function of the IAB system, and the IAB-donor CU provides a routing table. BAP PDUs (protocol data units) are transmitted in an RLC (radio link control) channel of the backhaul link, multiple RLC channels of the backhaul link may be configured by the IAB-donor to carry services of different priorities and QoS (Quality of Service), and the BAP entity maps the BAP PDUs to different backhaul RLC channels.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that an R16 IAB system has supported adaptive changes in topology and routing caused by movement of the IAB-node between different DUs under the same donor. When the IAB-node moves under the same donor (in such a case, the IAB-node is referred to as a migrating IAB-node), a topology relation with a downstream child IAB-node and UE is still maintained. Although the IAB-node may possibly be allocated a TNL (transmission network layer) address that can lead to a DU of a new donor, i.e. an IP address, for accessing to a CU of the new donor via the DU of the new donor, a child node or UE served by the migrating IAB-node needs not to be migrated, hence, the migrating node does not need to setup new F1-C connection with the donor. As shown in FIG. 7, after the migrating IAB-node moves from IAB-node 1 to IAB-node 2, only transmission paths of F1-C traffic are updated or added, and this process is referred to as F1 reorientation.

It was further found by the inventors that R17 may introduce a moving function of an IAB-node between different donors, in which case as the IAB-node becomes a DU under a new donor to serve for its child IAB-node or UE after being connected to the new donor, F1-C connection with the new donor needs to be setup and the child IAB-node or UE under the IAB-node needs to be migrated to the new donor, so as to realize payload balance between donor devices. In such a case, the migrating IAB-node needs to learn whether migration between the donors is performed or whether new F1-C connection is setup; however, whether the migrating IAB-node performs migration between the donors or whether new F1-C connection needs to be setup is unable to be indicated in existing techniques. On the other hand, when the migrating IAB-node moves between different donors, it may maintain F1-C connection with both the original donor and new donor, and both new and old F1 connections need to be reoriented to optimize forwarding paths of F1 connection; however, in the existing technique, the IAB-node is unable to distinguish reorientation of the old F1-C connection or the new F1-C connection.

In order to solve at least one of the above problems or other similar problems, embodiments of this disclosure provide a group migrating method and apparatus and a system.

According to an aspect of the embodiments of this disclosure, there is provided a group migrating apparatus, configured in a second donor device, wherein the apparatus comprises:

a processing unit configured to, when a migrating IAB-node moves from a first donor device to the second donor device, perform at least one of the following processing:

enabling the migrating IAB-node to update a first TNL address used for a first F1-C connection to a second TNL address;

enabling the migrating IAB-node to update a third TNL address used for a second F1-C connection to a fourth TNL address;

configuring the migrating IAB-node with a fourth TNL address used for setting up a second F1-C connection;

adding for the migrating IAB-node a second TNL address used for a first F1-C connection;

configuring the migrating IAB-node with a third TNL address used for setting up a second F1-C connection; and adding for the migrating IAB-node a fourth TNL address used for a second F1-C connection;

wherein the first F1-C connection is F1 connection between a DU of the migrating IAB-node and a CU of the first donor device, the second F1-C connection is F1 connection between the DU of the migrating IAB-node and a CU of the second donor device, the first TNL address and the third TNL address are TNL addresses routable to the DU of the first donor device, and the second TNL address and the fourth TNL address are TNL addresses routable to the DU of the second donor device.

According to an aspect of the embodiments of this disclosure, there is provided a group migrating apparatus, configured in a migrating IAB-node, the migrating IAB-node moving from a first donor device to a second donor device, wherein the apparatus comprises:

a receiving unit configured to receive, via the first donor device, a first RRC reconfiguration message transmitted by the second donor device, the first RRC reconfiguration message including at least one of the following:

a second TNL address used for a first F1-C connection, so as to update a first TNL address used for the first F1-C connection to the second TNL address, or to add the second TNL address for the first F1-C connection;

a fourth TNL address used for a second F1-C connection, so as to update a third TNL address used for the second F1-C connection to the fourth TNL address, or to setup the second F1-C connection to a CU of the second donor device by using the fourth TNL address, or to add the fourth TNL address for the second F1-C connection; and a third TNL address used for the second F1-C connection, so as to add the third TNL address for the second F1-C connection, or to setup the second F1-C connection to the CU of the second donor device by using the third TNL address;

wherein the first F1-C connection is F1 connection between a DU of the migrating IAB-node and a CU of the first donor device, the second F1-C connection is F1 connection between the DU of the migrating IAB-node and the CU of the second donor device, the first TNL address and the third TNL address are TNL addresses routable to the DU of the first donor device, and the second TNL address and the fourth TNL address are TNL addresses routable to the DU of the second donor device.

According to an aspect of the embodiments of this disclosure, there is provided a group migrating apparatus, configured in a first donor device, a migrating IAB-node moving from the first donor device to a second donor device, wherein the apparatus comprises:

a receiving unit configured to receive a second TNL address used for a first F1-C connection of the migrating IAB-node transmitted by the second donor device; and a processing unit configured to update a first TNL address used for a first F1-C connection of the migrating IAB-node to the second TNL address, or add the second TNL address for a first F1-C connection of the migrating IAB-node;

wherein the first F1-C connection is F1 connection between a DU of the migrating IAB-node and a CU of the first donor device, the first TNL address is a TNL address routable to the DU of the first donor device, and the second TNL address is a TNL address routable to the DU of the second donor device.

An advantage of the embodiments of this disclosure exists in that, when the migrating IAB-node moves from the original donor to the target donor, the target donor may indicate whether the migrating IAB-node performs inter-donor migration or whether new F1-C connection is setup, so that the migrating IAB-node may setup new F1-C connection with the target donor during the inter-donor migration, and become a DU under a new donor to serve for its child IAB-node or UE. This achieves migration of the child IAB-node or UE under the migrating IAB-node to the target donor, thereby achieving payload balance between donor devices. On the other hand, when the migrating IAB-node moves from the original donor to the target donor and maintains F1-C connection with both the original donor and the target donor, the target donor may reorient both the original F1 connection and the new F1 connection, and indicate the reorientation of the original F1-C connection or the new F1-C connection to the migrating IAB-node, thereby optimizing forwarding paths of the original F1-C connection and the new F1-C connection.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 8 is a schematic diagram of the group migrating method of an embodiment of this disclosure;

FIG. 9 is a schematic diagram of a scenario of the group migrating method of the embodiment of this disclosure;

DETAILED DESCRIPTION

Figure 1:
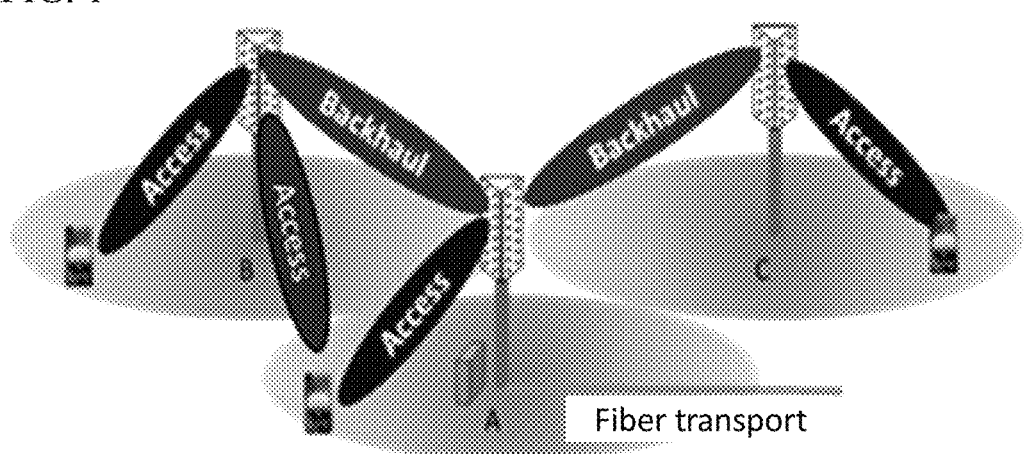
FIG. 1 is schematic diagram of an IAB system.
Figure 2:
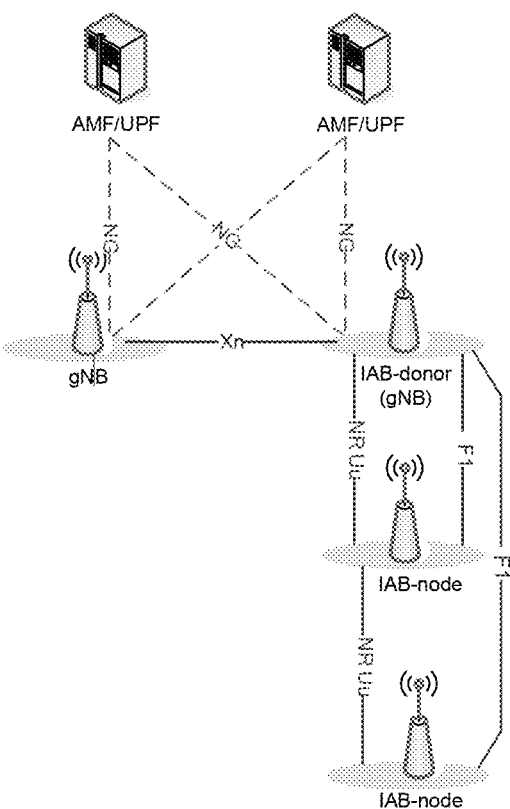
FIG. 2 is a schematic diagram of an IAB architecture in an SA mode.
Figures 3, 4:
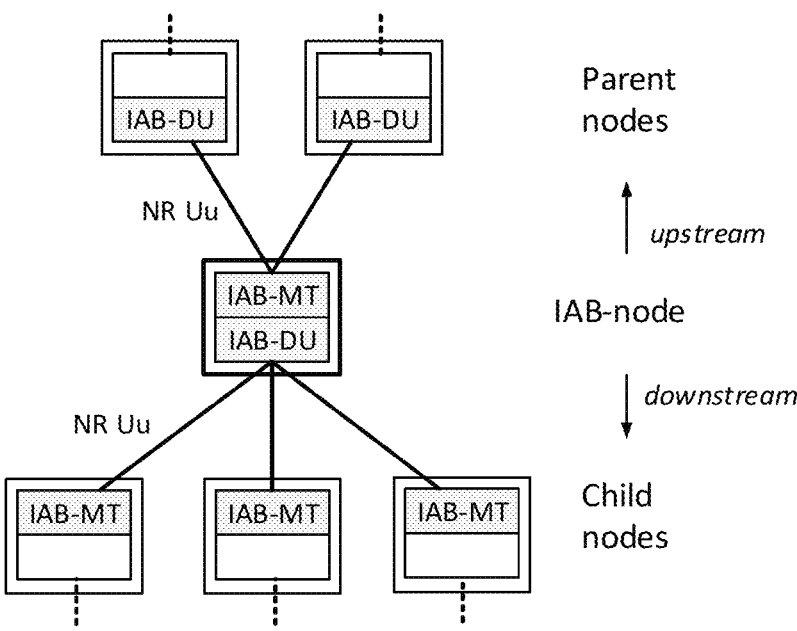
FIG. 3 is a schematic diagram of an IAB architecture in an EN-DC mode.
FIG. 4 is a schematic diagram of a parent IAB-node and a child IAB-node.
Figure 5:
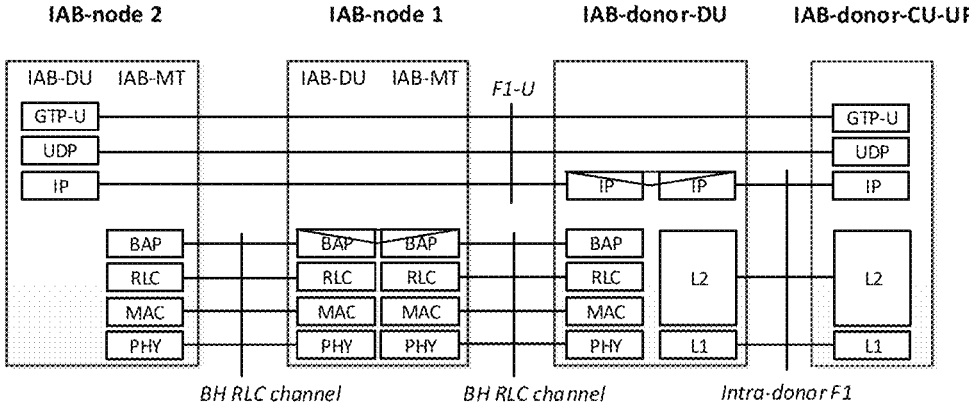
FIG. 5 is a schematic diagram of an F1-U protocol stack of the IAB system.
Figure 6:
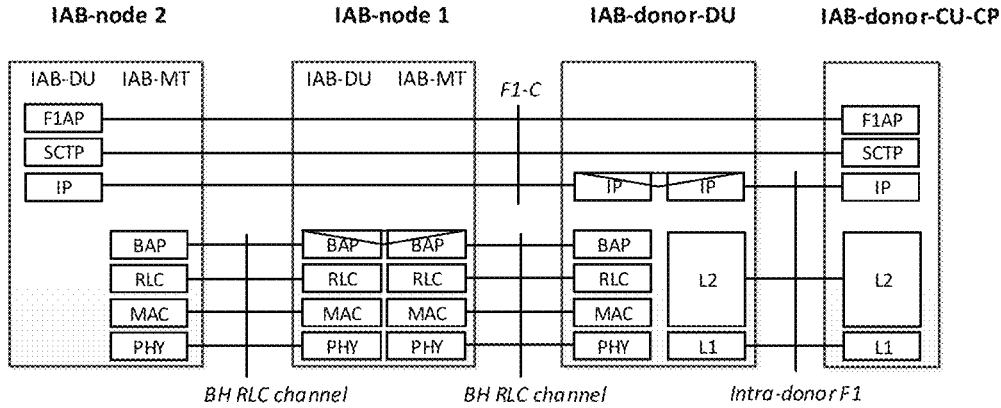
FIG. 6 is a schematic diagram of an F1-C protocol stack of the IAB system.
Figure 7:
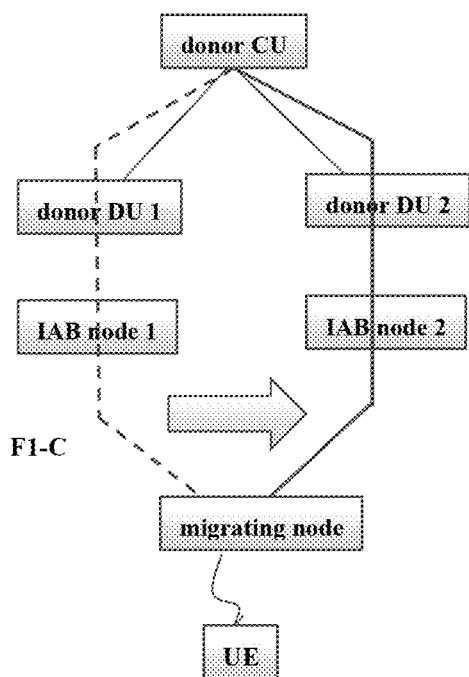
FIG. 7 is a schematic diagram of movement of an IAB node between different DUs under the same donor.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and 6G in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Embodiments of this disclosure shall be described below with reference to the accompanying drawings. These embodiments are illustrative only, and are not intended to limit this disclosure.

Embodiment of a First Aspect

The embodiment of this disclosure provides a group migrating method.

FIG. 8 is a schematic diagram of the group migrating method of the embodiment of this disclosure, which shall be described from a side of a second donor device; wherein a migrating IAB-node moves from a first donor device to the second donor device, and from the perspective of moving direction of the migrating IAB-node, the first donor device in the embodiment of this disclosure is an original donor device, referred to as a first donor or original donor, and the second donor device is a target donor device, referred to as a second donor or target donor. As shown in FIG. 8, the method includes:

801: when the migrating IAB-node moves from the first donor device to the second donor device, the second donor device performs at least one of the following processing:

enabling the migrating IAB-node to update a first TNL address used for a first F1-C connection to a second TNL address;

enabling the migrating IAB-node to update a third TNL address used for a second F1-C connection to a fourth TNL address;

configuring the migrating IAB-node with a fourth TNL address used for setting up a second F1-C connection;

adding for the migrating IAB-node a second TNL address used for a first F1-C connection;

configuring the migrating IAB-node with a third TNL address used for setting up a second F1-C connection; and adding for the migrating IAB-node a fourth TNL address used for a second F1-C connection.

In the embodiment of this disclosure, that the migrating IAB-node moves from the first donor device to the second donor device refers to that the migrating IAB-node is connection reestablished to the second donor device when a radio link failure occurs in a backhaul link of the migrating IAB-node under the first donor device; or, that the migrating IAB-node is handed over from the first donor device to the second donor device; or, that the migrating IAB-node maintains connection with the first donor device and adds an air interface connection with the second donor device.

The above cases shall be described below respectively.

In the above and following descriptions, the first F1-C connection (referred to as first F1-C or original F1-C) is F1 connection between a DU of the migrating IAB-node and a CU of the first donor device, and the second F1-C connection (referred to as second F1-C or new F1-C) is F1 connection between the DU of the migrating IAB-node and a CU of the second donor device. In addition, in the above and following descriptions, the first TNL address, third TNL address and fifth TNL address are TNL addresses able to be routed to the DU of the first donor device, and the second TNL address, fourth TNL address and sixth TNL address are TNL addresses able to be routed to the DU of the second donor device.

In the above embodiment, when the migrating IAB-node moves from the first donor to the second donor, the second donor configures the migrating IAB-node with a TNL address used for the second F1-C to indicate the migrating IAB-node to setup new F1-C connection, so that the migrating IAB-node becomes a DU under the new donor to serve for its child IAB-node or UE, thus enabling the IAB system to migrate the child IAB-node or UE under the migrating IAB-node to the target donor, thereby achieving payload balance between donor devices. On the other hand, when migrating IAB-node moves from the first donor to the second donor and maintains F1-C connections with the first donor and the second donor, the second donor reorients the F1-C connection by updating the TNL address used for the first F1-C connection or updating the TNL address used for the second F1-C connection, thereby optimizing forwarding paths of F1-C traffic and achieving more efficient signaling forwarding; and furthermore, the second donor adds forwarding paths of F1-C traffic by adding a TNL address for the first F1-C connection or the second F1-C connection, thereby achieving more flexible signaling forwarding.

In some embodiments, when a radio link failure occurs in a backhaul link under the first donor device, the migrating IAB-node is connection reestablished to the second donor device. The second donor device makes the migrating IAB-node to update a first TNL address used for a first F1-C connection to a second TNL address, and configures the migrating IAB-node with a fourth TNL address used to setup a second F1-C connection.

For example, after the migrating IAB-node is connection reestablished to the second donor device, the second donor device transmits a first RRC reconfiguration message to the migrating IAB-node.

The first RRC reconfiguration message includes the second TNL address used for the first F1-C connection, hence, the migrating IAB-node may update the first TNL address used for the first F1-C connection to the second TNL address; or, the first RRC reconfiguration message includes the second TNL address used for the first F1-C connection and the fourth TNL address used for the second F1-C connection. Therefore, the migrating IAB-node updates the first TNL address used for the first F1-C connection to the second TNL address, and sets up the second F1-C connection with the CU of the second donor device by using the fourth TNL address.

With the method of the above embodiment, by configuring the TNL address used for the first F1-C connection via the RRC messages by the second donor device, the first F1-C traffic may be forwarded via the DU of the second donor, thereby optimizing transmission paths of the first F1-C traffic. And at the same time, by configuring the TNL address used for the second F1-C connection via the RRC messages by the second donor device, the migrating IAB-node may setup the second F1-C connection immediately after connection reestablished to the second donor device, thereby achieving subsequent migration of the UE.

In the above embodiment, the first RRC reconfiguration message may further include: a BAP address allocated for the migrating IAB-node; and/or, backhaul RLC channel configuration of the migrating IAB-node, and a default BAP routing identifier and default backhaul RLC channel identifier used for F1-C traffic and non-F1 traffic; and/or, a sixth TNL address used by the migrating IAB-node to update the fifth TNL address used for its F1-U connection to the sixth TNL address, so that the F1-U traffic may be forwarded via the DU of the second donor; and/or, a BAP routing identifier and a backhaul RLC channel identifier used for the F1-U connection of the migrating IAB-node.

In the above embodiment, if the first RRC reconfiguration message does not include the fourth TNL address used for the second F1-C connection, that is, it does not indicate the migrating IAB-node to setup the second F1-C connection immediately after being connection reestablished to the second donor device. After a period of time that the second donor device transmits the first RRC reconfiguration message to the migrating IAB-node, the second donor device may further transmit a third RRC reconfiguration message to the migrating IAB-node, the third RRC reconfiguration message including a fourth TNL address used for the second F1-C connection. Hence, after receiving the third RRC reconfiguration message, the migrating IAB-node may setup the second F1-C connection with the CU of the second donor device by using the fourth TNL address.

In the above embodiment, after the second donor device sets up the second F1-C connection with the migrating IAB-node, in order to migrate the UE served by the migrating IAB-node to the second donor device, the CU of the second donor device may transmit a first message to the DU of the migrating IAB-node via the second F1-C connection by using the fourth TNL address, so that the migrating IAB-node may setup a second context for its served UE according to the first message.

As an example, the first message may include a first context identifier of the UE, so that the migrating IAB-node may obtain the first context of the UE according to the first context identifier, and setup a second context of the UE by reusing the first context, wherein, the first message may be an F1 setup response or a UE context modification request message.

As another example, the first message may further include serving cell configuration information of the UE, so that the migrating IAB-node updates serving cell configuration of the UE.

With the method of the above embodiment, it is only needed for the migrating node to obtain the first context of the UE according to the first context identifier, and setup the second context of the UE by reusing the first context, with no need of an existing UE context setup process, thereby reducing signaling overhead and latency in setting up the UE context, and improving signaling efficiency.

In the above embodiment, in migrating the UE, the second donor device may further transmit a second RRC reconfiguration message for the UE served by the migrating IAB-node to the first donor device, so that the first donor device may forward the second RRC reconfiguration message to the migrating IAB-node by using the second TNL address via the first F1-C connection. Therefore, after receiving the second RRC reconfiguration message, the migrating IAB-node may transmit the second RRC reconfiguration message to its served UE.

Furthermore, the migrating IAB-node may further receive a second RRC reconfiguration complete message transmitted by its served UE, and transmit the second RRC reconfiguration complete message to the second donor device by using the fourth TNL address via the second F1-C connection.

Therefore, the second donor device may further receive the second RRC reconfiguration complete message transmitted by the migrating IAB-node by using the fourth TNL address via the second F1-C connection.

In the above embodiment, the first donor device may further transmit a second message to the migrating IAB-node via the first F1-C connection by using the first TNL address, the second message including a sixth TNL address used for the F1-U connection of the migrating IAB-node, or a sixth TNL address used for the F1-U connection of the migrating IAB-node and a BAP routing identifier and backhaul RLC channel identifier used for the F1-U connection of the migrating IAB-node. Therefore, the migrating IAB-node may receive the second message and update the fifth TNL address used for its F1-U connection to the sixth TNL address, so that the F1-U traffic may be forwarded via the DU of the second donor, thereby optimizing transmission paths of the F1-U traffic.

In the above embodiment, the first donor device may further receive the second TNL address used for the first F1-C connection of the migrating IAB-node transmitted by the second donor device, and update the first TNL address used for the first F1-C connection of the migrating IAB-node to the second TNL address, thereby orienting the first F1-C at the first donor device side, and optimizing transmission paths of the first F1-C traffic.

In the above embodiment, the first donor device may further receive the sixth TNL address used for the F1-U connection of the migrating IAB-node transmitted by the second donor device, and update the fifth TNL address used for the F1-U connection of the migrating IAB-node to the sixth TNL address, thereby orienting F1-U at the first donor device side, and optimizing transmission paths of F1-U traffic.

FIG. 9 is an exemplary diagram of an application scenario of the above embodiment, and FIG. is a schematic diagram of information exchange of the above embodiment. The above embodiment shall be explained below with reference to FIGS. 9 and 10.

As shown in FIG. 9, a radio link failure (RLF) occurs in the backhaul (BH) link of the migrating node, the migrating node selects donor 2 to perform connection reestablishment. Due to being connection reestablished to donor 2, the migrating node may setup F1-C with donor 2 only after being connected to donor 2. The original F1-C (old F1-C), i.e. F1-C between donor CU 1 and the migrating node, may also possibly be updated from an original transmission path to a new transmission path. The RRC reconfiguration complete message of the UE needs to be transmitted to donor 2 via new F1-C, i.e. F1-C between donor CU 2 and the migrating node. Therefore, the migrating node migrates to donor 2 prior to UE.

Figure 10:
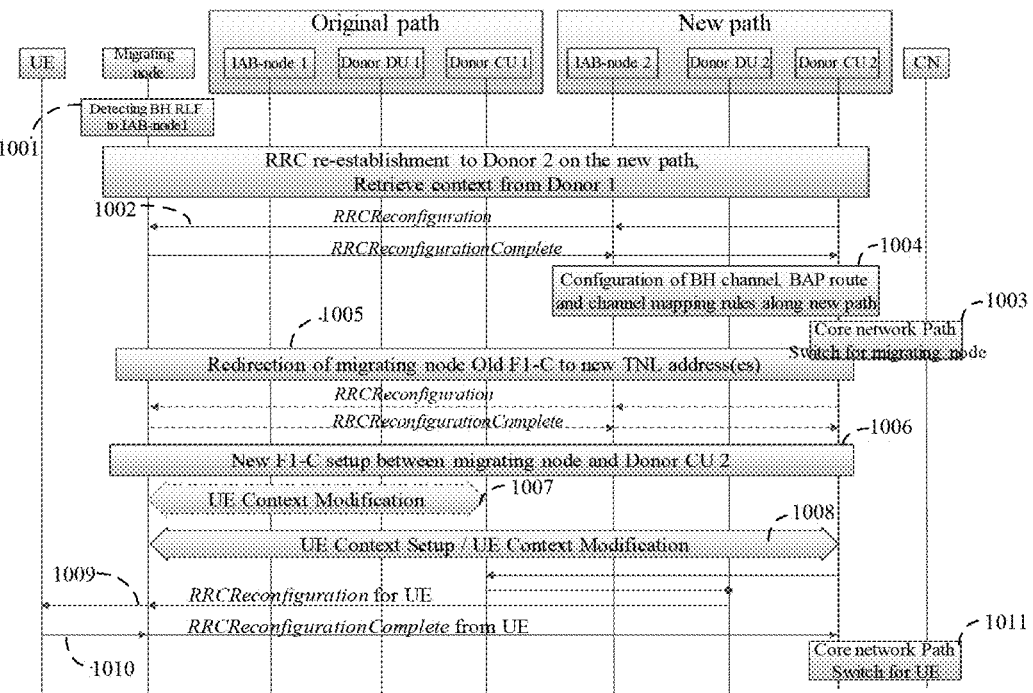
FIG. 10 is a schematic diagram of information exchange in the scenario shown in FIG. 9.

As shown in FIG. 10, the information exchange process includes:

1001: the migrating node detects that a radio link failure occurs in the BH link, and selects a cell under IAB-node 2 to perform RRC connection reestablishment, during which donor 2 may obtain the contexts of the migrating node and its served UE from donor 1; and

1002: after the migrating node completes the RRC connection reestablishment process, donor CU 2 transmits an RRCReconfiguration message to the migrating node. As it is changed to be connected to donor 2, the message further includes a BAP address allocated by donor 2 to the migrating node. And as the backhaul link is changed to be under IAB-node 2, the message further includes BH RLC channel configuration from the migrating node to IAB-node 2, and a BAP route (default route) and a new BH RLC channel (a default BH channel ID) used for F1-C traffic and non-F1 traffic.

In addition, as an access anchor point of the old F1 connection between donor CU 1 and the migrating node is changed from IAB-node 1 to IAB-node 2, the original F1 traffic need to be forwarded via donor DU 2 and IAB-node 2 under donor 2, that is, the transmission is transferred from the original path to the new path (i.e. the migrating node-→IAB-node 2→donor DU 2→donor CU 1). In such a case, it is needed to configure the migrating node with a subnet address suitable for donor DU 2. In such a case, signaling of the UE is still transmitted to donor CU 1 via old F1-C, but the old F1-C needs to be transferred to a new path, hence, the RRC reconfiguration message further includes TNL address used for the old F1-C, so as to update transmission paths of the old F1-C traffic.

Furthermore, at this moment, DRB data of the UE are still transmitted to donor CU 1 via an F1-U (i.e. an F1-U setup between the migrating node and donor CU 1), and the F1-U is transferred from an original path to a new path (i.e. the migrating node→IAB-node 2→donor DU 2→donor CU 1). In order to minimize an interrupted time of F1-U transmission, the RRC reconfiguration message may further include a TNL address used for the F1-U connection to indicate to update a transmission path of the F1-U traffic, so that the migrating node may immediately transfer the F1-U traffic to the new path for transmission; in addition, the RRC reconfiguration message may include a BAP route and a BH RLC channel mapping relation used for the F1-U connection. For example, specifically, the RRC reconfiguration message includes a BAP route used by an RLC channel of each UE, and a correspondence between a UE ID, the RLC channel of the UE and the backhaul RLC channel of the migrating node.

There are two cases for setting up the new F1-C.

Case 1: the new F1-C is setup immediately after the migrating node is connection reestablished to donor 2. Hence, the above RRC reconfiguration message further includes a TNL address used for the new F1-C, so as to indicate to setup the new F1-C.

Case 2: the UE is not migrated immediately after the migrating node is connection reestablished to donor 2. Hence, the new F1-C may be setup after a period of time that the migrating node is connection reestablished to donor 2. Hence, the subsequent RRC reconfiguration message includes the TNL address used for the new F1-C, which is as shown in the RRC reconfiguration process after operation 1005 in FIG. 10.

1003: donor CU 2 initiates core network path handover for the migrating node after receiving the RRC reconfiguration complete message of the migrating node;

1004: due to that the traffic of the new F1-C, old F1-C and F1-U of the migrating node need to be transmitted via a new path, donor CU 2 configures a BH RLC channel, a BAP layer route and a BH RLC channel mapping relation for nodes on the new path after receiving the RRC reconfiguration complete message of the migrating node.

In the above embodiments, operation of 1004 may be executed immediately after the operation of 1001; however, this disclosure is not limited thereto.

1005: the migrating node transfers the old F1-C to the new path by using the updated TNL address.

In the above embodiment, the migrating node may further transfer the F1-U to the new path by using the updated TNL address.

1006: the migrating node sets up new F1-C with donor CU 2 by using a TNL address indicating to setup new F1-C.

1007: if the RRC reconfiguration message in operation 1002 does not include configuration information of the F1-U, donor CU 1 transmits an F1AP message, i.e. UE context modification, to the migrating node via the old F1-C, so as to update the TNL address used for the F1-U connection, thereby transferring the F1-U traffic to the new path, and may further modify the BAP route and BH RLC channel mapping relation of the F1-U connection. For example, specifically, a BAP route used by RLC channel of each UE may be configured via the F1AP message, and the correspondence between the UE ID, the RLC channel of the UE and the backhaul RLC channel of the migrating node may be configured.

In the above embodiments, the operation of 1007 may be executed immediately after the operation of 1005; however, this disclosure is not limited thereto.

1008: the context of the UE is setup in the new F1-C of the migrating node, so as to migrate the UE to donor 2. In this way, the UE has a context respectively in the old F1-C and the new F1-C, that is, for the UE, there is F1AP signaling connection respectively between the migrating node and donor CU 1 and between the migrating node and donor CU 2. The F1AP signaling connection with donor CU 1 is used to transmit the RRC reconfiguration message to the UE, and the F1AP signaling connection with donor DU 2 is used to receive the RRC reconfiguration complete message from the UE.

There are three methods for setting up the context of the UE in the new F1-C of the migrating node.

Method 1: donor CU 2 transmits an F1AP message. i.e. a UE context setup request, to the migrating node via the new F1-C.

In method 1, the migrating node may allocate a C-RNTI to the UE, and transmit the C-RNTI to donor CU 2 via a UE context setup response.

In method 1, the UE next setup request includes F1-U configuration for the DRB of the UE, the F1-U may be configured at a donor CU 1 side, and the DRB of the UE uses a UL TNL address of donor CU 1; and the F1-U may also be configured at a donor DU 2 side, the DRB of the UE uses a UL TNL address of donor CU 2, and thereafter, the migrating node transfers the F1-U of the UE from donor CU 1 to donor CU 2.

Method 2: donor CU 2 transmits an F1AP message, i.e. UE context modification, to the migrating node via the new F1-C.

In method 2, the UE context modification carries a context identifier of the UE in the old F1-C, and the migrating node may obtain a UE context under the old F1-C according to the context identifier of the UE and setup a new UE context in the new F1-C by using the UE context. As it is needed to change a serving cell ID when the migrating node is handed over to donor 2, the UE context modification may include a serving cell ID of the UE, and the migrating node replaces a serving cell ID in the original UE context with this cell ID. In addition, when the serving cell is changed by the UE, the C-RNTI may also be changed. Therefore, the migrating node allocates a new C-RNTI to the UE and replaces the original C-RNTI with the new C-RNTI. The migrating node may transmit the new C-RNTI to donor DU 2 via a UE context setup response.

In method 2, the F1-U configuration may be modified in the UE context modification, the modified F1-U may still be at the donor CU 1 side, and the DRB of UE uses the UL TNL address of donor CU 1; and the F1-U may also be handed over from donor CU 1 to the donor DU 2 side, the DRB of UE uses the UL TNL address of donor CU 2, and then the migrating node transmits the DRB data of the UE to donor CU 2. In this way, by using the original UE context to setup a new context, signaling overhead may be saved.

Method 3: donor CU 2 sets up a new context of the UE by transmitting an F1 setup response message in setting up a new F1-C with the migrating node.

In method 3, the F1 setup response may carry context identifiers of multiple UEs in the old F1-C, and the migrating node may obtain the UE contexts under the old F1-C according to the context identifiers of the UEs and use the UE contexts to setup a new UE context in the new F1-C. The F1 setup response may further include serving cell IDs of multiple UEs, and the migrating node may replace the serving cell IDs in the original UE context with these cell IDs. In this way, when F1 is setup, a new context is setup by using the original context of the UE, thereby eliminating a process of setting up a separate context for each UE, and saving signaling overhead and signaling latency.

1009: the UE for which the context is setup is migrated to donor 2, and the RRC reconfiguration message is transmitted to the UE via the original F1-C.

As the old F1-C is between the migrating node and donor CU 1 and the traffic on the old F1-C is forwarded via donor DU 2 and IAB-node 2 under donor 2, a transmitting path for the RRC reconfiguration message for the UE is: donor CU 2→donor CU 1→donor DU 2→IAB-node 2→the migrating node.

1010: the UE transmits the RRC reconfiguration complete message to donor CU 2 via the new F1-C after handover is completed, a transmission path being the migrating node-→IAB-node 2→donor DU 2→donor CU 2.

1011: donor CU 2 initiates core network path handover for the UE after receiving the RRC reconfiguration complete message of the UE.

It can be seen from the above embodiment that the second donor device configures the TNL address used for the first F1-C connection via the RRC message, so that the first F1-C traffic may be forwarded via the DU of the second donor device, thereby optimizing transmission paths of the first F1-C traffic. At the same time, the second donor device may further configure the TNL address used for the second F1-C connection via the RRC messages, so that the migrating IAB-node sets up the second F1-C connection immediately after being connection reestablished to the second donor device, thereby the UE may be migrated to the second donor device, and achieving payload balance between the donors. In addition, in setting up the UE context in the second F1-C connection, the migrating node needs only to obtain the first context of the UE according to the first context identifier of the UE in the first F1-C connection and sets up the second context of the UE by reusing the first context, without needing to use an existing UE context setup process, which may lower signaling overhead and latency in setting up the UE context, and improve signaling efficiency.

In some embodiments, the migrating IAB-node is handed over from the first donor device to the second donor device, and the migrating node sets up a second F1-C connection after being handed over to the second donor device. The second donor device may configure a fourth TNL address used for setting up the second F1-C connection for the migrating IAB-node, or, the second donor device may configure a fourth TNL address used for setting up the second F1-C connection for the migrating IAB-node, and make the migrating IAB-node to update a first TNL address used for a first F1-C connection to a second TNL address.

For example, the second donor device transmits a first RRC reconfiguration message for the migrating IAB-node to the first donor device, so that the first donor device forwards the first RRC reconfiguration message to the migrating IAB-node.

The first RRC reconfiguration message includes a handover command and the fourth TNL address used for the second F1-C connection. Therefore, the migrating IAB-node may setup the second F1-C connection with the CU of the second donor device by using the fourth TNL address. Or, the first RRC reconfiguration message includes a handover command and the second TNL address used for the first F1-C connection, hence, the migrating IAB-node may update the first TNL address used for the first F1-C connection to the second TNL address.

With the method of the above embodiment, the second donor device configures the TNL address used for the first F1-C connection via the RRC message, and indicates to update the TNL address used for the first F1-C connection, so that the first F1-C traffic may be forwarded via the DU of the second donor, thereby optimizing the transmission path of the first F1-C traffic; or, the second donor device may configure the TNL address used for the second F1-C connection via the RRC message, so that the migrating IAB-node sets up the second F1-C connection immediately after being handed over to the second donor device, thereby achieving subsequent migration of the UE.

In the above embodiment, the first RRC reconfiguration message may further include a BAP address allocated to the migrating IAB-node, and/or backhaul RLC channel configuration of the migrating IAB-node and a default BAP routing identifier and default backhaul RLC channel identifier used for the F1-C traffic and non-F1 traffic, and/or a sixth TNL address used by the migrating IAB-node to update the fifth TNL address used for its F1-U connection to the sixth TNL address so that the F1-U traffic may be forwarded via the DU of the second donor, and/or a BAP routing identifier and backhaul RLC channel identifier used for the F1-U connection of the migrating IAB-node.

In the above embodiment, if the first RRC reconfiguration message does not include the fourth TNL address used for the second F1-C connection, that is, it does not indicate the migrating IAB-node to setup the second F1-C connection immediately after being handed over to the second donor device. After a period of time that the migrating IAB-node is handed over to the second donor, the second donor device may further transmit a third RRC reconfiguration message to the migrating IAB-node, the third RRC reconfiguration message including the fourth TNL address used for the second F1-C connection. Therefore, after receiving the third RRC reconfiguration message, the migrating IAB-node may setup the second F1-C connection with the CU of the second donor device by using the fourth TNL address.

In the above embodiment, after the second donor device sets up the second F1-C connection with the migrating IAB-node, in order to migrate the UE served by the migrating IAB-node to the second donor, the CU of the second donor device may transmit a first message to the DU of the migrating IAB-node via the second F1-C connection by using the fourth TNL address, so that the migrating IAB-node sets up a second context for its served UE, the first message may be an F1 setup response, or a UE context setup request, or a UE context modification request message.

As an example, the first message may include a first context identifier of the UE, so that the migrating IAB-node obtains the first context of the UE according to the first context identifier and sets up the second context of the UE by reusing the first context.

As another example, the first message may further include serving cell configuration information of the UE, so that the migrating IAB-node updates the serving cell configuration of the UE.

With the method of the above embodiment, the migrating node only needs to obtain the first context of the UE according to the first context identifier, and sets up the second context of the UE by reusing the first context, without needing to use an existing UE context setup process, which may lower signaling overhead and latency in setting up the UE context, and improve signaling efficiency.

In the above embodiment, in migrating the UE, the second donor device may further transmit a second RRC reconfiguration message for the UE served by the migrating IAB-node to the first donor device, so that the first donor device forwards the second RRC reconfiguration message to the migrating IAB-node via the first F1-C connection by using the second TNL address or by using the first TNL address. Therefore, after receiving the second RRC reconfiguration message, the migrating IAB-node may transmit the second RRC reconfiguration message to its served UE.

Furthermore, the migrating IAB-node may further receive the second RRC reconfiguration complete message transmitted by its served UE, and transmit the second RRC reconfiguration complete message to the second donor device via the second F1-C connection by using the fourth TNL address.

Therefore, the second donor device may further receive the second RRC reconfiguration complete message transmitted by the migrating IAB-node by using the above fourth TNL address via the second F1-C connection.

In the above embodiment, the first donor device may further transmit a second message by using the second TNL address to the migrating IAB-node via the first F1-C connection, the second message including the sixth TNL address used for the F1-U connection of the migrating IAB-node, or the sixth TNL address used for the F1-U connection of the migrating IAB-node and the BAP routing identifier and backhaul RLC channel identifier used for the F1-U connection of the migrating IAB-node. Therefore, the migrating IAB-node may update the fifth TNL address of its F1-U connection to the sixth TNL address, so that the F1-U traffic may be forwarded via the DU of the second donor, thereby optimizing transmission paths of the F1-U traffic.

In the above embodiment, the first donor device may further receive the second TNL address used for the first F1-C connection of the migrating IAB-node transmitted by the second donor device, and update the first TNL address used for the first F1-C connection of the migrating IAB-node to the second TNL address, thereby reorienting the first F1-C at the first donor device side, and optimizing transmission paths of the first F1-C traffic.

In the above embodiment, the first donor device may further receive the sixth TNL address used for the F1-U connection of the migrating IAB-node transmitted by the second donor device, and update the fifth TNL address used for the F1-U connection of the migrating IAB-node to the sixth TNL address, thereby reorienting the F1-U at the first donor device side, and optimizing transmission paths of the F1-U traffic.

In the above embodiment, if the RRC reconfiguration message used for the UE served by the migrating IAB-node is transmitted before handover, before the first donor device updates the first TNL address used for the first F1-C connection of the migrating IAB-node to the second TNL address, the first donor device may receive the second RRC reconfiguration message for the UE served by the migrating IAB-node transmitted by the second donor device, and transmits the second RRC reconfiguration message to the migrating IAB-node via the first F1-C connection by using the first TNL address, so that the migrating IAB-node forwards the second RRC reconfiguration message to its served UE.

Figure 11A:
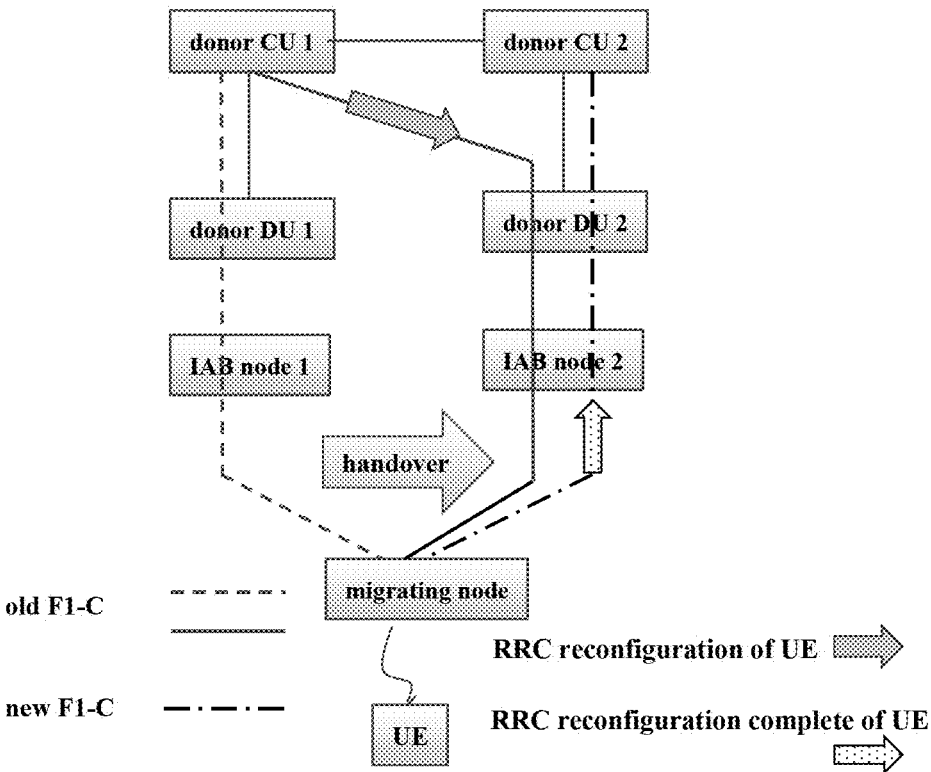
FIGS. 11a and 11b are schematic diagrams of another scenario of the group migrating method of the embodiment of this disclosure.
Figure 11B:
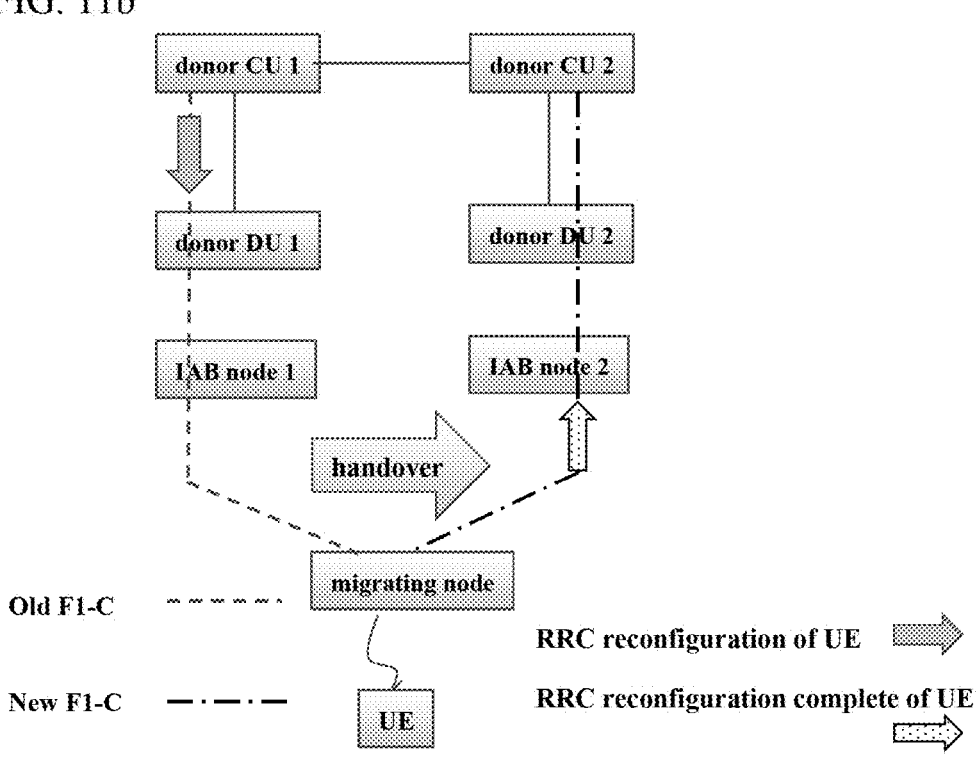
Figure 12:
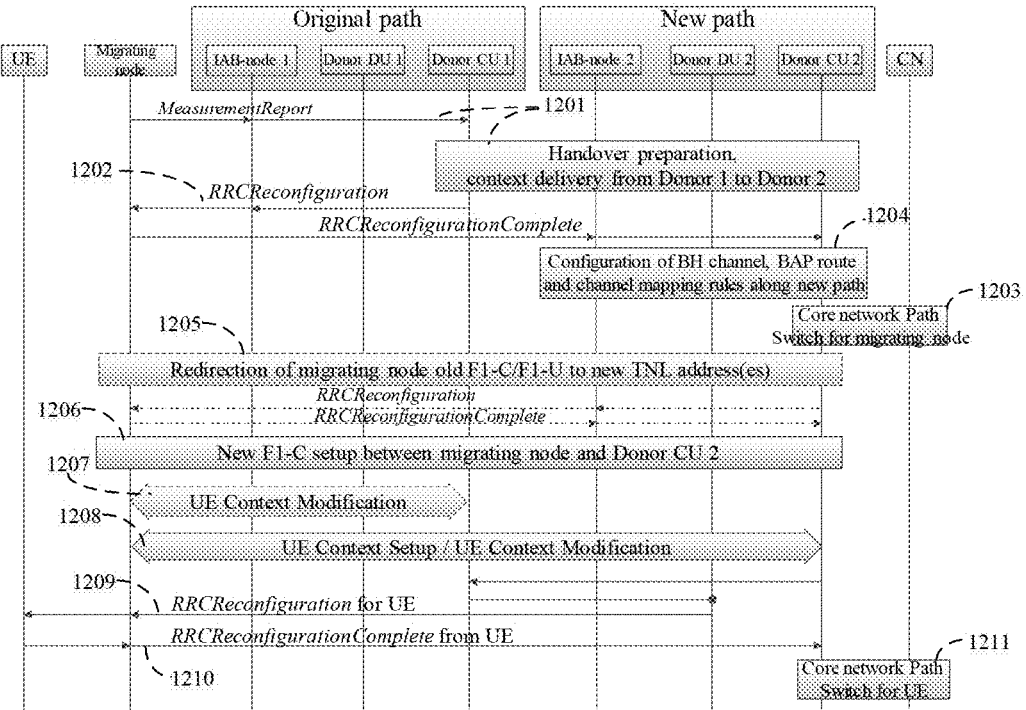
FIG. 12 is a schematic diagram of information exchange in the scenario shown in FIGS. 11a and 11b.

FIGS. 11a and 11b are exemplary diagrams of application scenarios of the above embodiment, and FIG. 12 is a schematic diagram of information exchange of the above embodiment. The above embodiment shall be explained below with reference to FIGS. 11a, 11b and 12.

As shown in FIGS. 11a and 11b, the migrating node is handed over from donor 1 to donor 2. As it is handed over to donor 2, F1-C with donor 2 needs to be setup finally. In the examples in FIGS. 11a, 11b and 12, the new F1-C uses a new transmission path from the migrating node to donor 2. The old F1-C may possibly be updated from the original transmission path to the new transmission path. As the new F1-C is setup via the new transmission path, the migrating node needs to be connected to donor 1 first, and then sets up the new F1-C with donor 2. A handover complete (reconfiguration complete) message of the UE needs to be transmitted to donor 2 via the new F1-C, hence, the migrating node migrates to donor 2 prior to the UE.

As shown in FIG. 12, the information exchange process includes:

1201: the migrating node transmits a measurement report to donor CU 1, and donor CU 1 determines to initiate a handover request to donor CU 2 according to the measurement report, thus donor CU 1 transmits the contexts of the migrating node and its served UE to donor CU 2, then donor CU 2 sets up a context for the migrating node in IAB-node 2, and transmits a handover request response to donor CU 1, the handover request response carrying an RRCReconfiguration message; and 1202: donor CU 1 transmits the RRCReconfiguration message for the migrating node carried in the handover request response to the migrating node upon receiving the handover request response, wherein as it is changed to be connected to donor 2, the message includes a BAP address allocated to the migrating node by donor 2, and as the backhaul link is changed to IAB-node 2, the message further includes BH RLC channel configuration from the migrating node to IAB-node 2, and the BAP route (default route) and BH RLC channel (default BH channel) used for F1-C traffic and non-F1 traffic.

In addition, as the access anchor point of the old F1 connection setup between donor CU 1 and the migrating node is changed from IAB-node 1 to IAB-node 2, the original F1 traffic may be forwarded via donor DU 2 and IAB-node 2 under donor 2, that is, the transmission is transferred from the original path to the new path (i.e. migrating node→IAB-node 2→donor DU→donor CU 1), and the migrating node needs to be configured with a subnet address adaptive to donor DU 2, hence, donor CU 2 updates the TNL address used for F1 connection for the migrating node.

Difference from the embodiments in FIGS. 9 and 10, as the process is an inter-donor migration process based on handover preparation and the RRC reconfiguration message transmitted to the UE may have already been transmitted to the migrating node via the original F1-C at this moment, the original F1-C may possibly not need to be transferred to a new path, hence, that the RRC reconfiguration message includes the TNL address used for the old F1-C is optional.

Furthermore, at this moment, the DRB data of the UE are still transmitted to donor CU 1 via an F1-U (i.e. the F1-U setup between the migrating node and donor CU 1), and the F1-U is transferred from the original path to the new path (i.e. the migrating node→IAB-node 2→donor DU 2→donor CU 1). In order to minimize an interruption time of the F1-U transmission, the message may further include a TNL address used for the F1-U connection, indicating to update the transmission path of the F1-U traffic, so that the migrating node may immediately transfer the F1-U traffic to the new path for transmission. In addition, the RRC reconfiguration message may further be used to update the BAP route and BH RLC channel mapping relation used for the F1-U connection. For example, specifically, the RRC reconfiguration message may be used to configure a BAP route used by an RLC channel of each UE, and configure a correspondence between the UE ID, the RLC channel of the UE and the backhaul RLC channel of the migrating node.

In the example in FIG. 12, there are two cases for setting up the new F1-C.

Case 1: the new F1-C is setup immediately after the migrating node is handed over to donor 2. And the above RRC reconfiguration message further includes the TNL address used for the new F1-C, so as to indicate to setup the new F1-C.

Case 2: after the migrating node is handed over to donor 2, the UE is not immediately migrated. Hence, the new F1-C may be setup after a period of time that the migrating node is completed. Hence, the subsequent RRC reconfiguration message includes the TNL address used for the new F1-C, as shown in the RRC reconfiguration process after operation 1205 in FIG. 12.

Implementations of 1203-1211 are identical to those of 1003-1011 in FIG. 10, which shall not be described herein any further. It should be noted that the reorientation of the old F1-C is optional, and in the example in FIG. 12, 1210 (i.e. transmitting the RRC reconfiguration message to the UE via the old F1-C) may be executed immediately after 1201.

It can be seen from the above embodiment that the second donor device may configure the TNL address used for the first F1-C connection via the RRC messages, indicating to update the TNL address used for the first F1-C connection, so that the first F1-C traffic may be forwarded via the DU of the second donor device, thereby optimizing transmission paths of the first F1-C traffic; or, the second donor device may configure the TNL address used for the second F1-C connection via the RRC messages, so that the migrating IAB-node sets up the second F1-C connection immediately after being handed over to the second donor device, thereby migrating the UE to the second donor device, and achieving payload balance between the donors. Furthermore, in setting up the UE context in the second F1-C connection, the migrating node needs only to obtain the first context of the UE according to the first context identifier of the UE in the first F1-C connection, and sets up the second context of the UE by reusing the first context, without needing to use an existing UE context setup message, which may lower signaling overhead and latency in setting up the UE context, and improve signaling efficiency.

In some embodiments, the migrating IAB-node is handed over from the first donor device to the second donor device, and the migrating node sets up a second F1-C connection before being handed over to the second donor device. The second donor device makes the migrating IAB-node to update a third TNL address used for the second F1-C connection to a fourth TNL address.

For example, the second donor device transmits a first RRC reconfiguration message for the migrating IAB-node to the first donor device, so that the first donor device forwards the first RRC reconfiguration message to the migrating IAB-node. The first RRC reconfiguration message includes a handover command and a fourth TNL address used for the second F1-C connection. Hence, the migrating IAB-node may update a third TNL address used for the second F1-C connection to the fourth TNL address.

With the method of the above embodiment, the second donor device configures a TNL address used for the second F1-C connection via a RRC message, indicating to update the TNL address used for the second F1-C connection, so that the second F1-C traffic may be forwarded via the DU of the second donor, thereby optimizing transmission paths of the second F1-C traffic.

In the above embodiment, the first RRC reconfiguration message may further include: a BAP address allocated to the migrating IAB-node, and/or, backhaul RLC channel configuration of the migrating IAB-node, and a default BAP routing identifier and default backhaul RLC channel identifier used for F1-C traffic and non-F1 traffic, and/or, a sixth TNL address used by the migrating IAB-node to update a fifth TNL address used for its F1-U connection to the sixth TNL address so that the F1-U traffic may be forwarded via the DU of the second donor, and/or, a BAP routing identifier and backhaul RLC channel identifier used for the F1-U connections of the migrating IAB-node.

In the above embodiment, before the second donor device transmits the first RRC reconfiguration message for the migrating IAB-node to the first donor device, the CU of the second donor device may use the third TNL address to transmit a first message to the DU of the migrating IAB-node via the second F1-C connection, so that the migrating IAB-node sets up a second context for its served UE according to the first message.

As an example, the first message may include a first context identifier of the UE, so that the migrating IAB-node obtains the first context of the UE according to the first context identifier, and sets up a second context of the UE by reusing the first context, the first message being an F1 setup response or a UE context modification request message.

As another example, the first message may further include serving cell configuration information of the UE, so that the migrating IAB-node updates serving cell configuration of the UE.

With the method of the above embodiment, the migrating node only needs to obtain the first context of the UE according to the first context identifier, and sets up the second context of the UE by reusing the first context, without needing to use an existing UE context setup message, thereby reducing signaling overhead and latency in setting up the UE context, and improving signaling efficiency.

In the above embodiment, before the migrating IAB-node receives the first RRC reconfiguration message, the first donor device further transmits a third RRC reconfiguration message to the migrating IAB-node, the third RRC reconfiguration message including a third TNL address used for the second F1-C connection. Hence, after receiving the third RRC reconfiguration message, the migrating IAB-node may setup the second F1-C connection with the CU of the second donor device by using the third TNL address, thereby achieving migration of the UE.

In the above embodiment, in migrating the UE, the second donor device may further transmit a second RRC reconfiguration message for the UE served by the migrating IAB-node to the first donor device, so that the first donor device forwards the second RRC reconfiguration message to the migrating IAB-node by using the first TNL address via a first F1-C connection. Hence, after receiving the second RRC reconfiguration message, the migrating IAB-node may transmit the second RRC reconfiguration message to its served UE.

Furthermore, the migrating IAB-node may further receive a second RRC reconfiguration complete message transmitted by its served UE, and transmit the second RRC reconfiguration complete message to the second donor device via the second F1-C connection by using the third TNL address or the fourth TNL address.

Hence, if the RRC reconfiguration complete message used for the UE served by the migrating IAB-node is transmitted before the migrating node is handed over, the second donor device may further receive the second RRC reconfiguration complete message transmitted by the migrating IAB-node by using the third TNL address via the second F1-C connection; or, the second RRC reconfiguration complete message used for the UE served by the migrating IAB-node is transmitted after the migrating IAB-node is handed over, and the second donor device receives the second RRC reconfiguration complete message transmitted by the migrating IAB-node by using the fourth TNL address via the second F1-C connection.

In the above embodiment, as the first donor device allocates the third TNL address, the first donor device may further transmit the third TNL address to the second donor device used by the migrating IAB-nodes to setup the second F1-C connection. Hence, the second donor device may setup the second F1-C connection with the migrating IAB-node.

In the above embodiment, the first donor device may further receive a sixth TNL address used for the F1-U connection of the migrating IAB-node transmitted by the second donor device, and update a fifth TNL address used for the F1-U connection of the migrating IAB-node to the sixth TNL address, thereby reorienting the F1-U at the first donor device side, and optimizing transmission paths of the F1-U traffic.

Figure 13A:
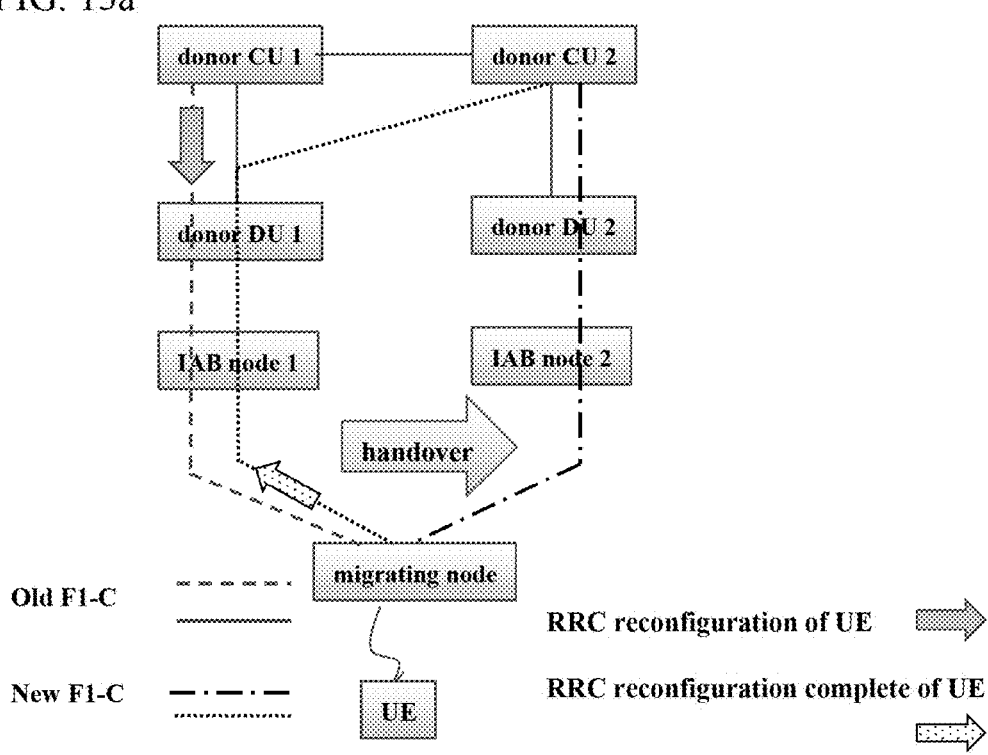
FIGS. 13a and 13b are schematic diagrams of a further scenario of the group migrating method of the embodiment of this disclosure.
Figure 13B:
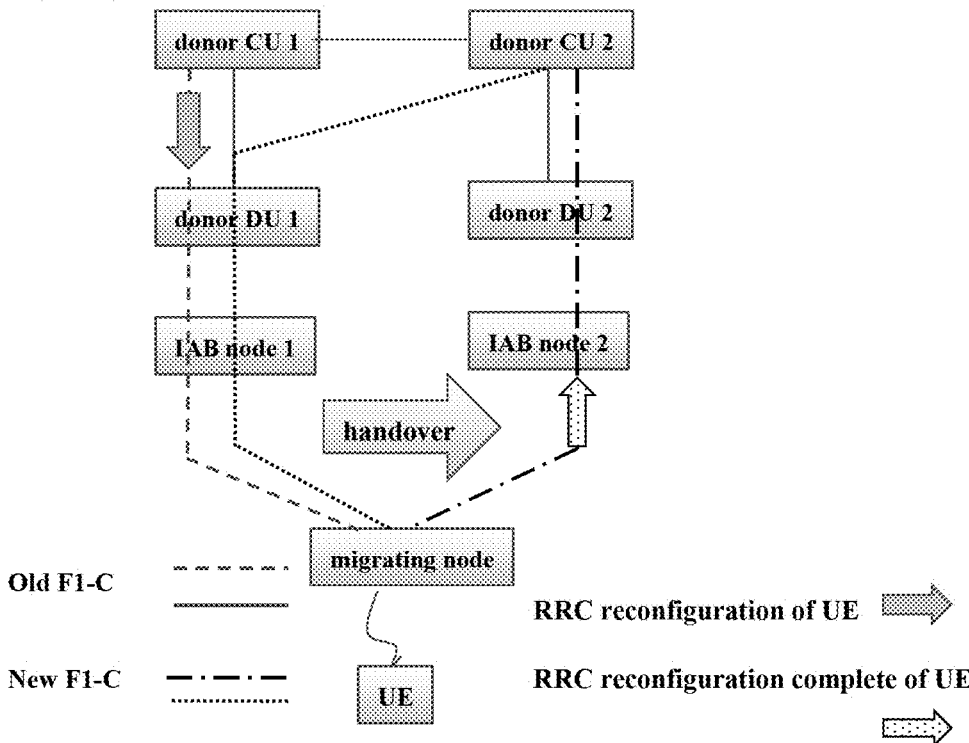
Figure 14:
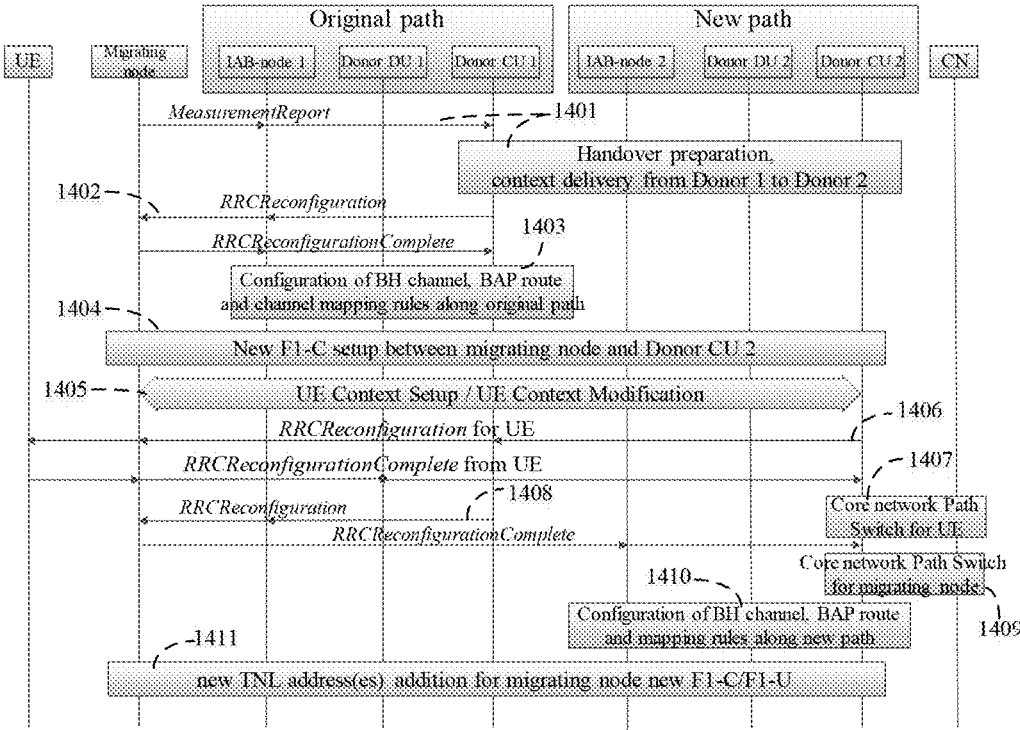
FIG. 14 is a schematic diagram of information exchange in the scenario shown in FIGS. 13a and 13b.

FIGS. 13a and 13b are exemplary diagrams of application scenarios of the above embodiment, and FIG. 14 is a schematic diagram of information exchange of the above embodiment. The above embodiment shall be explained below with reference to FIGS. 13a, 13b and 14.

As shown in FIGS. 13a and 13b, the migrating node is handed over from donor 1 to donor 2. Similar to the examples in FIGS. 11a, 11b and 12, as it is handed over to donor 2, F1-C with donor 2 needs to be setup. Unlike the examples in FIGS. 11a, 11b and 12, in the examples in FIGS. 13a, 13b and 14, the new F1-C is setup via the original transmission path and then the new transmission path is updated. The old F1-C may also possibly be further updated from the original transmission path to the new transmission path. As the new F1-C is setup via the original transmission path, the migrating node needs to setup the new F1-C before being accessed to donor 2. In this case, the UE may migrates to donor 2 prior to the migrating node.

As shown in FIG. 14, the information exchange process includes:

1401: the migrating node transmits a measurement report to donor CU 1, and donor CU 1 determines to initiate a handover request to donor CU 2 according to the measurement report, and donor CU 1 may transmits contexts of the migrating node and its served UE to donor CU 2, and donor CU 2 sets up a context for the migrating node in IAB-node 2, and then transmits a handover request response to donor CU 1, the handover request response carrying an RRCReconfiguration message.

1402: donor CU 1 transmits the RRCReconfiguration message for the migrating node to the migrating node after receiving the handover request response, so as to setup new F1-C, wherein, the RRCReconfiguration message includes a TNL address used for the new F1-C to indicate to setup the new F1-C, and the migrating node transmits a RRC reconfiguration complete message to donor CU 1.

1403: as the new F1-C with donor CU 2 is setup via the original path (i.e. the migrating node→IAB-node 1→donor DU 1→donor CU 2), donor CU 1 configures a BH RLC channel, a BAP layer route and a BH RLC channel mapping relation for nodes on the original path after receiving the RRC reconfiguration complete message of the migrating node.

In the above embodiments, operation 1403 may be executed immediately after operation 1401; however, this disclosure is not limited thereto.

1404: the migrating node sets up the new F1-C with donor CU 2 by using the TNL address indicating to setup the new F1-C.

1405: the context of the UE is setup in the new F1-C of the migrating node, so as to migrate the UE to donor 2; hence, the UE has a context in the old F1-C and the new F1-C, respectively, that is, for the UE, there is F1AP signaling connection between the migrating node and donor CU 1 and between the migrating node and donor CU 2, respectively. The F1AP signaling connection with donor CU 1 is used to transmit the RRC reconfiguration message to the UE, and the F1AP signaling connection with donor DU 2 is used to receive the RRC reconfiguration complete message of the UE.

There are three methods for setting up the context of the UE in the new F1-C of the migrating node.

Method 1: donor CU 2 transmits an F1AP message. i.e. a UE context setup request, to the migrating node via the new F1-C.

In method 1, the migrating node may allocate a C-RNTI to the UE, and transmit the C-RNTI to donor DU 2 via a UE context setup response.

In method 1, the UE context setup request includes F1-U configuration for the DRB of the UE, the F1-U may be configured at a donor CU 1 side, and in such a case, the DRB of the UE uses a UL TNL address of donor CU 1; and the F1-U may also be configured at a donor DU 2 side, and in such a case, the DRB of the UE uses a UL TNL address of donor CU 2, and thereafter, the migrating node transfers the F1-U of the UE from donor CU 1 to donor CU 2.

Method 2: donor CU 2 transmits an F1AP message, i.e. UE context modification, to the migrating node via the new F1-C.

In method 2, the UE context modification carries a context identifier of the UE in the old F1-C, and the migrating node may obtain a UE context under the old F1-C according to the context identifier of the UE and setup a new UE context in the new F1-C by using the UE context under the old F1-C.

In method 2, as it is needed to change a serving cell ID when the migrating node is handed over to donor 2, the UE context modification message may configure a serving cell ID of the UE, and the migrating node replaces a serving cell ID in the original UE context with this serving cell ID.

In method 2, when the UE migrates to the new serving cell, the C-RNTI may be changed. Therefore, the migrating node allocates a new C-RNTI to the UE and replaces the original C-RNTI with the new C-RNTI. The migrating node transmits the new C-RNTI to donor CU 2 via a UE context setup response. In this way, by setting up the new context by using the original UE context, signaling overhead may be saved.

In method 2, the F1-U configuration may be modified in the UE context modification, the modified F1-U may still be at the donor CU 1 side, and in such a case, the DRB of UE uses the UL TNL address of donor CU 1; and the F1-U may also be handed over from donor CU 1 to the donor DU 2 side, and in such a case, the DRB of UE uses the UL TNL address of donor CU 2, and then the migrating node transmits the DRB data of the UE to donor CU 2.

In operation 1405, if the F1-U of the UE is handed over from donor CU 1 to donor CU 2, the F1-U traffic needs to be transmitted via the original path with donor CU 2 (that is, the transmission path is: the migrating node→IAB-node 1→donor DU 1→donor CU 2).

Method 3: donor CU 2 sets up a new context of the UE by transmitting an F1 setup response message in setting up a new F1-C with the migrating node.

In method 3, the F1 setup response may carry context identifiers of multiple UEs in the old F1-C, and the migrating node may obtain the UE context under the old F1-C according to the context identifiers of the UEs and setup a new UE context in the new F1-C by using the UE context under the old F1-C. The F1 setup response may further include serving cell IDs of multiple UEs, and the migrating node may replace the serving cell IDs in the original UE context with these cell IDs. In this way, when F1 is setup, a new context is setup by using the original context of the UE, thereby eliminating a process of setting up separately each UE context, and saving signaling overhead and signaling latency.

1406: the UE for which the context is setup is migrated to donor 2, and donor CU 1 transmits an RRC reconfiguration message to the UE via the old F1-C.

In the above embodiments, operation 1406 may also be executed immediately after operation 1401; however, this disclosure is not limited thereto. A transmission path of the RRC reconfiguration message of the UE is donor CU 1→donor DU 1→IAB-node 1→the migrating node.

In operation 1406, UE may transmit an RRC reconfiguration complete message to donor CU 2 via the new F1-C. As the new F1-C is between the migrating node and donor CU 2, the new F1-C traffic is forwarded via donor DU 1 and IAB-node 1 under donor 1, that is, the transmission path is: the migrating node→IAB-node 1→donor DU 1→donor CU 2.

1407: donor CU 2 initiates core network path handover for UE after receiving the RRC reconfiguration complete message of the UE.

1408: donor CU 1 transmits the RRCReconfiguration message for the migrating node carried in the handover request response to the migrating node, so as to handover the migrating node to donor 2, the RRCReconfiguration message containing a target cell under IAB-node 2 and key update information.

As it is changed to be connected to the donor 2, the message further includes the BAP address allocated to the migrating node by the donor 2. And as the backhaul link is changed to be under IAB-node 2, the message further includes BH RLC channel configuration from the migrating node to IAB-node 2, and the BAP route (a default route) and a new BH RLC channel (a default BH RLC channel) used for the F1-C traffic and non-F1 traffic.

As an access anchor point of the F1 connection of the migrating node is changed from IAB-node 1 to IAB-node 2 and the original F1 traffic need to be forwarded via donor DU 2 and IAB-node 2 under donor 2, that is, the transmission needs to be transferred from the original path to the new path (i.e. the migrating node→IAB-node 2→donor DU 2), the migrating node needs to be configured with a subnet address adaptive to donor DU 2. Hence, donor CU 2 needs to update the TNL address of F1 for the migrating node. The new F1-C needs to be transferred to the new path, and a TNL address used for the new F1-C needs to be updated. In addition, as the UE has completed in handover at this moment, the old F1-C does not need to be transferred to the new path.

The F1-U is also transferred from the original path to the new path (i.e. the migrating node→IAB-node 2→donor DU 2→donor CU 1 or donor CU 2). In order to minimize an interruption time of the F1-U transmission, the message may further include a TNL address used for the F1-U connection, so that the migrating node may immediately transfer the F1-U traffic to the new path for transmission. In addition, the BAP route and BH RLC channel mapping relation used for the F1-U may be reconfigured. For example, specifically, a BAP route used by an RLC channel of each UE, and a correspondence between a UE ID, the RLC channel of the UE and the backhaul RLC channel of the migrating node may be configured in the message.

1409: donor CU 2 initiates core network path handover for the migrating node upon receiving the RRC reconfiguration complete message of the migrating node.

1410: as the traffic of the new F1-C, old F1-C and F1-U of the migrating node need to be transmitted via the new path, donor CU 2 configures a BH RLC channel, a BAP layer route and a BH RLC channel mapping relation for nodes on the new path after receiving the RRC reconfiguration complete message of the migrating node.

In the above embodiments, operation 1410 may be executed immediately after operation 1401; however, this disclosure is not limited thereto.

1411: the new F1-C transfers the new F1-C to the new path by using the updated TNL address. And furthermore, the F1-U may transfer the F1-U to the new path by using the updated TNL address.

It can be seen from the above embodiment that the second donor device configures the TNL address used for the second F1-C connection via the RRC messages before the migrating IAB-node is handed over, so that the migrating IAB-node sets up the second F1-C connection, thereby migrating the UE to the second donor device and achieving payload balance between the donors. At the same time, the second donor device configures the TNL address used for the second F1-C connection via the RRC messages when the migrating IAB-node is handed over, so as to indicate to update the TNL address used for the second F1-C connection, such that the second F1-C traffic may be forwarded via the DU of the second donor, thereby optimizing transmission paths of the second F1-C traffic. In addition, in setting up the UE context in the second F1-C connection, the migrating node needs only to obtain the first context of the UE according to the first context identifier of the UE in the first F1-C connection, and sets up the second context of the UE by reusing the first context, without needing to use an existing UE context setup message, which may lower signaling overhead and latency in setting up the UE context, and improve signaling efficiency.

In some embodiments, the migrating IAB-node maintains the connection with the first donor device and adds an air-interface connection with the second donor device. The migrating node does not need to work as a DU under the second donor device, that is, the UE served by the migrating IAB-node does not need to be migrated to the second donor device, and the migrating IAB-node does not need to setup second F1-C. The second donor device adds a second TNL address used for a first F1-C connection for the migrating IAB-node.

For example, the second donor device transmits a first RRC reconfiguration message for the migrating IAB-node to the first donor device, so that the first donor device forwards the first RRC reconfiguration message to the migrating IAB-node. The first RRC reconfiguration message includes secondary cell group (SCG) configuration information and a second TNL address used for the first F1-C connection. Hence, the migrating IAB-node may add a second TNL address for the first F1-C connection.

According to the method of the above embodiment, the second donor device configures the TNL address used for the first F1-C connection via the RRC message, so as to indicate to add the TNL address used for the first F1-C connection, so that the first F1-C traffic may be forwarded both via the DUs of the first donor and the second donor, thereby improving flexibility of forwarding of the first F1-C traffic.

In the above embodiment, the first RRC reconfiguration message may further include: a BAP address allocated to the migrating IAB-node, and/or, backhaul RLC channel configuration for a secondary cell group of the migrating IAB-node, and/or, a BAP routing identifier and backhaul RLC channel identifier used for a second F1-C connection, and/or, a sixth TNL address added for the F1-U connection of the migrating IAB-node, such that the F1-U traffic may be forwarded via both the DUs of the first donor and the second donor, and/or, a BAP routing identifier and backhaul RLC channel identifier used for the F1-U connection of the migrating IAB-node.

In the above embodiment, the first donor device may receive the second TNL address used for the first F1-C connection of the migrating IAB-node transmitted by the second donor device, and add the second TNL address for the first F1-C connection of the migrating IAB-node, thereby reorienting the first F1-C at the first donor device side, and adding transmission paths of the first F1-C traffic.

In the above embodiment, the first donor device may further receive the sixth TNL address used for the F1-U connection of the migrating IAB-node transmitted by the second donor device, and add the sixth TNL address for the F1-U connection of the migrating IAB-node. For example, the first donor device may transmit a second message to the migrating IAB-node via the first F1-C connection by using the first TNL address or the second TNL address, the second message may include the sixth TNL address used for the F1-U connection, and/or, a BAP routing identifier and backhaul RLC channel identifier used for the F1-U connection. Hence, the migrating IAB-node may update the fifth TNL address used for its F1-U connection to the sixth TNL address, such that the F1-U traffic may be forwarded via both the DUs of the first donor and the second donor, thereby optimizing transmission paths of the F1-U traffic.

Figure 15:
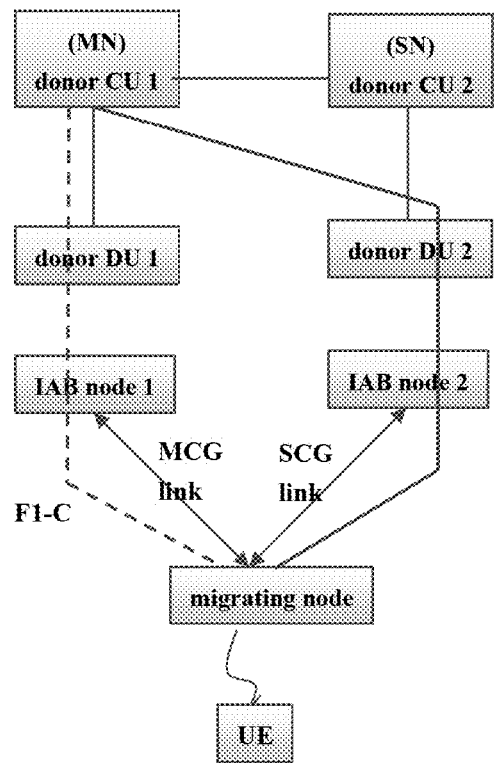
FIG. 15 is a schematic diagram of still another scenario of the group migrating method of the embodiment of this disclosure.
Figure 16:
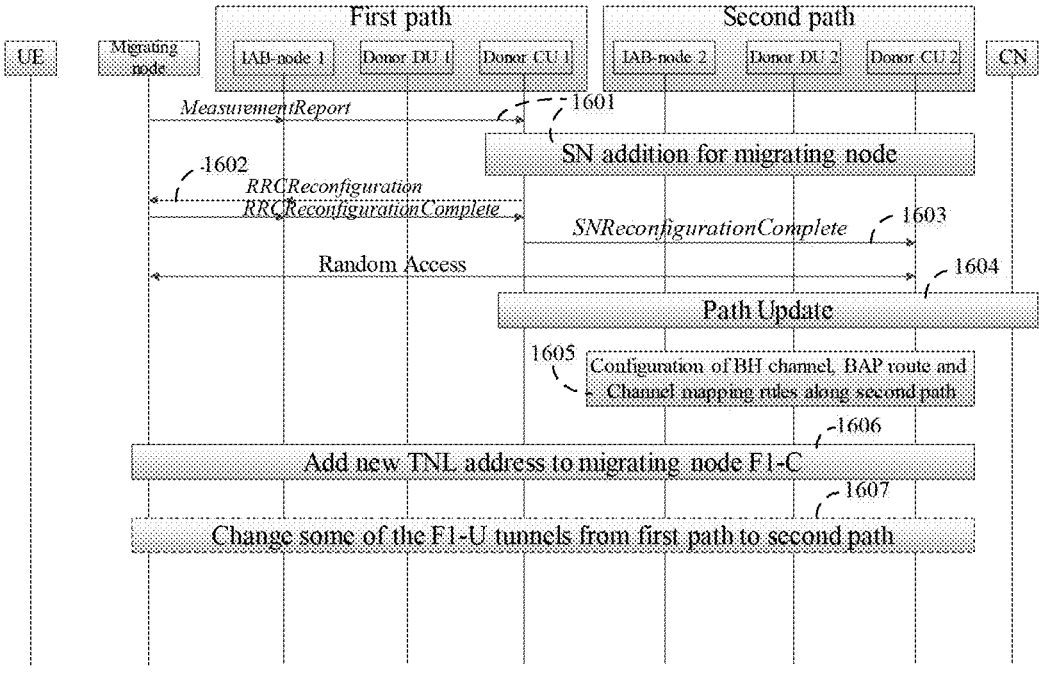
FIG. 16 is schematic diagram of information exchange in the scenario shown in FIG. 15.

FIG. 15 is an exemplary diagram of an application scenario of the above embodiment, and FIG. 16 is a schematic diagram of information exchange of the above embodiment. The above embodiment shall be explained below with reference to FIGS. 15 and 16.

As shown in FIG. 15, when the migrating node moves from donor 1 to donor 2, a new transmission path is added, and the migrating node maintains dual-connection with donor 1 and donor 2, that is, SCG connection with donor 2 is setup, and connection with donor 1 is changed to MCG connection. In the examples in FIGS. 15 and 16, the migrating IAB-node does not setup F1-C with donor 2, and a new transmission path is added to F1-C 2 (or F1-C 2 is updated to a new transmission path). F1 AP messages of a part of UEs are transmitted via the original path, while F1AP messages of the other part of the UEs are updated to be transmitted via the new path.

As shown in FIG. 16, the information exchange process includes:

1601: the migrating node transmits a measurement report to donor CU 1, and donor CU 1 determines to initiate a secondary node addition request to donor CU 2 according to the measurement report, and transmits contexts of the migrating node and its served UE to donor CU 2, such that donor CU 2 may setup a context for the migrating node in IAB-node 2, and then transmit a secondary node addition request response to donor CU 1, the response carrying an RRCReconfiguration message.

1602: donor CU 1 transmits a RRCReconfiguration message for the migrating node carried in the secondary node addition request response to the migrating node after receiving the secondary node addition request response.

As SCG connection to donor 2 is added, the message includes the BAP address allocated by donor 2 to the migrating node. There are two modes of transmission of F1-C traffic via the new path:

mode 1: transmitting the F1-C traffic via a signaling radio bearer (SRB); and mode 2: transmitting the F1-C traffic via a BH RLC channel.

In mode 1, there is no need to add backhaul link configuration, and in mode 2, there is a need to add a backhaul link from the migrating node to IAB-node 2. Hence, the message further includes BH RLC channel configuration from the migrating node to IAB-node 2. There is also a need to add a new transmission path (i.e. migrating node→IAB-node 2→donor DU→donor CU 1), hence, a BAP route and BH RLC channel configuration used for F1-C traffic and non-F1 traffic are added (updated) to the message.

In addition, as IAB-node 2 is added as an access anchor point for the F1 connection (or an access anchor point is switched to IAB-node 2), the F1 traffic are forwarded via donor DU 2 and IAB-node 2 under donor 2, and the migrating node needs to be configured with a subnet address adaptive to donor DU 2. Therefore, donor CU 2 needs to add a TNL address used for the F1-C for the migrating node to add transmission paths of the F1-C traffic. F1AP signaling of the UE is transmitted to donor CU 1 via the old F1-C. After transmission paths of the F1-C are added, signaling of some UEs is transmitted via the original path, and signaling of other UEs may be transmitted via the new path.

In addition, F1-U of some or all UEs further are transferred from the original path to the new path (the migrating node→IAB-node 2→donor DU 2→donor CU 1 or donor DU 2). In order to reduce signaling transmission delay and minimize an interruption time of F1-U transmission, the RRC message may further include the TNL address used for the F1-U connection, so that the migrating node may immediately transfer the F1-U traffic to the new path for transmission. In addition, a BAP route and a BH RLC channel mapping relation used for the F1-U connection may further be configured. For example, specifically, a BAP route used by an RLC channel of each UE may be configured in the message, and a correspondence between a UE ID, the RLC channel of the UE and the backhaul RLC channel of the migrating node is also configured.

1603: the migrating node transmits an RRC reconfiguration complete message to donor CU 1, and donor CU 1 transmits a secondary node reconfiguration complete message to donor CU 2.

1604: donor CU 2 initiates core network path update for the migrating node after receiving the secondary node reconfiguration complete message and random access message of the migrating node.

1605: due to that the traffic of the F1-C and F1-U of the migrating node need to be transmitted via a new path, donor CU 2 updates a BH RLC channel configuration, a BAP layer route and a BH RLC channel mapping relation configuration for nodes on the new path after receiving the secondary node reconfiguration complete message and random access process of the migrating node being completed.

In the above embodiments, operation 1605 may be executed immediately after operation 1601; however, this disclosure is not limited thereto.

1606: a TNL address is added for the F1-C connection, and a part or all of UE signaling of the F1-C is transferred to the new path.

For example, the F1-C traffic is transmitted by a signaling radio bearer (SRB) from the migrating node to IAB-node 2; or, the F1-C traffic is transmitted via a BH RLC channel from the migrating node to IAB-node 2.

1607: if TNL configuration of the F1-U connection is included in operation 1602, the TNL address is added for the F1-U connection, and DRBs of a part of UEs of the F1-U connection are transferred to the new path.

According to the method of the above embodiment, the second donor device configures the TNL address used for the first F1-C connection via the RRC messages to indicate to add the TNL address used for the first F1-C connection, so that the first F1-C traffic may be forwarded via the DUs of the first donor and the second donor, thereby improving flexibility of the forwarding of the first F1-C traffic.

In some embodiments, the migrating IAB-node maintains the connection with the first donor device and adds an air-interface connection with the second donor device. The migrating IAB-node sets up the second F1-C after adding the air-interface connection with the second donor device. The second donor device configures a fourth TNL address or a third TNL address used for setting up a second F1-C connection for the migrating IAB-node, or the second donor device adds a second TNL address used for a first F1-C connection for the migrating IAB-node.

For example, the second donor device transmits a first RRC reconfiguration message for the migrating IAB-node to the first donor device, so that the first donor device forwards the first RRC reconfiguration message to the migrating IAB-node.

The first RRC reconfiguration message includes secondary cell group (SCG) configuration information and the fourth TNL address or third TNL address used for the second F1-C connection. Therefore, the migrating IAB-node may setup the second F1-C connection with the CU of the second donor device by using the fourth TNL address or third TNL address; or, the first RRC reconfiguration message includes secondary cell group (SCG) configuration information and a second TNL address used for the first F1-C connection. Hence, the migrating IAB-node may add the second TNL address for the first F1-C.

According to the method of the above embodiment, the second donor device configures the TNL address used for the first F1-C connection via the RRC message to indicate to update the TNL address used for the first F1-C connection, so that the first F1-C traffic may be forwarded via the DU of the second donor, thereby optimizing transmission paths of the first F1-C traffic; or, the second donor device may configure the TNL address used for the second F1-C connection via the RRC message, so that the migrating IAB-node sets up the second F1-C connection immediately after adding the air-interface connection with the second donor device, thereby achieving migration of the UE.

In the above embodiment, the first RRC reconfiguration message may further include a BAP address allocated to the migrating IAB-node, and/or, backhaul RLC channel configuration for a secondary cell group of the migrating IAB-node, a BAP routing identifier and a backhaul RLC channel identifier used for the second F1-C connection, a sixth TNL address added for the F1-U connection of the migrating IAB-node, so that the F1-U traffic may be forwarded via the DUs of the first and second donors simultaneously, and a BAP routing identifier and backhaul RLC channel identifier used for the F1-U connection of the migrating IAB-node.

In the above embodiment, if the first RRC reconfiguration message does not include the fourth TNL address used for the second F1-C connection, that is, the migrating IAB-node is not indicated to setup the second F1-C connection while adding the air-interface connection with the second donor device. After the migrating IAB-node adds the air-interface connection with the second donor device, the second donor device may further transmit a third RRC reconfiguration message to the migrating IAB-node, the third RRC reconfiguration message including a fourth TNL address used for the second F1-C connection. Hence, after receiving the third RRC reconfiguration message, the migrating IAB-node may setup the second F1-C connection with the CU of the second donor device by using the fourth TNL address.

In the above embodiment, after the second donor device sets up the second F1-C connection with the migrating IAB-node, in order to migrate the UE served by the migrating IAB-node to the second donor, the CU of the second donor device may transmit the first message to the migrating IAB-node via the second F1-C connection by using the third TNL address or the fourth TNL address, so that the migrating IAB-node may setup the second context for its served UE according to the first message.

As an example, the first message includes a first context identifier of the UE, so that the migrating IAB-node obtains the first context of the UE according to the first context identifier, and sets up a second context of the UE by reusing the first context, the first message may be an F1 setup response or a UE context modification request message.

As another example, the first message further includes serving cell configuration information of the UE, so that the migrating IAB-node updates serving cell configuration of the UE.

With the method of the above embodiment, the migrating node needs only to obtain the first context of the UE according to the first context identifier, and sets up the second context of the UE by reusing the first context, with no need of an existing UE context setup process, thereby reducing signaling overhead and latency in setting up the UE context, and improving signaling efficiency.

In the above embodiment, in migrating the UE, the second donor device may further transmit a second RRC reconfiguration message for the UE served by the migrating IAB-node to the first donor device, so that the first donor device forwards the second RRC reconfiguration message to the migrating IAB-node by using the first TNL address the second TNL address via the first F1-C connection. Therefore, after receiving the second RRC reconfiguration message, the migrating IAB-node may transmit the second RRC reconfiguration message to its served UE.

In addition, the migrating IAB-node may further receive a second RRC reconfiguration complete message transmitted by its served UE, and transmit the second RRC reconfiguration complete message to the second donor device via the second F1-C connection by using the third TNL address or the fourth TNL address.

Therefore, the second donor device may further receive the second RRC reconfiguration complete message transmitted by the migrating IAB-node by using the third TNL address via the second F1-C connection, or receive the second RRC reconfiguration complete message transmitted by the migrating IAB-node by using the fourth TNL address via the second F1-C connection.

In the above embodiment, as an example, since the first donor device allocates the third TNL address, the first donor device may further transmit the third TNL address used for the second F1-C connection of the migrating IAB-node to the second donor device. Therefore, the second donor device may setup the second F1-C connection with the migrating IAB-node.

In the above embodiment, as another example, the first donor device may transmit a third TNL address used for the second F1-C connection of the migrating IAB-node to the second donor device, receive the second TNL address used for the first F1-C connection of the migrating IAB-node transmitted by the second donor device, and add the second TNL address for the first F1-C connection of the migrating IAB-node. Therefore, the second donor device may setup the second F1-C connection with the migrating IAB-node, and add a transmission path of the first F1-C traffic at the first donor device, thereby making transmission of the first F1-C traffic more flexible.

In the above embodiment, the first donor device may further receive the sixth TNL address used for the F1-U connection of the migrating IAB-node transmitted by the second donor device, and add the sixth TNL address for the F1-U connection of the migrating IAB-node. For example, the first donor device may transmit a second message to the migrating IAB-node via the first F1-C connection by using the first TNL address or the second TNL address, the second message may include the sixth TNL address used for the F1-U connection, and/or a BAP routing identifier and a backhaul RLC channel identifier used for the F1-U connection. Therefore, the migrating IAB-node may update the fifth TNL address used for its F1-U connection to the sixth TNL address, so that a transmission path of the F1-U traffic may be added at the first donor device, and transmission of the F1-U traffic may be more flexible.

In the above embodiment, if the second donor does not indicate to setup the second F1-C connection when the migrating IAB-node adds the air-interface connection with the second donor device, after a period of time that the migrating IAB-node adds the air-interface connection with the second donor, the first donor device may further transmit a third RRC reconfiguration message to the migrating IAB-node, the third RRC reconfiguration message including the third TNL address. After receiving the third RRC reconfiguration message, the migrating IAB-node may setup the second F1-C connection with the CU of the second donor device.

Figure 17A:
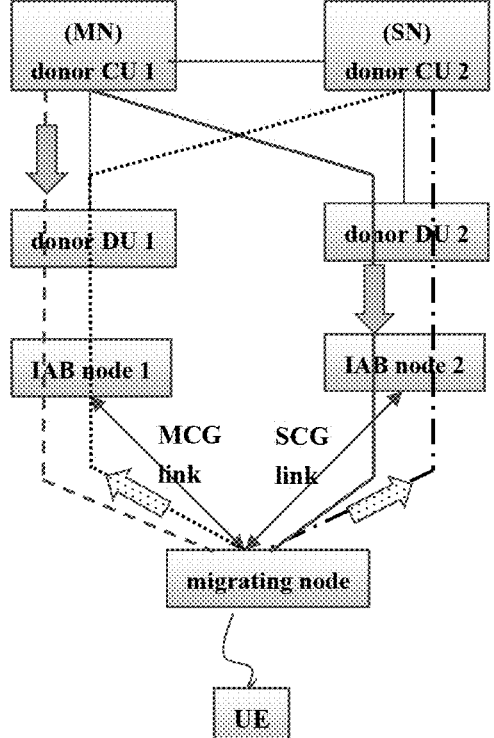
FIGS. 17a and 17b are schematic diagrams of yet another scenario of the group migrating method of the embodiment of this disclosure.
Figure 17B:
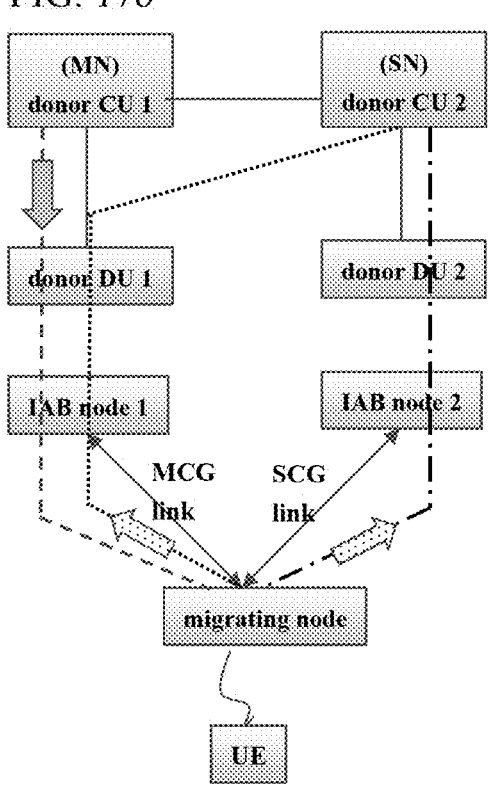
Figure 18:
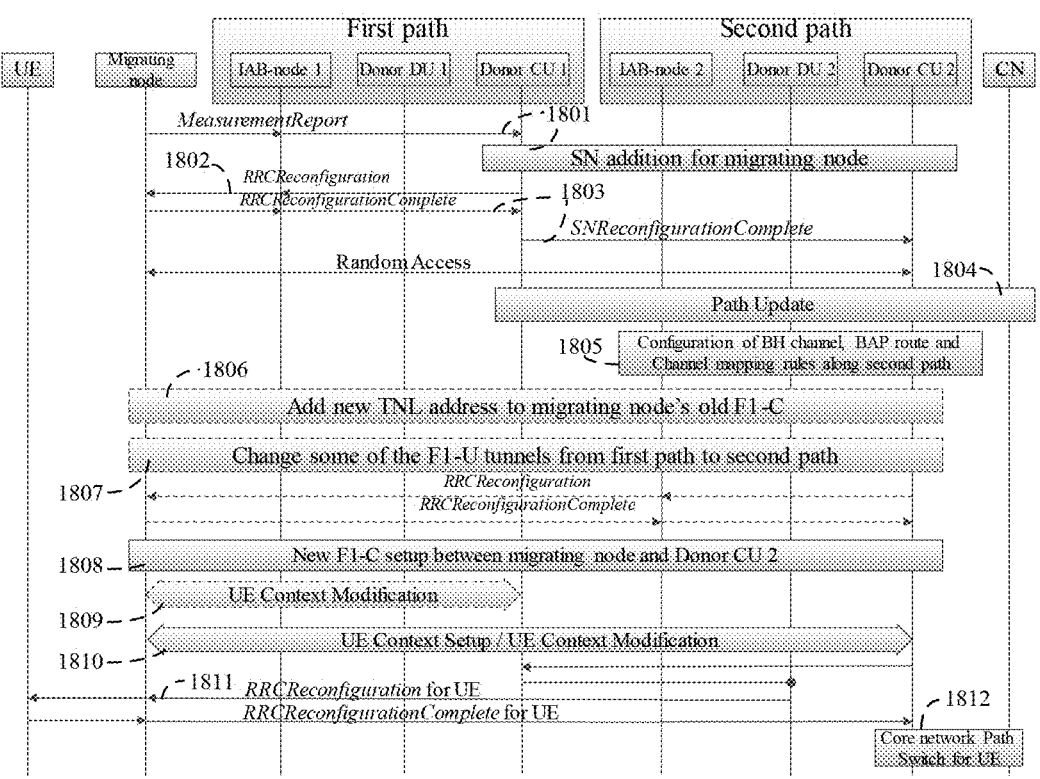
FIG. 18 is a schematic diagram of information exchange in the scenario shown in FIGS. 17a and 17b.

FIGS. 17a and 17b are exemplary diagrams of application scenarios of the above embodiment, and FIG. 18 is a schematic diagram of information exchange of the above embodiment. The above embodiment shall be explained below with reference to FIGS. 17a, 17b and 18.

As shown in FIGS. 17a and 17b, a new transmission path is added when the migrating node moves from donor 1 to donor 2, and dual connection with donor 1 and donor 2 is maintained, i.e. SCG connection with donor 2 is setup, and the connection with donor 1 becomes MCG connection. In the examples in FIGS. 17a, 17b and 18, the migrating node sets up new F1-C with donor 2 via a new transmission path or an original transmission path. A new transmission path may be added to the old F1-C. The migrating node sets up the SCG connection with donor 2 first, and then sets up the new F1-C. As a handover complete message of the UE needs to be transmitted to donor 2 via the new F1-C, the UE may only migrate to donor 2 after the migrating node sets up the SCG connection with donor 2.

As shown in FIG. 18, the information exchange process includes:

1801: the migrating node transmits a measurement report to donor CU 1, and donor CU 1 determines to initiate a secondary node addition request to donor CU 2 according to the measurement report, transmits contexts of the migrating node and its served UE to donor CU 2, thus donor CU 2 sets up a context for the migrating node in IAB-node 2, and then transmits a secondary node addition request response to donor CU 1, the response carrying an RRCReconfiguration message.

1802: donor CU 1 transmits the RRCReconfiguration message for the migrating node carried in the response to the migrating node after receiving the secondary node addition request response.

As the SCG connection to donor 2 is added, the message includes the BAP address allocated by donor 2 to the migrating node. The new F1-C may be setup via the new transmission path (i.e. the migrating node→IAB-node 2→donor DU 2) and a backhaul link from the migrating node to IAB-node 2 needs to be added, the message further includes BH RLC channel configuration from the migrating node to IAB-node 2; and as the new transmission path (i.e.

the migrating node→IAB-node 2→donor DU 2→donor CU 1) needs to be added, the message further adds (or updates) BAP routing and BH RLC channel configuration for F1-C traffic and non-F1 traffic. If the old F1-C traffic is transmitted via the new path, there are two transmission modes:

mode 1: transmitting the F1-C traffic via a signaling radio bearer (SRB); and mode 2: transmitting the F1-C traffic via a BH RLC channel.

In addition, if IAB-node 2 is added as an access anchor point for the old F1 connection, old F1 traffic are forwarded via donor DU 2 and IAB-node 2 under donor 2, and donor 2 configures the migrating node with a subnet address adaptive to donor DU 2. Therefore, donor CU 2 adds a TNL address used for the old F1-C for the migrating node. F1AP signaling of the UE is transmitted via the old F1-C, and after the transmission path is added to the old F1-C, signaling of some UEs may be transmitted via the original path, while signaling of some other UEs may be transmitted via the new path.

In addition, F1-U of some or all UEs are further transferred from the original path to the new path (i.e. the migrating node→IAB-node 2→donor DU 2→donor CU 1 or donor DU 2). In order to reduce signaling transmission latency and minimize interruption times of F1-U transmission, the RRC message may further include TNL addresses used for the F1-U connection, so that the migrating node may immediately transfer the F1-U traffic to the new path for transmission. In addition, BAP routing and BH RLC channel mapping relations for the F1-U connection may further be configured. For example, specifically, the BAP routing used for an RLC channel of each UE may be configured in the message, and a UE ID and a corresponding relationship between an RLC channel of the UE and a backhaul RLC channel of the migrating node may also be configured.

In addition, there are two cases for setting up the new F1-C.

Case 1: the new F1-C is setup immediately after the migrating node is accessed to donor 2. Hence, the RRC reconfiguration message further includes the TNL address used for the new F1-C to indicate to setup the new F1-C.

Case 2: after the migrating node is accessed to donor 2, the UE is not immediately migrated, hence, the new F1-C may be setup after a period of time that the migrating node is completed. The TNL address used for the new F1-C is included in subsequent RRC reconfiguration message, as shown in an RRC reconfiguration process after operation 1807 in FIG. 18.

1803: the migrating node transmits RRC reconfiguration complete message to donor CU 1, and donor CU 1 transmits secondary node reconfiguration complete message to donor CU 2;

1804: donor CU 2 initiates core network path update for the migrating node after receiving the secondary node reconfiguration complete message and the random access process of the migrating node being completed;

1805: as traffic of the new F1-C, old F1-C and F1-U of the migrating node need all to be transmitted via the new path, donor CU 2 updates the BH RLC channel configuration, BAP layer routing and BH RLC channel mapping relation configuration for nodes on the new path after receiving a secondary node reconfiguration complete message and the random access process of the migrating node being completed.

In the above embodiments. operation 1805 may be executed immediately after operation 1801; however, this disclosure is not limited thereto.

1806: if the old F1-C is transmitted via both the original path and the new path, a TNL address is added for the old F1-C, and some or all UE signaling in the old F1-C are transferred to the new path;

for example, the old F1-C is transmitted by a signaling radio bearer SRB from the migrating node to IAB-node 2, or, the old F1-C is transmitted via a BH RLC channel from the migrating node to IAB-node 2;

1807: if operation 1802 includes TNL configuration for F1-U connection, a TNL address is added for the F1-U connection, and DRBs of a part of UEs of the F1-U connection are transferred to the new path;

1808: the migrating node sets up new F1-C with donor CU 2 by using a TNL address indicating setting up new F1-C;

1809: if the RRC reconfiguration message in operation 1802 does not include configuration information of the F1-U, donor CU 1 transmits an F1AP message, i.e. UE context modification, to the migrating node via the old F1-C; the TNL address is added for the F1-U connection via this message, a new path may be added to the F1-U connection, and the BAP routing and BH RLC channel mapping relation of the F1-U connection may further be modified via this message; for example, specifically, BAP routing used for an RLC channel of each UE may be configured, and a UE ID and a corresponding relationship between an RLC channel of the UE and a backhaul RLC channel of the migrating node may also be configured.

In the above embodiments, operation 1809 may be executed immediately after operation 1805; however, this disclosure is not limited thereto.

1810: in order to migrate the UE to donor 2, a context of the UE is setup in the new F1-C of the migrating node, so that the UE has a context respectively in the old F1-C and the new F1-C, that is, for the UE, there is F1AP signaling connection respectively between the migrating node and donor CU 1 and between the migrating node and donor CU 2. The F1AP signaling connection with donor CU 1 is used to transmit the RRC reconfiguration message to the UE, and the F1AP signaling connection with donor DU 2 is used to receive the RRC reconfiguration complete message of the UE.

There are three methods for setting up the context of the UE in the new F1-C of the migrating node.

Method 1: donor CU 2 sets up a new UE context by transmitting F1AP message UE context setup request to the migrating node via the new F1-C, and the migrating node allocates a C-RNTI for the UE and transmits the C-RNTI to donor CU 2 via a UE context setup response.

In method 1, the UE context setup includes F1-U configuration for the DRB of the UE, and an F1-U may be configured at the donor CU 1 side, in such a case, the DRB of the UE uses a UL TNL address of donor CU 1; and the F1-U may also be configured at the donor DU 2 side, and in such a case, the DRB of the UE uses the UL TNL address of donor CU 2, thereafter, the migrating node hands the F1-U of the UE from donor CU 1 over to donor CU 2.

Method 2: donor DU 2 sets up a new UE context by transmitting an F1AP message, i.e. UE context modification, to the migrating node via the new F1-C.

In method 2, the UE context modification carries the context identifier of the UE in the old F1-C, and the migrating node may obtain the UE context in the old F1-C according to the context identifier of the UE and setup a new UE context in the new F1-C by using the UE context.

In method 2, as the serving cell identifier needs to be changed when the migrating node is handed over to donor 2, the UE context modification may reconfigure the serving cell identifier of the UE, and the migrating node replaces a serving cell identifier in the original UE context with this cell identifier.

In method 2, the C-RNTI may be changed when the UE changes the serving cell, hence, the migrating node allocates a new C-RNTI for the UE and replaces the original C-RNTI with the new C-RNTI. The migrating node transmits the new C-RNTI to donor DU 2 via the UE context setup response. In this way, by using the original UE context to setup a new one, signaling overhead may be saved.

In method 2, the F1-U configuration may be modified in the UE context modification, and the modified F1-U may still be at the donor CU 1 side. In such a case, the DRB of the UE uses the UL TNL address of donor CU 1, and the F1-U may be handed over from donor CU 1 to donor DU 2 side. In such a case, the DRB of the UE uses the UL TNL address of donor CU 2, and thereafter, the migrating node transmits the DRB data of the UE to donor CU 2.

Method 3: donor CU 2 sets up a new context for the UE by transmitting an F1 setup response message in setting up new F1-C with the migrating node.

In method 3, the F1 setup response may carry context identifiers of multiple UEs in the old F1-C, and the migrating node may obtain the UE context under the old F1-C according to the context identifiers of the UEs and setup a new context of the UE in the new F1-C by using the UE context. The F1 setup response may further include serving cell identifiers of multiple UEs, and the migrating node may replace a serving cell identifiers in the original UE context with the cell identifiers. In this way, by setting up the new context by using the original context of the UE when setting up the F1, a process of separately setting up a context for each UE may be eliminated, thereby saving signaling overhead and signaling latency.

1811: the UE for which the context is setup is migrated to donor 2, and an RRC reconfiguration message is transmitted to the UE via the old F1-C.

In the above embodiments, operation 1811 may be executed immediately after operation 1801; however, this disclosure is not limited thereto.

In operation 1811, the old F1-C traffic may be forwarded either via the original path or via the new path. For example, a transmitting path of the RRC reconfiguration message of the UE is donor CU 2→donor CU 1→donor DU 2→IAB-node 2→the migrating node.

In operation 1811, after migration, the RRC reconfiguration complete message of the UE is forwarded to donor CU 2 via the original path or new path of the new F1-C, such as the migrating node→IAB-node 2→donor DU 2→donor CU 2.

In operation 1812: donor CU 2 initiates core network path handover for UE after receiving the RRC reconfiguration of the UE.

With the method of the above embodiment, the second donor device configures the TNL address used for the first F1-C connection via the RRC message to indicate to add the TNL address used for the first F1-C connection, so that the first F1-C traffic may be forwarded via the DUs of the first donor and the second donor simultaneously, thereby improving flexibility of transmission of the first F1-C traffic; or, the second donor device may configure the TNL address used for the second F1-C connection via the RRC message, so that the migrating IAB-node sets up the second F1-C connection immediately after adding the air-interface connection with the second donor device, thereby achieving migration of the UE. In addition, when the UE context is setup in the second F1-C connection, the migrating node obtains the first context of the UE via the first context identifier of the UE in the first F1-C connection only and setup the second context of the UE by reusing the first context, without needing to use an existing UE context setup message, which may lower signaling overhead and latency in setting up the UE context, and improve signaling efficiency.

In some embodiments, the migrating IAB-node maintains the air-interface connection with the first donor device and adds an air-interface connection with the second donor device, and the migrating node sets up a second F1-C connection before adding the air-interface connection with the second donor device. The second donor device adds a fourth TNL address used for the second F1-C connection for the migrating IAB-node, or, the second donor device adds a fourth TNL address used for the second F1-C connection for the migrating IAB-node, and adds a second TNL address used for a first F1-C connection for the migrating IAB-node.

For example, the second donor device transmits a first RRC reconfiguration message for the migrating IAB-node to the first donor device, so that the first donor device forwards the first RRC reconfiguration message to the migrating IAB-node.

The first RRC reconfiguration message includes secondary cell group (SCG) configuration information and a fourth TNL address used for the second F1-C connection. Hence, the migrating IAB-node may add a fourth TNL address for the second F1-C connection; or, the first RRC reconfiguration message includes secondary cell group (SCG) configuration information, a fourth TNL address used for the second F1-C connection and a second TNL address used for the first F1-C connection. Hence, the migrating IAB-node may add a fourth TNL address for the second F1-C connection, and add a second TNL address for the first F1-C connection.

According to the method of the above embodiment, the second donor device configures the TNL address used for the second F1-C connection via the RRC message to indicate to add the TNL address used for the second F1-C connection, so that the second F1-C traffic may be forwarded via the DUs of both the first donor and the second donor, thereby improving flexibility of the forwarding of the second F1-C traffic; and furthermore, the second donor device configures the TNL address used for the first F1-C connection via the RRC message to indicate to add the TNL address used for the first F1-C connection, so that the first F1-C traffic may be forwarded via the DUs of both the first donor and the second donor, thereby improving flexibility of the forwarding of the second F1-C traffic.

In the above embodiment, the first RRC reconfiguration message may further include: a BAP address allocated to the migrating IAB-node; and/or, backhaul RLC channel configuration for a secondary cell group of the migrating IAB-node; a BAP routing identifier and a backhaul RLC channel identifier used for the second F1-C connection, a sixth TNL address added for the F1-U connection of the migrating IAB-node, so that the F1-U traffic may be forwarded via the DUs of both the first donor and the second donor; and a BAP routing identifier and a backhaul RLC channel identifier used for the F1-U connection of the migrating IAB-node.

In the above embodiment, before the second donor device transmits the first RRC reconfiguration message for the migrating IAB-node to the first donor device, the CU of the second donor device may further transmit the first message to the DU of the migrating IAB-node via the second F1-C connection by using the third TNL address or the fourth TNL address, so that the migrating IAB-node sets up a second context for its served UE according to the first message.

As an example, the first message includes a first context identifier of the UE, so that the migrating IAB-node may obtain the first context of the UE according to the first context identifier, and setup a second context of the UE by reusing the first context, the first message may be an F1 setup response or a UE context modification request message.

As another example, the first message may further include serving cell configuration information of the UE, so that the migrating IAB-node updates serving cell configuration of the UE.

In the above embodiment, before the migrating IAB-node receives the first RRC reconfiguration message, the first donor device further transmits a third RRC reconfiguration message to the migrating IAB-node, the third RRC reconfiguration message including the third TNL address used for the second F1-C connection. Hence, after receiving the third RRC reconfiguration message, the migrating IAB-node may setup the second F1-C connection with the CU of the second donor device by using the third TNL address, thereby achieving migration of the UE.

In the above embodiment, in migrating the UE, the second donor device may further transmit a second RRC reconfiguration message for the UE served by the migrating IAB-node to the first donor device, so that the first donor device forwards the second RRC reconfiguration message to the migrating IAB-node by using the first TNL address via the first F1-C connection. Hence, after receiving the second RRC reconfiguration message, the migrating IAB-node may transmit the second RRC reconfiguration message to its served UE.

Furthermore, the migrating IAB-node may receive a second RRC reconfiguration complete message transmitted by its served UE. If the second RRC reconfiguration complete message for the UE served by the migrating IAB-node is transmitted before the migrating node adds the air-interface connection, the second RRC reconfiguration complete message is transmitted to the second donor device via the first F1-C connection by using the third TNL address; and if the second RRC reconfiguration complete message for the UE served by the migrating IAB-node is transmitted after the migrating node adds the air-interface connection, the second RRC reconfiguration complete message is transmitted to the second donor device via the second F1-C connection by using the third TNL address or the fourth TNL address.

Therefore, the second donor device may further receive the second RRC reconfiguration complete message transmitted by the migrating IAB-node by using the third or the fourth TNL address via the second F1-C connection.

In the above embodiment, as an example, as the first donor device allocates the third TNL address, the first donor device may further transmit a third TNL address used for the second F1-C connection of the migrating IAB-node to the second donor device. Therefore, the second donor device may setup the second F1-C connection with the migrating IAB-node.

In the above embodiment, as another example, the first donor device may transmit a third TNL address used for the second F1-C connection of the migrating IAB-node to the second donor device, receive the second TNL address used for the first F1-C connection of the migrating IAB-node transmitted by the second donor device, and add the second TNL address for the first F1-C connection of the migrating IAB-node. Hence, the second donor device may setup the second F1-C connection with the migrating IAB-node and add a transmission path of the first F1-C traffic at the first donor device side, thereby improving flexibility of forwarding the first F1-C traffic.

In the above embodiment, the first donor device may further receive a sixth TNL address used for the F1-U connection of the migrating IAB-node transmitted by the second donor device, and add the sixth TNL address for the F1-U connection of the migrating IAB-node. For example, the first donor device may transmit a second message to the migrating IAB-node via the first F1-C connection by using the first TNL address or the second TNL address, the second message including the sixth TNL address used for the F1-U connection, and/or, a BAP routing identifier and a backhaul RLC channel identifier used for the F1-U connection. Hence, the migrating IAB-node may update the fifth TNL address used for its F1-U connection to the sixth TNL address, and add a transmission path of the F1-U traffic at the first donor device side, thereby improving flexibility of forwarding the F1-U traffic.

Figure 19A:
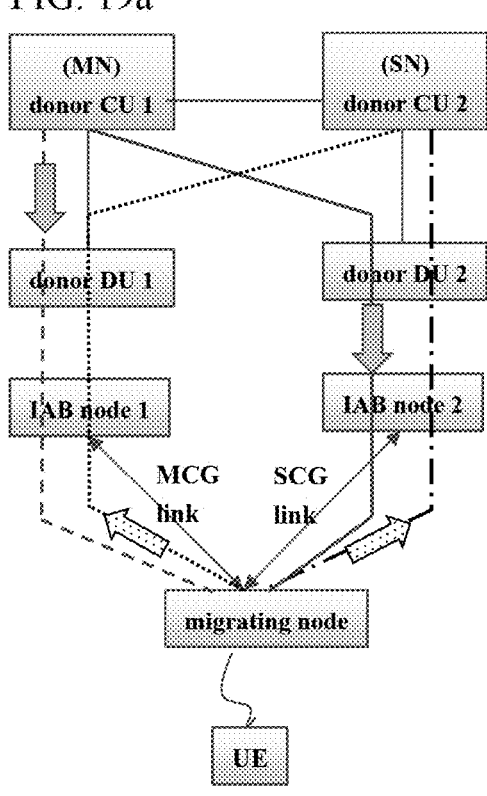
FIGS. 19a and 19b are schematic diagrams of yet further scenario of the group migrating method of the embodiment of this disclosure.
Figure 19B:
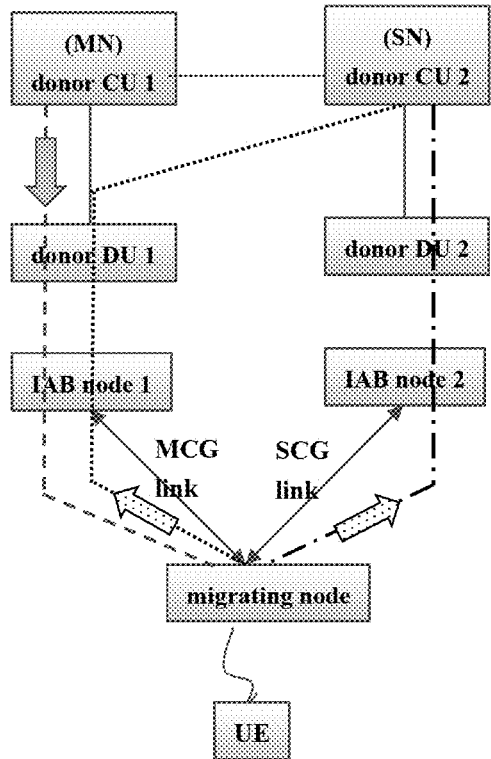
Figure 20:
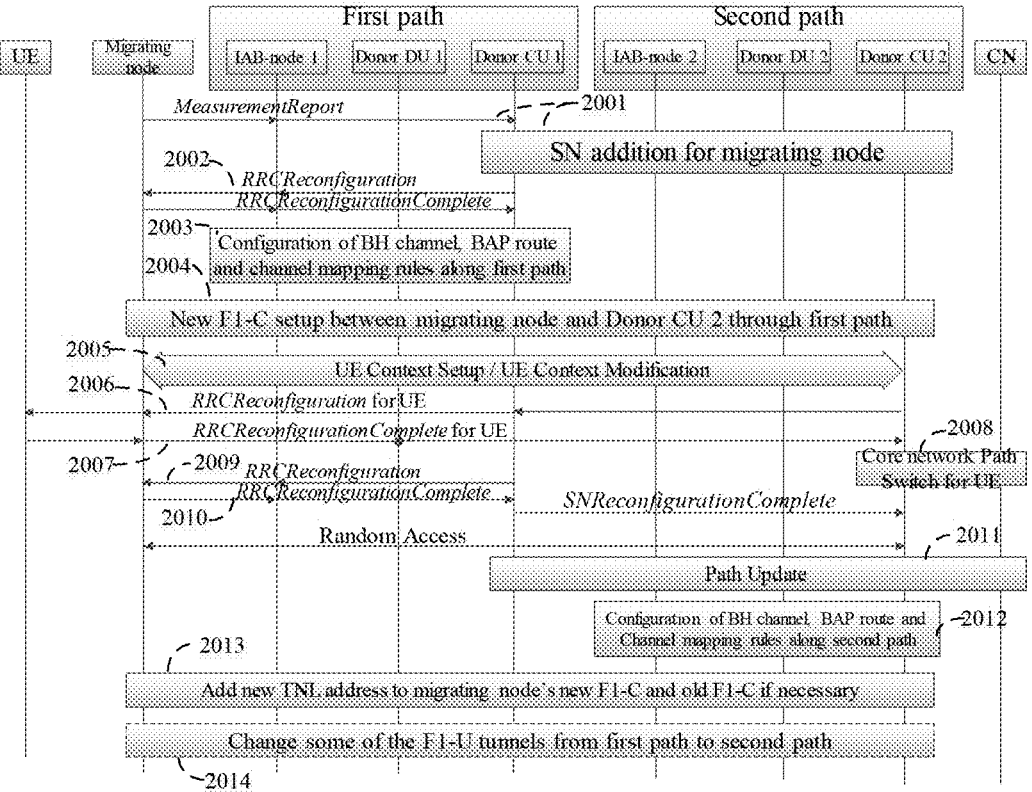
FIG. 20 is a schematic diagram of information exchange in the scenario shown in FIGS. 19a and 19b.

FIGS. 19a and 19b are exemplary diagrams of application scenarios of the above embodiment, and FIG. 20 is a schematic diagram of information exchange of the above embodiment. The above embodiment shall be explained below with reference to FIGS. 19a, 19b and 20.

As shown in FIGS. 19a and 19b, a new transmission path is added when the migrating node moves from donor 1 to donor 2, and dual connection with donor 1 and donor 2 is maintained, i.e. SCG connection with donor 2 is setup, and the connection with donor 1 becomes MCG connection. In the examples in FIGS. 19a, 19b and 20, new F1-C connection with donor 2 is setup via an original transmission path, and then a new transmission path is added to the new F1-C. A new transmission path may be added to the old F1-C. As the new F1-C is setup via the original path, UE may be migrated to donor 2 before the SCG connection between the migrating node and donor 2 is setup.

As shown in FIG. 20, the information exchange process includes:

2001: the migrating node transmits a measurement report to donor CU 1, and donor CU 1 determines according to the measurement report to initiate a secondary node addition request to donor CU 2, transmits contexts of the migrating node and its served UE to donor CU 2, thus donor CU 2 sets up a context for the migrating node in IAB-node 2, and then transmits a secondary node addition request response to donor CU 1, the response carrying an RRCReconfiguration message.

2002: donor CU 1 transmits the RRCReconfiguration message for the migrating node carried in the response after receiving the secondary node addition request response, so as to setup new F1-C. The RRCReconfiguration message includes a TNL address used for the new F1-C and indicates to setup new F1-C, so as to indicated to setup new F1-C. The migrating node transmits an RRCReconfiguration complete message to donor CU 1.

2003: as it is needed to setup new F1-C with donor CU 2 via the original path (i.e. the migrating node→IAB-node 1→donor DU 1→donor CU 2), donor CU 1 configures a BH RLC channel, a BAP layer route and a BH RLC channel mapping relation for nodes on the original path after receiving the RRC reconfiguration complete message of the migrating node.

In the above embodiments, operation 2003 may be executed immediately after operation 2001; however, this disclosure is not limited thereto.

2004: the migrating node sets up a new F1-C with donor CU 2 by using the TNL address indicating to setup new F1-C.

In the above embodiments, there are two types of transmission of the new F1-C via the new path, namely:

1) transmitting the F1-C traffic via a signaling radio bearer SRB; and 2) transmitting the F1-C traffic via the BH RLC channel.

2005: in order to migrate the UE to donor 2, the context of the UE is setup in the new F1-C of the migrating node, thus, the UE has a context in the old F1-C and the new F1-C, respectively, that is, for the UE, there is F1AP signaling connection between the migrating node and donor CU 1 and between the migrating node and donor CU 2, respectively. The F1AP signaling connection with donor CU 1 is used to transmit the RRC reconfiguration message to the UE, and the F1AP signaling connection with donor DU 2 is used to receive the RRC reconfiguration complete message of the UE.

There are three methods for setting up the context of the UE in the new F1-C of the migrating node.

Method 1: donor CU 2 transmits an F1AP message. i.e. a UE context setup request, to the migrating node via the new F1-C, so as to setup new context of the UE.

In method 1, the migrating node allocates a C-RNTI for the UE, and transmits the C-RNTI to donor DU 2 via a UE context setup response.

In method 1, the UE context setup request includes F1-U configuration for the DRB of the UE, the F1-U may be configured at donor CU 1, in such a case, the DRB of the UE uses a UL TNL address of donor CU 1; and the F1-U may also be configured at donor DU 2, in such a case, the DRB of the UE uses a UL TNL address of donor CU 2, and thereafter, the migrating node transfers the F1-U of the UE from donor CU 1 to donor CU 2.

Method 2: donor CU 2 transmits an F1AP message, i.e. UE context modification, to the migrating node via the new F1-C, so as to setup new context of the UE.

In method 2, the UE context modification carries a context identifier of the UE in the old F1-C, and the migrating node may obtain a UE context under the old F1-C according to the context identifier of the UE and setup a new UE context in the new F1-C by using the UE context under the old F1-C.

In method 2, as it is needed to change a serving cell ID when the migrating node migrates to node 2, the UE context modification message may configure a serving cell ID of the UE, and the migrating node replaces a serving cell ID in the original UE context with this cell ID.

In method 2, the change of the serving cell of the UE may change the C-RNTI, hence, the migrating node allocates a new C-RNTI for the UE and replaces the original C-RNTI with the new C-RNTI. The migrating node transmits the new C-RNTI to donor DU 2 via the UE context setup response. In this way, by using the original UE context to setup a new one, signaling overhead may be saved.

In method 2, the F1-U configuration may be modified in the UE context modification, and the modified F1-U may still be at the donor CU 1 side. In such a case, the DRB of the UE uses the UL TNL address of donor CU 1, and the F1-U may be handed over from donor CU 1 to donor DU 2. In such a case, the UE DRB uses the UL TNL address of donor CU 2, and thereafter, the migrating node transmits the DRB data of the UE to donor CU 2.

In this above embodiments, in operation 2005, if the F1-U of the UE is handed over from donor CU 1 to donor DU 2, the F1-U traffic needs to be transmitted via the original path with donor CU 2, that is, the transmission path is: the migrating node→IAB-node 1→donor DU 1→donor CU 2).

Method 3: donor DU 2 sets up a new context for the UE by transmitting an F1 setup response message in setting up new F1-C with the migrating node.

In method 3, the F1 setup response may carry context identifiers of multiple UEs in the old F1-C, and the migrating node may obtain the UE context under the old F1-C according to the context identifiers of the UEs and sets up a new context of the UE in the new F1-C by using the UE context under the old F1-C. The F1 setup response may further include serving cell identifiers of multiple UEs, and the migrating node replaces a serving cell identifiers in the original UE context with the cell identifiers. In this way, by setting up the new context by using the original context of the UE in setting up F1, a process of separately setting up a context for each UE may be eliminated, thereby saving signaling overhead and signaling latency.

2006: the UE for which the context is setup is migrated to donor 2, and donor CU 1 transmits an RRC reconfiguration message to the UE via the original path of the old F1-C, that is, donor CU 1→donor DU 1→IAB-node 1→the migrating node.

In the above embodiments, operation 2006 may be executed immediately after operation 2001; however, this disclosure is not limited thereto.

In operation 2006, after migration, the UE transmits the RRC reconfiguration complete message to donor CU 2 via the new F1-C, and if the RRC reconfiguration complete message is transmitted before addition of new air-interface connection, it is needed to be forwarded via donor DU 1 and IAB-node 1 under donor 1, that is, the transmission path is: the migrating node— IAB-node 1→donor DU 1 donor CU 2; and if the RRC reconfiguration complete message is transmitted after addition of the new air-interface connection, it is forwarded via the DUs of donor 1 and donor 2 simultaneously.

2007: donor CU 2 initiates core network path handover for the UE after receiving the RRC reconfiguration complete message of the UE.

2008: donor CU 1 transmits the RRCReconfiguration message carried in the secondary node addition request response to the migrating node.

In the above embodiment, as the SCG connection to donor 2 is added, the message includes the BAP address allocated by donor 2 to the migrating node. The new F1-C traffic is transmitted via the new transmission path (i.e. the migrating node→IAB-node 2→donor DU 2) and a backhaul link from the migrating node to IAB-node 2 is added. Hence, the message further includes BH RLC channel configuration from the migrating node to IAB-node 2. Furthermore, as the new transmission path (i.e. the migrating node→IAB-node 2→donor DU 2→donor CU 1) needs to be added, the message further adds (or updates) BAP routing and BH RLC channel configuration for F1-C traffic and non-F1 traffic.

In the above embodiment, if the old F1-C traffic is transmitted via the new path, there are two transmission modes:

mode 1: transmitting the F1-C traffic via a signaling radio bearer (SRB); and mode 2: transmitting the F1-C traffic via a BH RLC channel.

In addition, if IAB-node 2 is added as an access anchor point for the F1 connection, the F1 traffic are forwarded via donor DU 2 and IAB-node 2 under donor 2, and it is needed to configure the migrating node with a subnet address adaptive to donor DU 2. Therefore, donor CU 2 needs to add a TNL address used for the F1-C for the migrating node.

That is, when F1AP signaling of the UE is transmitted via the new F1-C, if the new F1-C should be added a TNL address and the new F1-C is added a path, signaling of some UEs may be transmitted via the original path, while signaling of some other UEs may be transmitted via the new path.

In 2008, F1-U traffic of some or all UEs are also transferred from the original path to the new path (i.e. the migrating node→IAB-node 2→donor DU 2→donor CU 1 or donor CU 2). In order to reduce signaling transmission latency and minimize interruption times of F1-U transmission, the RRC message may further include TNL addresses used for the F1-U connection, so that the migrating node may immediately transfer the F1-U traffic to the new path transmission. In addition, BAP routing and BH RLC channel mapping relations used for the F1-U connection may further be configured. For example, specifically, the BAP routing used by an RLC channel of each UE may be configured in the message, and a UE ID and a corresponding relationship between an RLC channel of the UE and a backhaul RLC channel of the migrating node may also be configured.

2009: the migrating node transmits the RRC reconfiguration complete message to donor CU 1, and donor CU 1 transmits secondary node reconfiguration complete message to donor CU 2.

2010: donor CU 2 initiates core network path update for the migrating node after receiving the secondary node reconfiguration complete message and random access request of the migrating node.

2011: as the traffic of the new F1-C and the F1-U of the migrating node need to be transmitted via the new path, donor CU 2 updates BH RLC channel configuration, a BAP layer route and BH RLC channel mapping relation configuration for a node on the new path after receiving the secondary node reconfiguration complete message and the random access request of the migrating node.

In the above embodiments, operation 2011 may be executed immediately after operation 2001; however, this disclosure is not limited thereto.

2012: a TNL address is added for the new F1-C, some or all UE signaling of the new F1-C are transferred to the new path. If the old F1-C traffic may be transmitted via the new path, a TNL address is added for old F1-C, and some or all UE signaling of the old F1-C are transferred to the new path.

For example, the old F1-C traffic is transmitted via the signaling radio bearer SRB from the migrating node to IAB-node 2; or, the old F1-C traffic is transmitted via the BH RLC channel from the migrating node to IAB-node 2.

2013: if operation 2008 includes TNL configuration of the F1-U connection, a TNL address is added for the F1-U connection, and the migrating node transfers the DRBs of a part of UEs of the F1-U to the new path.

According to the method of the above embodiment, when the air-interface connection with the second donor device is added to the migrating IAB-node, the second donor device configures the TNL address used for the second F1-C connection via the RRC message to indicate to add a TNL address used for the second F1-C connection, so that the second F1-C traffic may be forwarded via the DUs of both the first donor and the second donor, thereby improving flexibility of the forwarding of the second F1-C traffic. In addition, the second donor device further configures the TNL address used for the first F1-C connection via the RRC message to indicate to add the TNL address used for the first F1-C connection, so that the first F1-C traffic may be forwarded via the DUs of both the first donor and the second donor, thereby improving flexibility of the forwarding of the second F1-C traffic. And furthermore, in setting up the UE context in the second F1-C connection, the migrating node needs only to obtain the first context of the UE via the first context identifier of the UE in the first F1-C connection and sets up the second context of the UE by reusing the first context, without needing to use an existing UE context setup message, which may lower signaling overhead and latency in setting up the UE context, and improve signaling efficiency.

It should be noted that FIGS. 9-20 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIGS. 9-20.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

According to the method of the embodiment of this disclosure, as mentioned earlier, on the one hand, payload balance between donor devices are achieved, and on the other hand, forwarding paths of the original F1-C connection and the new F1-C connection are optimized.

Embodiment of a Second Aspect

The embodiment of this disclosure provides a group migrating apparatus.

Figure 21:
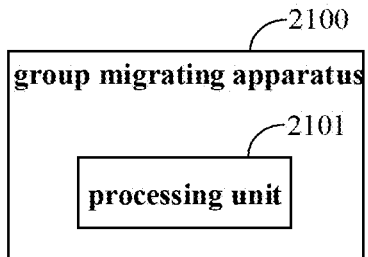
FIG. 21 is a schematic diagram of the group migrating apparatus of an embodiment of this disclosure.

FIG. 21 is a schematic diagram of the group migrating apparatus of the embodiment of this disclosure. The apparatus may be, for example, a donor device in an IAB system, or one or some components or assemblies configured in the donor device. The IAB system includes a donor device and an IAB-node. The IAB-node moves from a first donor device to a second donor device. The embodiment of this disclosure shall be explained from a side of the second donor device, wherein, an implementation principle of the group migrating apparatus in the embodiment of this disclosure is similar to the implementation of the second donor device in the embodiment of the first aspect, with identical parts being not going to be repeated herein any further.

As shown in FIG. 21, the group migrating apparatus 2100 of the embodiment of this disclosure includes:

a processing unit 2101 configured to, when a migrating IAB-node moves from the first donor device to the second donor device, perform at least one of the following processing:

enabling the migrating IAB-node to update a first TNL address used for a first F1-C connection to a second TNL address;

enabling the migrating IAB-node to update a third TNL address used for a second F1-C connection to a fourth TNL address;

configuring the migrating IAB-node with a fourth TNL address used for setting up a second F1-C connection;

adding for the migrating IAB-node the second TNL address used for a first F1-C connection;

configuring the migrating IAB-node with the third TNL address used for setting up a second F1-C connection; and adding for the migrating IAB-node the fourth TNL address used for a second F1-C connection;

wherein the first F1-C connection is F1 connection between a DU of the migrating IAB-node and a CU of the first donor device, the second F1-C connection is F1 connection between the DU of the migrating IAB-node and a CU of the second donor device, the first TNL address and the third TNL address are TNL addresses routable to the DU of the first donor device, and the second TNL address and the fourth TNL address are TNL addresses routable to the DU of the second donor device.

In the embodiment of this disclosure, that the migrating IAB-node moves from the first donor device to the second donor device refers to one of the following cases:

case 1: the migrating IAB-node is connection reestablished to the second donor device when a radio link failure occurs in a backhaul link of the migrating IAB-node under the first donor device;

case 2: the migrating IAB-node is handed over from the first donor device to the second donor device; and case 3: the migrating IAB-node maintains connection with the first donor device and adds an air interface connection with the second donor device.

In case 1, when the radio link failure occurs in the backhaul link of the migrating IAB-node under the first donor device, the processing unit 2101 performs the following processing:

enabling the migrating IAB-node to update the first TNL address used for the first F1-C connection to the second TNL address; and configuring the migrating IAB-node with the fourth TNL address used for setting up the second F1-C connection.

In the above embodiment, after the migrating IAB-node is connection reestablished to the second donor device, the processing unit 2101 transmits a first RRC reconfiguration message to the migrating IAB-node, the first RRC reconfiguration message containing the second TNL address used for the first F1-C connection, or the first RRC reconfiguration message containing the second TNL address used for the first F1-C connection and the fourth TNL address used for the second F1-C connection.

In some embodiments, the first RRC reconfiguration message further includes at least one of the following:

a BAP address allocated to the migrating IAB-node;

backhaul RLC channel configuration of the migrating IAB-node, and a default BAP routing identifier and default backhaul RLC channel identifier used for F1-C traffic and non-F1 traffic;

a sixth TNL address used by the migrating IAB-node to update the fifth TNL address used for its F1-U connection to the sixth TNL address;

a BAP routing identifier and a backhaul RLC channel identifier used for the F1-U connection, wherein the fifth TNL address is a TNL address routable to the DU of the first donor device, and the sixth TNL address is a TNL address routable to the DU of the second donor device.

In the above embodiment, if the first RRC reconfiguration message does not include the fourth TNL address used for the second F1-C connection, after the second donor device transmits the first RRC reconfiguration message to the migrating IAB-node, the processing unit transmits a third RRC reconfiguration message to the migrating IAB-node, wherein, the third RRC reconfiguration message includes the fourth TNL address used for the second F1-C connection.

In the above embodiment, after the second donor device sets up the second F1-C connection with the migrating IAB-node, the processing unit 2101 (such as a CU configured in the second donor device) transmits a first message to the DU of the migrating IAB-node via the second F1-C connection by using the fourth TNL address, so that the migrating IAB-node sets up a second context for its served UE.

In some embodiments, the first message includes the first context identifier of the UE, so that the migrating IAB-node obtains the first context of the UE according to the first context identifier and sets up the second context by reusing the first context.

In some embodiments, the first message further includes serving cell configuration information of the UE.

In some embodiments, the processing unit 2101 transmits a second RRC reconfiguration message for the UE served by the migrating IAB-node to the first donor device, so that the first donor device forwards the second RRC reconfiguration message to the migrating IAB-node via the first F1-C connection by using the second TNL address; and furthermore, the processing unit 2101 further receives a second RRC reconfiguration complete message transmitted by the migrating IAB-node via the second F1-C connection by using the fourth TNL address.

In case 2, in a case that the migrating IAB-node is handed over from the first donor device to the second donor device, the processing unit 2101 performs the following processing:

configuring a fourth TNL address used for setting up the second F1-C connection for the migrating IAB-node; or, configuring a fourth TNL address used for setting up the second F1-C connection for the migrating IAB-node, and enabling the migrating IAB-node to update the first TNL address used for the first F1-C connection to the second TNL address.

In some embodiments, the processing unit 2101 transmits a first RRC reconfiguration message for the migrating IAB-node to the first donor device, so that the first donor device forwards the first RRC reconfiguration message to the migrating IAB-node, the first RRC reconfiguration message including a handover command and a fourth TNL address used for the second F1-C connection, or the first RRC reconfiguration message including a handover command and a second TNL address used for the first F1-C connection.

In some embodiments, the first RRC reconfiguration message further includes at least one of the following:

a BAP address allocated to the migrating IAB-node;

backhaul RLC channel configuration of the migrating IAB-node, and a default BAP routing identifier and default backhaul RLC channel identifier used for F1-C traffic and non-F1 traffic;

a sixth TNL address used by the migrating IAB-node to update a fifth TNL address of its F1-U connection to the sixth TNL address; and a BAP routing identifier and backhaul RLC channel identifier used for the F1-U connection of the migrating IAB-node;

wherein the fifth TNL address is a TNL address routable to the DU of the first donor device, and the sixth TNL address is a TNL address routable to the DU of the second donor device.

In some embodiments, if the first RRC reconfiguration message does not include the fourth TNL address used for the second F1-C connection, after the migrating IAB-node is handed over to the second donor, the processing unit 2101 transmits a third RRC reconfiguration message to the migrating IAB-node, the third RRC reconfiguration message including the fourth TNL address used for the second F1-C connection.

In some embodiments, after the second donor device sets up the second F1-C connection with the migrating IAB-node, the processing unit 2101 (such as a CU configured in the second donor device) transmits the first message to the DU of the migrating IAB-node via the second F1-C connection by using the fourth TNL address, so that the migrating IAB-node sets up the second context for its served UE.

In some embodiments, the first message includes the first context identifier of the UE, so that the migrating IAB-node obtains the first context of the UE according to the first context identifier and sets up the second context by reusing the first context.

In some other embodiments, the first message further includes serving cell configuration information of the UE.

In some embodiments, the processing unit 2101 transmits a second RRC reconfiguration message for the UE served by the migrating IAB-node to the first donor device, so that the first donor device forwards the second RRC reconfiguration message to the migrating IAB-node via the first F1-C connection by using the second TNL address or by using the first TNL address; and furthermore, the processing unit 2101 further receives a second RRC reconfiguration complete message transmitted by the migrating IAB-node via the second F1-C connection by using the fourth TNL address.

In case 2, in a case that the migrating IAB-node is handed over from the first donor device to the second donor device, the second donor device performs the following processing:

making the migrating IAB-node to update the third TNL address used for the second F1-C connection to the fourth TNL address.

In some embodiments, the processing unit 2101 transmits a first RRC reconfiguration message for the migrating IAB-node to the first donor device, so that the first donor device forwards the first RRC reconfiguration message to the migrating IAB-node, the first RRC reconfiguration message including a handover command and the fourth TNL address used for the second F1-C connection.

In some embodiments, the first RRC reconfiguration message further includes at least one of the following:

a BAP address allocated to the migrating IAB-node;

backhaul RLC channel configuration of the migrating IAB-node, and a default BAP routing identifier and default backhaul RLC channel identifier used for F1-C traffic and non-F1 traffic;

a sixth TNL address used by the migrating IAB-node to update a fifth TNL address of its F1-U connection to the sixth TNL address;

a BAP routing identifier and backhaul RLC channel identifier used for the F1-U connection of the migrating IAB-node, wherein the fifth TNL address is a TNL address routable to the DU of the first donor device, and the sixth TNL address is a TNL address routable to the DU of the second donor device.

In some embodiments, before the second donor device transmits the first RRC reconfiguration message for the migrating IAB-node to the first donor device, the processing unit 2101 (such as a CU configured in the second donor device) transmits a first message to the migrating IAB-node DU via the second F1-C connection by using the third TNL address, so that the migrating IAB-node sets up a second context for its served UE.

In some embodiments, the first message includes a first context identifier of the UE, so that the migrating IAB-node obtains a first context of the UE according to the first context identifier and sets up a second context by reusing the first context.

In some other embodiments, the first message further includes serving cell configuration information of the UE.

In some embodiments, the processing unit 2101 transmits a second RRC reconfiguration message for the UE to the first donor device, so that the first donor device forwards the second RRC reconfiguration message to the migrating IAB-node via the first F1-C connection by using the first TNL address; and furthermore, the processing unit 2101 further receives a second RRC reconfiguration complete message transmitted by the migrating IAB-node via the second F1-C connection by using the third TNL address, or receive a second RRC reconfiguration complete message transmitted by the migrating IAB-node via the second F1-C connection by using the fourth TNL address.

In case 3, in a case that the migrating IAB-node maintains the connection with the first donor device and adds an air-interface connection with the second donor device, the processing unit 2101 performs the following processing:

adding a second TNL address used for the first F1-C connection for the migrating IAB-node.

In some embodiments, the processing unit 2101 transmits a first RRC reconfiguration message for the migrating IAB-node to the first donor device, so that the first donor device forwards the first RRC reconfiguration message to the migrating IAB-node, the first RRC reconfiguration message including secondary cell group (SCG) configuration information and a second TNL address used for the first F1-C connection.

In some embodiments, the first RRC reconfiguration message further includes at least one of the following:

a BAP address allocated to the migrating IAB-node;

backhaul RLC channel configuration for the secondary cell group of the migrating IAB-node;

a BAP routing identifier and backhaul RLC channel identifier used for the second F1-C connection;

a sixth TNL address added for the F1-U connection of the migrating IAB-node; and a BAP routing identifier and backhaul RLC channel identifier used for the F1-U connection of the migrating IAB-node.

In case 3, in a case that the migrating IAB-node maintains the connection with the first donor device and adds an air-interface connection with the second donor device, the processing unit 2101 performs the following processing:

configuring a fourth TNL address or a third TNL address used for setting up the second F1-C connection for the migrating IAB-node; or, adding a second TNL address used for the first F1-C connection for the migrating IAB-node.

In some embodiments, the processing unit 2101 transmits a first RRC reconfiguration message for the migrating IAB-node to the first donor device, so that the first donor device forwards the first RRC reconfiguration message to the migrating IAB-node, the first RRC reconfiguration message including secondary cell group (SCG) configuration information and the fourth TNL address or third TNL address used for the second F1-C connection, or the first RRC reconfiguration message including secondary cell group (SCG) configuration information and the second TNL address used for the first F1-C connection.

In some embodiments, the first RRC reconfiguration message further includes at least one of the following:

a BAP address allocated to the migrating IAB-node;

backhaul RLC channel configuration for the secondary cell group of the migrating IAB-node;

a BAP routing identifier and backhaul RLC channel identifier used for the second F1-C connection;

a sixth TNL address added for the F1-U connection of the migrating IAB-node; and a BAP routing identifier and backhaul RLC channel identifier used for the F1-U connection of the migrating IAB-node.

In some embodiments, if the first RRC reconfiguration message does not include the fourth TNL address used for the second F1-C connection, after the migrating IAB-node adds an air-interface connection with the second donor device, the processing unit 2101 transmits a third RRC reconfiguration message to the migrating IAB-node, the third RRC reconfiguration message including the fourth TNL address used for the second F1-C connection.

In some embodiments, after the second donor device sets up the second F1-C connection with the migrating IAB-node, the processing unit 2101 (such as a CU configured in the second donor device) transmits a first message to the migrating IAB-node via the second F1-C connection by using the third TNL address or the fourth TNL address, so that the migrating IAB-node sets up a second context for its served UE.

In some embodiments, the first message includes a first context identifier of the UE, so that the migrating IAB-node obtains a first context of the UE according to the first context identifier and sets up the second context by reusing the first context.

In some other embodiments, the first message further includes serving cell configuration information of the UE.

In some embodiments, the processing unit 2101 transmits a second RRC reconfiguration message for the UE to the first donor device, so that the first donor device forwards the second RRC reconfiguration message to the migrating IAB-node via the first F1-C connection by using the first TNL address or the second TNL address; and the processing unit 2101 further receives a second RRC reconfiguration complete message transmitted by the migrating IAB-node via the second F1-C connection by using the third TNL address, or receive a second RRC reconfiguration complete message transmitted by the migrating IAB-node via the second F1-C connection by using the fourth TNL address.

In case 3, in a case that the migrating IAB-node maintains connection with the first donor device and adds an air-interface connection with the second donor device, the processing unit 2101 performs the following processing:

adding a fourth TNL address used for the second F1-C connection for the migrating IAB-node; or, adding a fourth TNL address used for the second F1-C connection for the migrating IAB-node, and adding a second TNL address used for the first F1-C connection for the migrating IAB-node.

In some embodiments, the processing unit 2101 transmits a first RRC reconfiguration message for the migrating IAB-node to the first donor device, so that the first donor device forwards the first RRC reconfiguration message to the migrating IAB-node, the first RRC reconfiguration message including secondary cell group (SCG) configuration information and the fourth TNL address used for the second F1-C connection, or, the first RRC reconfiguration message including secondary cell group (SCG) configuration information, the fourth TNL address used for the second F1-C connection and the second TNL address used for the first F1-C connection.

In some embodiments, the first RRC reconfiguration message further includes at least one of the following:

a BAP address allocated to the migrating IAB-node;

backhaul RLC channel configuration for the secondary cell group of the migrating IAB-node;

a BAP routing identifier and backhaul RLC channel identifier used for the second F1-C connection;

a sixth TNL address added for the F1-U connection of the migrating IAB-node; and a BAP routing identifier and backhaul RLC channel identifier used for the F1-U connection of the migrating IAB-node.

In some embodiments, before the second donor device transmits the first RRC reconfiguration message for the migrating IAB-node to the first donor device, the processing unit 2101 (such as a CU configured in the second donor device) transmits the first message to the DU of the migrating IAB-node via the second F1-C connection by using the third TNL address or the fourth TNL address, so that the migrating IAB-node sets up a second context for its served UE.

In some embodiments, the first message includes a first context identifier of the UE, so that the migrating IAB-node obtains a first context of the UE according to the first context identifier and sets up the second context by reusing the first context.

In some other embodiments, the first message further includes serving cell configuration information of the UE.

In some embodiments, the processing unit 2101 transmits a second RRC reconfiguration message for the UE to the first donor device, so that the first donor device forwards the second RRC reconfiguration message to the migrating IAB-node via the first F1-C connection by using the first TNL address; and the processing unit 2101 further receives a second RRC reconfiguration complete message transmitted by the migrating IAB-node via the second F1-C connection by using the third TNL address, or receives a second RRC reconfiguration complete message transmitted by the migrating IAB-node via the second F1-C connection by using the fourth TNL address.

It should be noted that the components or modules related to this disclosure are only described above. However, this disclosure is not limited thereto, and the group migrating apparatus 2100 of the embodiment of this disclosure may further include other components or modules, and reference may be made to related techniques for particulars of these components or modules.

Furthermore, for the sake of simplicity, connection relationships between the components or modules or signal profiles thereof are only illustrated in FIG. 21. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

According to the method of the embodiment of this disclosure, as mentioned earlier, on the one hand, payload balance between donor devices are achieved, and on the other hand, forwarding paths of the original F1-C connection and the new F1-C connection are optimized.

Embodiment of a Third Aspect

The embodiment of this disclosure provides a group migrating apparatus.

Figure 22:
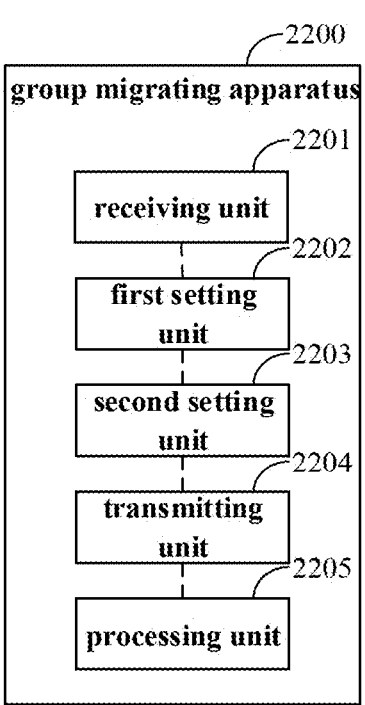
FIG. 22 is another schematic diagram of the group migrating apparatus of the embodiment of this disclosure.

FIG. 22 is a schematic diagram of the group migrating apparatus of the embodiment of this disclosure. The apparatus may be, for example, an IAB-node in an IAB system, or one or some components or assemblies configured in the IAB-node. The IAB system includes a donor device and the IAB-node. The IAB-node moves from a first donor device to a second donor device, and is referred to as a migrating IAB-node. The embodiment of this disclosure shall be explained from a side of the migrating IAB-node. An implementation principle of the group migrating apparatus in the embodiment of this disclosure is similar to the implementation of the migrating IAB-node in the embodiment of the first aspect, with identical parts being not going to be repeated herein any further.

As shown in FIG. 22, the group migrating apparatus 2200 of the embodiment of this disclosure includes:

a receiving unit 2201 configured to receive, via the first donor device, a first RRC reconfiguration message transmitted by the second donor device, the first RRC reconfiguration message including at least one of the following:

a second TNL address used for a first F1-C connection, so as to update a first TNL address used for the first F1-C connection to the second TNL address, or to add the second TNL address for the first F1-C connection;

a fourth TNL address used for a second F1-C connection, so as to update a third TNL address used for the second F1-C connection to the fourth TNL address, or to setup the second F1-C connection with a CU of the second donor device by using the fourth TNL address, or to add the fourth TNL address for the second F1-C connection; and a third TNL address used for a second F1-C connection, so as to add the third TNL address for the second F1-C connection, or to setup the second F1-C connection with the CU of the second donor device by using the third TNL address;

wherein the first F1-C connection is F1 connection between a DU of the migrating IAB-node and a CU of the first donor device, the second F1-C connection is F1 connection between the DU of the migrating IAB-node and the CU of the second donor device, the first TNL address and the third TNL address are TNL addresses routable to the DU of the first donor device, and the second TNL address and the fourth TNL address are TNL addresses routable to the DU of the second donor device.

In some embodiments, the migrating IAB-node moving from a first donor device to a second donor device refers to one of the following cases:

case 1: the migrating IAB-node is connection reestablished to the second donor device when a radio link failure occurs in a backhaul link of the migrating IAB-node under the first donor device;

case 2: the migrating IAB-node is handed over from the first donor device to the second donor device; and case 3: the migrating IAB-node maintains connection with the first donor device and adds an air interface connection with the second donor device.

In case 1, after the migrating IAB-node is connection reestablished to the second donor device, the receiving unit 2201 receives the first RRC reconfiguration message, wherein the first RRC reconfiguration message includes a second TNL address used for the first F1-C connection, and the migrating IAB-node updates a first TNL address used for the first F1-C connection to the second TNL address;

or, the first RRC reconfiguration message includes a second TNL address used for the first F1-C connection and a fourth TNL address used for the second F1-C connection, and the migrating IAB-node updates a first TNL address used for the first F1-C connection to the second TNL address and sets up the second F1-C connection with the CU of the second donor device by using the fourth TNL address.

In some embodiments, the first RRC reconfiguration message further includes at least one of the following:

a BAP address allocated to the migrating IAB-node;

backhaul RLC channel configuration of the migrating IAB-node, and a default BAP routing identifier and default backhaul RLC channel identifier used for F1-C traffic and non-F1 traffic;

a sixth TNL address used by the migrating IAB-node to update a fifth TNL address used for its F1-U connection to the sixth TNL address;

a BAP routing identifier and backhaul RLC channel identifier used for F1-U connection, wherein the fifth TNL address is a TNL address routable to the DU of the first donor device, and the sixth TNL address is a TNL address routable to the DU of the second donor device.

In some embodiments, if the first RRC reconfiguration message does not include the fourth TNL address used for the second F1-C connection, after receiving the first RRC reconfiguration message, the receiving unit 2201 further receives a third RRC reconfiguration message transmitted by the second donor device, wherein the third RRC reconfiguration message includes the fourth TNL address used for the second F1-C connection.

In the above embodiment, as shown in FIG. 22, the apparatus 2200 further includes: a first setting unit 2202 configured to setup the second F1-C connection with the CU of the second donor device by using the fourth TNL address.

In some embodiments, the first setting unit 2202 sets up the second F1-C connection with the second donor device, and the receiving unit 2201 receives a first message transmitted by the CU of the second donor device via the second F1-C connection by using the fourth TNL address.

In the above embodiment, as shown in FIG. 22, the apparatus 2200 further includes:

a second setting unit 2203 configured to setup a second context for the UE served by the migrating IAB-node according to the first message.

In some embodiments, the first message includes a first context identifier of the UE, and the migrating IAB-node obtains a first context of the UE according to the first context identifier and sets up the second context by reusing the first context.

In some embodiments, the first message further includes serving cell configuration information of the UE.

In some embodiments, as shown in FIG. 22, the apparatus 2200 further includes a transmitting unit 2204.

In the above embodiment, the receiving unit 2201 receives a second RRC reconfiguration message for the UE served by the migrating IAB-node forwarded by the first donor device via the first F1-C connection by using the second TNL address, and the transmitting unit 2204 transmits the second RRC reconfiguration message to the UE served by the migrating IAB-node.

In the above embodiment, the receiving unit 2201 further receives a second RRC reconfiguration complete message transmitted by the UE served by the migrating IAB-node, and the transmitting unit 2204 transmits the second RRC reconfiguration complete message to the second donor device via the second F1-C connection by using the fourth TNL address.

In some embodiments, the receiving unit 2201 receives a second message transmitted by the first donor device via the first F1-C connection by using the second TNL address, the second message including a sixth TNL address used for an F1-U connection, or including a sixth TNL address used for an F1-U connection and a BAP routing identifier and a backhaul RLC channel identifier used for an F1-U connection.

In the above embodiment, as shown in FIG. 22, the apparatus 2200 further includes:

a processing unit 2205 configured to update a fifth TNL address used for the F1-U connection to the sixth TNL address.

In case 2, in a case that the migrating IAB-node is handed over from the first donor device to the second donor device, the receiving unit 2201 receives the first RRC reconfiguration message.

In some embodiments, the first RRC reconfiguration message includes a handover command and a fourth TNL address used for the second F1-C connection, and the first setting unit 2202 sets up the second F1-C connection with the CU of the second donor device by using the fourth TNL address.

In some embodiments, the first RRC reconfiguration message includes a handover command and a second TNL address used for the first F1-C connection, and the processing unit 2205 updates a first TNL address used for the first F1-C connection to the second TNL address.

In some embodiments, the first RRC reconfiguration message further includes at least one of the following:

a BAP address allocated to the migrating IAB-node;

backhaul RLC channel configuration of the migrating IAB-node, and a default BAP routing identifier and default backhaul RLC channel identifier used for F1-C traffic and non-F1 traffic;

a sixth TNL address used by the migrating IAB-node to update a fifth TNL address of its F1-U connection to the sixth TNL address; and a BAP routing identifier and backhaul RLC channel identifier used for the F1-U connection of the migrating IAB-node.

In some embodiments, if the first RRC reconfiguration message does not include the fourth TNL address used for the second F1-C connection, after the migrating IAB-node is handed over to the second donor device, the receiving unit 2201 receives a third RRC reconfiguration message transmitted by the second donor device, wherein the third RRC reconfiguration message includes the fourth TNL address used for the second F1-C connection; and the first setting unit 2202 sets up the second F1-C connection with the CU of the second donor device by using the fourth TNL address.

In some embodiments, the receiving unit 2201 receives a second RRC reconfiguration message for the UE served by the migrating IAB service forwarded by the first donor device via the first F1-C connection by using the second TNL address or by using the first TNL address, and the transmitting unit 2204 transmits the second RRC reconfiguration message to the UE served by the migrating IAB-node.

In the above embodiment, the receiving unit 2201 receives a second RRC reconfiguration complete message transmitted by the UE served by the IAB-node, and the transmitting unit 2204 transmits the second RRC reconfiguration complete message to the second donor device via the second F1-C connection by using the fourth TNL address.

In some embodiments, if the first RRC reconfiguration message includes the second TNL address, the receiving unit 2201 receives a second message transmitted by the first donor device via the first F1-C connection by using the second TNL address, the second message including the sixth TNL address used for the F1-U connection, or including the sixth TNL address used for the F1-U and the BAP routing identifier and backhaul RLC channel identifier used for the F1-U connection;

and the processing unit 2205 updates a fifth TNL address used for the F1-U connection to the sixth TNL address.

In case 2, in a case that the migrating IAB-node is handed over from the first donor device to the second donor device, the receiving unit 2201 receives the first RRC reconfiguration message, the first RRC reconfiguration message including a handover command and a fourth TNL address used for the second F1-C connection, and the processing unit 2205 updates a third TNL address used for the second F1-C connection to the fourth TNL address.

In some embodiments, the first RRC reconfiguration message further includes at least one of the following:

a BAP address allocated to the migrating IAB-node;

backhaul RLC channel configuration of the migrating IAB-node, and a default BAP routing identifier and default backhaul RLC channel identifier used for F1-C traffic and non-F1 traffic;

a sixth TNL address used by the migrating IAB-node to update a fifth TNL address of its F1-U connection to the sixth TNL address; and a BAP routing identifier and backhaul RLC channel identifier used for the F1-U connection of the migrating IAB-node.

In some embodiments, before the migrating IAB-node receives the first RRC reconfiguration message, the receiving unit 2201 receives a third RRC reconfiguration message transmitted by the first donor device, wherein the third RRC reconfiguration message includes a third TNL address used for the second F1-C connection, and the first setting unit 2202 sets up the second F1-C connection with the CU of the second donor device by using the third TNL address.

In some embodiments, the receiving unit 2201 receives a second RRC reconfiguration message for the UE served by the migrating IAB-node forwarded by the first donor device via the first F1-C connection by using the first TNL address, and the transmitting unit 2204 transmits the second RRC reconfiguration message to the UE served by the migrating IAB-node.

In the above embodiment, the receiving unit 2201 receives a second RRC reconfiguration complete message transmitted by the UE served by the IAB-node, and the transmitting unit 2204 transmits the second RRC reconfiguration complete message to the second donor device via the second F1-C connection by using the third TNL address or the fourth TNL address.

In case 3, when the migrating IAB-node maintains the connection with the first donor device and adds an air-interface connection with the second donor device, the receiving unit 2201 receives the first RRC reconfiguration message, wherein the first RRC reconfiguration message includes secondary cell group (SCG) configuration information and a second TNL address used for the first F1-C connection, and the processing unit 2205 adds the second TNL address for the first F1-C connection.

In some embodiments, the first RRC reconfiguration message further includes at least one of the following:

a BAP address allocated to the migrating IAB-node;

backhaul RLC channel configuration of the migrating IAB-node;

a BAP routing identifier and backhaul RLC channel identifier used for the second F1-C connection;

a sixth TNL address added for the F1-U connection of the migrating IAB-node; and a BAP routing identifier and backhaul RLC channel identifier used for the F1-U connection of the migrating IAB-node;

wherein the sixth TNL address is a TNL address routable to the DU of the second donor device.

In case 3, in a case that the migrating IAB-node maintains the connection with the first donor device and adds an air-interface connection with the second donor device, the receiving unit 2201 receives the first RRC reconfiguration message.

In some embodiments, the first RRC reconfiguration message includes secondary cell group (SCG) configuration information and a fourth TNL address or a third TNL address used for the second F1-C connection, and the first setting unit 2202 sets up the second F1-C connection with the CU of the second donor device by using the fourth TNL address or the third TNL address.

In some embodiments, the first RRC reconfiguration message includes secondary cell group (SCG) configuration information and a second TNL address used for the first F1-C connection, and the processing unit 2205 adds the second TNL address for the first F1-C.

In some embodiments, the first RRC reconfiguration message further includes at least one of the following:

a BAP address allocated to the migrating IAB-node;

backhaul RLC channel configuration of the migrating IAB-node;

a BAP routing identifier and backhaul RLC channel identifier used for the second F1-C connection;

a sixth TNL address added for the F1-U connection of the migrating IAB-node; and a BAP routing identifier and backhaul RLC channel identifier used for the F1-U connection of the migrating IAB-node;

wherein the sixth TNL address is a TNL address routable to the DU of the second donor device.

In case 3, if the first RRC reconfiguration message does not include the fourth TNL address used for the second F1-C connection, after the migrating IAB-node adds the air-interface connection with the second donor device, the receiving unit 2201 receives a third RRC reconfiguration message transmitted by the second donor device, the third RRC reconfiguration message including the fourth TNL address used for the second F1-C connection, and the first setting unit 2202 sets up the second F1-C connection with the CU of the second donor device by using the fourth TNL address.

In some embodiments, the receiving unit 2201 receives a second RRC reconfiguration message for the UE served by the migrating IAB-node forwarded by the first donor device via the first F1-C connection by using the first TNL address or the second TNL address, and transmits the second RRC reconfiguration message to the UE served by the migrating IAB-node.

In the above embodiment, the receiving unit 2201 receives a second RRC reconfiguration complete message transmitted by the UE served by the IAB-node, and the transmitting unit 2204 transmits the second RRC reconfiguration complete message to the second donor device via the second F1-C connection by using the third TNL address or the fourth TNL address.

In case 3, in a case that the migrating IAB-node maintains the connection with the first donor device and adds the air-interface connection with the second donor device, the receiving unit 2201 receives the first RRC reconfiguration message.

In some embodiments, the first RRC reconfiguration message includes secondary cell group (SCG) configuration information and a fourth TNL address used for the second F1-C connection, and the processing unit 2205 adds the fourth TNL address for the second F1-C connection.

In some embodiments, the first RRC reconfiguration message includes secondary cell group (SCG) configuration information, a fourth TNL address used for the second F1-C connection and a second TNL address used for the first F1-C connection, and the processing unit 2205 adds the fourth TNL address for the second F1-C connection and adds the second TNL address for the first F1-C connection.

In some embodiments, the first RRC reconfiguration message further includes at least one of the following:

a BAP address allocated to the migrating IAB-node;

backhaul RLC channel configuration of the migrating IAB-node;

a BAP routing identifier and backhaul RLC channel identifier used for the second F1-C connection;

a sixth TNL address added for the F1-U connection of the migrating IAB-node; and a BAP routing identifier and backhaul RLC channel identifier used for the F1-U connection of the migrating IAB-node;

wherein the sixth TNL address is a TNL address routable to the DU of the second donor device.

In some embodiments, before the receiving unit 2201 receives the first RRC reconfiguration message, the receiving unit 2201 receives a third RRC reconfiguration message transmitted by the first donor device, the third RRC reconfiguration message including a third TNL address used for the second F1-C connection, and the first setting unit 2201 sets up the second F1-C connection with the CU of the second donor device by using the third TNL address.

In some embodiments, the receiving unit 2201 receives a second RRC reconfiguration message for the UE served by the migrating IAB-node forwarded by the first donor device via the first F1-C connection by using the first TNL address, and the transmitting unit 2204 transmits the second RRC reconfiguration message to the UE served by the migrating IAB-node.

In the above embodiment, the receiving unit 2201 receives a second RRC reconfiguration complete message transmitted by the UE served by the IAB-node, and the transmitting unit 2204 transmits the second RRC reconfiguration complete message to the second donor device via the second F1-C connection by using the third TNL address or the fourth TNL address.

It should be noted that the components or modules related to this disclosure are only described above. However, this disclosure is not limited thereto, and the group migrating apparatus 2200 of the embodiment of this disclosure may further include other components or modules, and reference may be made to related techniques for particulars of these components or modules.

Furthermore, for the sake of simplicity, connection relationships between the components or modules or signal profiles thereof are only illustrated in FIG. 22. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

According to the method of the embodiment of this disclosure, as mentioned earlier, on the one hand, payload balance between donor devices are achieved, and on the other hand, forwarding paths of the original F1-C connection and the new F1-C connection are optimized.

Embodiment of a Fourth Aspect

The embodiment of this disclosure provides a group migrating apparatus. The apparatus may be, for example, a donor device in an IAB system, or one or some components or assemblies configured in the donor device. The IAB system includes a donor device and an IAB-node. The IAB-node moves from a first donor device to a second donor device. The embodiment of this disclosure shall be explained from a side of the first donor device. An implementation principle of the group migrating apparatus in the embodiment of this disclosure is similar to the implementation of the first donor device in the embodiment of the first aspect, with identical parts being not going to be repeated herein any further.

Figure 23:
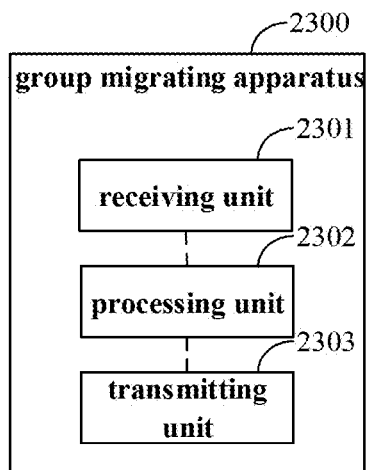
FIG. 23 is a further schematic diagram of the group migrating apparatus of the embodiment of this disclosure.

FIG. 23 is a schematic diagram of the group migrating apparatus of the embodiment of this disclosure. As shown in FIG. 23, the group migrating apparatus 2300 of the embodiment of this disclosure includes:

a receiving unit 2301 configured to receive a second TNL address used for a first F1-C connection of the migrating IAB-node transmitted by the second donor device; and a processing unit 2302 configured to update a first TNL address used for the first F1-C connection of the migrating IAB-node to the second TNL address, or add the second TNL address for the first F1-C connection of the migrating IAB-node;

wherein the first F1-C connection is F1 connection between a DU of the migrating IAB-node and a CU of the first donor device, the first TNL address is a TNL address routable to the DU of the first donor device, and the second TNL address is a TNL address routable to the DU of the second donor device.

In the embodiment of this disclosure, the migrating IAB-node moving from the first donor to the second donor device refers to one of the following:

case 1: the migrating IAB-node is connection reestablished to the second donor device when a radio link failure occurs in a backhaul link of the migrating IAB-node under the first donor device;

case 2: the migrating IAB-node is handed over from the first donor device to the second donor device; and case 3: the migrating IAB-node maintains connection with the first donor device and adds an air interface connection with the second donor device.

In some embodiments, the receiving unit 2301 receives a sixth TNL address used for the F1-U connection of the migrating IAB-node transmitted by the second donor device; and the processing unit 2302 updates a fifth TNL address used for the F1-U connection of the migrating IAB-node to the sixth TNL address, or adds the sixth TNL address for the F1-U connection of the migrating IAB-node;

wherein the fifth TNL address is a TNL address routable to the DU of the first donor device, and the sixth TNL address is a TNL address routable to the DU of the second donor device.

In some embodiments, as shown in FIG. 23, the apparatus 2300 further includes:

a transmitting unit 2303 configured to transmit a second message to the migrating IAB-node via the first F1-C connection by using the first TNL address, the second message including a sixth TNL address used for the F1-U connection of the migrating IAB-node and/or a BAP routing identifier and backhaul RLC channel identifier used for the F1-U connection of the migrating IAB-node.

In some embodiments, the receiving unit 2301 receives a second RRC reconfiguration message for the UE served by the migrating IAB-node transmitted by the second donor device, and the transmitting unit 2303 transmits the second RRC reconfiguration message to the migrating IAB-node via the first F1-C connection by using the second TNL address, so that the migrating IAB-node forwards the second RRC reconfiguration message to its served UE.

In some embodiments, in the case where the migrating IAB-node is handed over from the first donor device to the second donor device (case 2), before the processing unit 2302 updates the first TNL address used for the first F1-C connection of the migrating IAB-node to the second TNL address, the receiving unit 2301 receives the second RRC reconfiguration message for the UE served by the migrating IAB-node transmitted by the second donor device, and the transmitting unit 2303 transmits the second RRC reconfiguration message to the migrating IAB-node via the first F1-C connection by using the first TNL address, so that the migrating IAB-node forwards the second RRC reconfiguration message to its served UE.

Figures 24, 25:
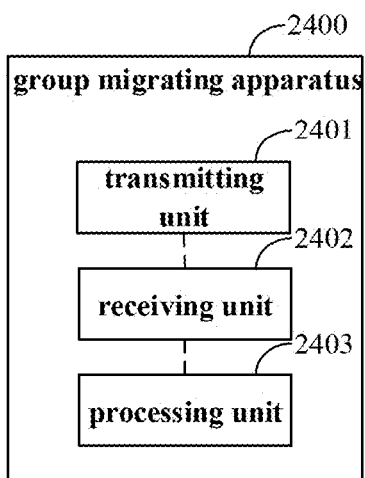
FIG. 24 is still another schematic diagram of the group migrating apparatus of the embodiment of this disclosure.
FIG. 25 is a schematic diagram of the communication system of an embodiment of this disclosure.

FIG. 24 is another schematic diagram of the group migrating apparatus of the embodiment of this disclosure. As shown in FIG. 24, the group migrating apparatus 2400 of the embodiment of this disclosure includes:

a transmitting unit 2401 configured to transmit a third TNL address used for setting up the second F1-C connection by the migrating IAB-node to the second donor device, wherein the second F1-C connection is F1 connection between the DU of the IAB-node and the CU of the second donor device, and the third TNL address is a TNL address routable to the DU of the first donor device.

In the embodiment of this disclosure, the migrating IAB-node moving from the first donor to the second donor device refers to one of the following:

case 2: the migrating IAB-node is handed over from the first donor device to the second donor device; and case 3: the migrating IAB-node maintains connection with the first donor device and adds an air interface connection with the second donor device.

In some embodiments, as shown in FIG. 24, the apparatus 2400 further includes:

a receiving unit 2402 configured to receive a second TNL address used for the first F1-C connection of the migrating IAB-node transmitted by the second donor; and a processing unit 2403 configured to add the second TNL address for the first F1-C connection of the migrating IAB-node, wherein the second TNL address is a TNL address routable to the DU of the second donor device, and the first F1-C connection is F1 connection between the DU of the IAB-node and the CU of the first donor device.

In some embodiments, the receiving unit 2402 receives a sixth TNL address used for the F1-U connection of the migrating IAB-node transmitted by the second donor device, and the processing unit 2403 updates a fifth TNL address used for the F1-U connection of the migrating IAB-node to the sixth TNL address or adds the sixth TNL address for the F1-U connection of the migrating IAB-node, wherein the fifth TNL address is a TNL address routable to the DU of the second donor device, and the sixth TNL address is a TNL address routable to the DU of the second donor device.

In some embodiments, the transmitting unit 2401 transmits a third RRC reconfiguration message to the migrating IAB-node, wherein the third RRC reconfiguration message includes the third TNL address, so that the migrating IAB-node sets up the second F1-C connection with the CU of the second donor device.

In some embodiments, the receiving unit 2402 receives a second RRC reconfiguration message for the UE served by the migrating IAB-node transmitted by the second donor device, and the transmitting unit 2401 transmits the second RRC reconfiguration message to the migrating IAB-node via the first F1-C connection by using a first TNL address or a second TNL address, so that the migrating IAB-node forwards the second RRC reconfiguration message to its served UE, wherein the first TNL address is a TNL address routable to the DU of the first donor device, and the second TNL address is a TNL address routable to the DU of the second donor device.

In some embodiments, the migrating IAB-node maintains the connection with the first donor device and adds an air-interface connection with the second donor device (case 3), and the transmitting unit 2401 transmits a second message to the migrating IAB-node via the first F1-C connection by using the first TNL address or by using the second TNL address, the second message including at least one of the following: a sixth TNL address used for the F1-U connection, a BAP routing identifier and a backhaul RLC channel identifier used for the F1-U connection.

It should be noted that the components or modules related to this disclosure are only described above. However, this disclosure is not limited thereto, and the group migrating apparatus 2300/2400 of the embodiment of this disclosure may further include other components or modules, and reference may be made to related techniques for particulars of these components or modules.

Furthermore, for the sake of simplicity, connection relationships between the components or modules or signal profiles thereof are only illustrated in FIGS. 23 and 24. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

According to the method of the embodiment of this disclosure, as mentioned earlier, on the one hand, payload balance between donor devices are achieved, and on the other hand, forwarding paths of the original F1-C connection and the new F1-C connection are optimized.

Embodiment of a Fifth Aspect

The embodiment of this disclosure provides a communication system. FIG. 25 is a schematic diagram of the communication system 2500. As shown in FIG. 25, the communication system 2500 includes donor devices 2501 and 2502, IAB-nodes 2503 and 2504, and a terminal equipment 2505, wherein the IAB-node 2503 is a migrating IAB-node, the donor device 2501 is taken as a source donor device (a first donor device) of the IAB-node 2503, the donor device 2502 is taken as a target donor device (a second donor device) of the IAB-node 2503, and the IAB-node 2504 and terminal equipment 2505 are served by the IAB-node 2503.

For the sake of simplicity, description is given in FIG. 25 by taking two donor devices, two IAB-nodes and one terminal equipment as examples; however, the embodiment of this disclosure is not limited thereto. Reference may be made to relevant technologies for network architectures of the donor devices, IAB-nodes and terminal equipment, which shall not be repeated herein any further.

In some embodiments, the donor device 2501 is configured to carry out the method executed by the first donor device in the embodiment of the first aspect, and may include the apparatus shown in FIG. 23 or FIG. 24. In some embodiments, the donor device 2502 is configured to carry out the method executed by the second donor device in the embodiment of the first aspect, and may include the apparatus shown in FIG. 21. In some embodiments, the IAB-node 2503 is configured to carry out the method executed by the migrating IAB-node in the embodiment of the first aspect, and may include the apparatus shown in FIG. 22. Reference may be made to the embodiments of the first to fourth aspects for the relevant contents of the donor devices 2501 and 2502 and the IAB-node 2503, which shall not be repeated herein any further.

The embodiment of this disclosure further provides an IAB-node.

Figure 26:
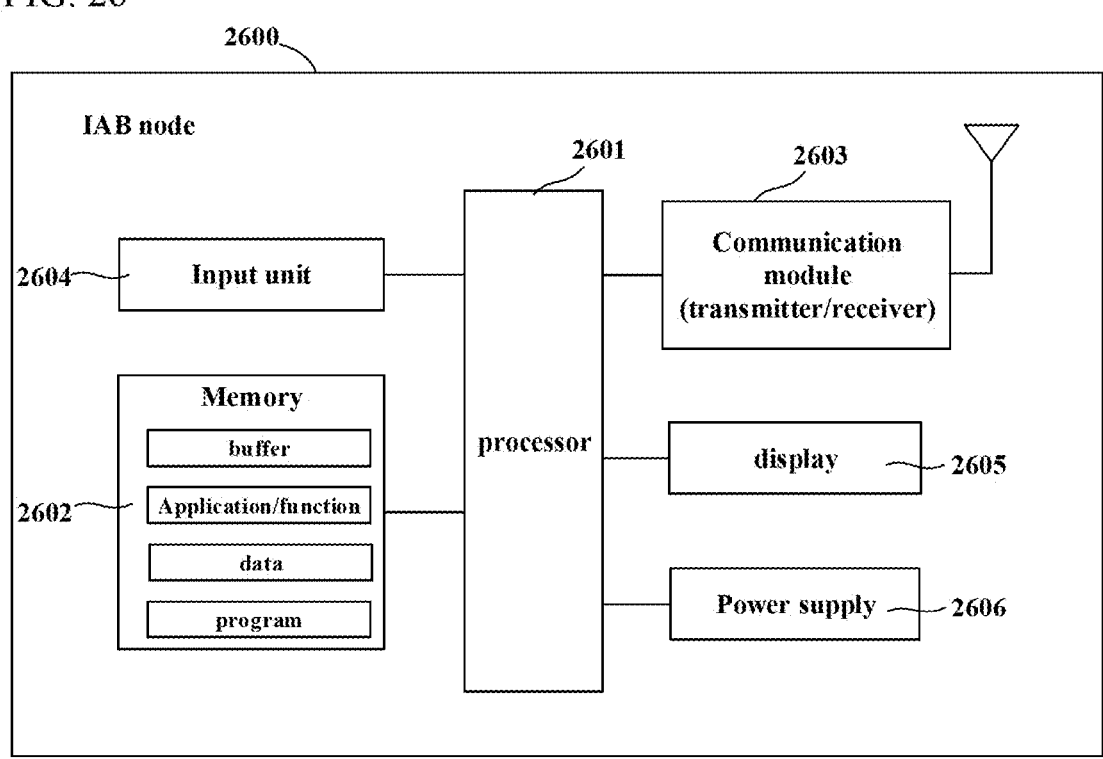
FIG. 26 is a schematic diagram of the IAB-node of an embodiment of this disclosure.

FIG. 26 is a schematic diagram of the IAB-node of the embodiment of this disclosure. As shown in FIG. 26, the IAB-node 2600 may include a processor 2601 and a memory 2602, the memory 2602 storing data and programs and being coupled to the processor 2601. It should be noted that this figure is illustrative only, and other types of structures may also be used, so as to supplement or replace this structure and achieve a telecommunications function or other functions.

For example, the processor 2601 may be configured to execute a program to carry out the method executed by the migrating IAB-node in the embodiment of the first aspect.

As shown in FIG. 26, the IAB-node 2600 may further include a communication module 2603, an input unit 2604, a display 2605, and a power supply 2606; wherein functions of the above components are similar to those in the related art, which shall not be described herein any further. It should be noted that the IAB-node 2600 does not necessarily include all the parts shown in FIG. 26, and the above components are not necessary. Furthermore, the IAB-node 2600 may include parts not shown in FIG. 26, and the related art may be referred to.

The embodiment of this disclosure further provides a donor device.

Figure 27:
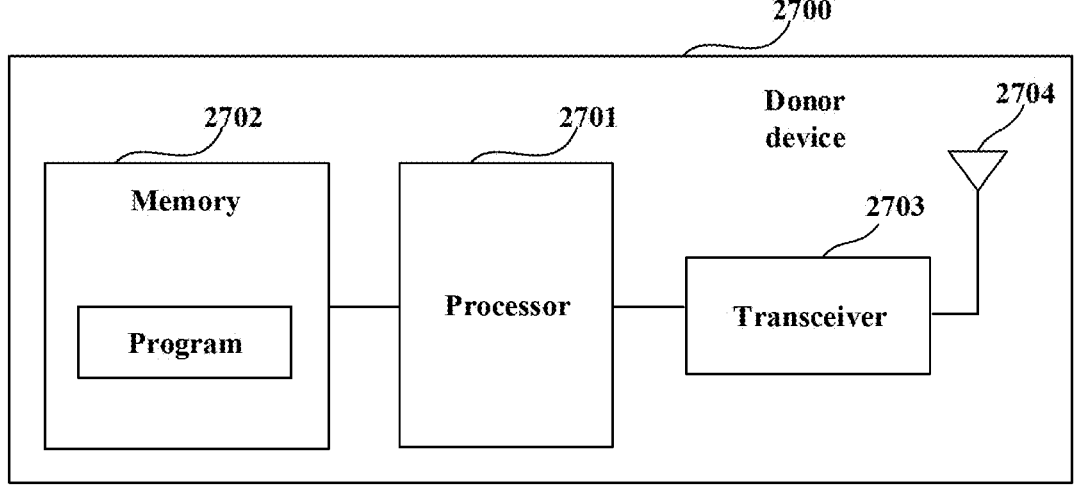
FIG. 27 is a schematic diagram of the donor device of an embodiment of this disclosure.

FIG. 27 is a schematic diagram of the donor device of the embodiment of this disclosure. As shown in FIG. 27, the donor device 2700 may include a processor (such as a central processing unit (CPU)) 2701 and a memory 2702, the memory 2702 being coupled to processor 2701. The memory 2702 may store various data, and furthermore, it may store a program for information processing, and execute the program under control of the central processing unit 2701.

For example, the processor 2701 may be configured to execute a program to carry out the method executed by the first donor device or the second donor device in the embodiment of the first aspect.

Furthermore, as shown in FIG. 27, the donor device 2700 may include a transceiver 2703, and an antenna 2704, etc.;

wherein functions of the above components are similar to those in the related art, which shall not be described herein any further. It should be noted that the donor device 2700 does not necessarily include all the components shown in FIG. 27; and furthermore, the donor device 2700 may include components not shown in FIG. 27, and the related art may be referred to.

An embodiment of this disclosure provides a computer readable program, which, when executed in an IAB node, will cause a computer to carry out the method executed by the migrating IAB-node in the embodiment of the first aspect in the IAB node.

An embodiment of this disclosure provides a storage medium storing a computer readable program, which will cause a computer to carry out the method executed by the migrating IAB-node in the embodiment of the first aspect in an IAB node.

An embodiment of this disclosure provides a computer readable program, which, when executed in a donor device, will cause a computer to carry out the method executed by the first donor device or the second donor device in the embodiment of the first aspect in the donor device.

An embodiment of this disclosure provides a storage medium storing a computer readable program, which will cause a computer to carry out the method executed by the first donor device or the second donor device in the embodiment of the first aspect in a donor device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to the above implementations disclosed in the embodiments, following supplements are further disclosed.

1. A group migrating method, wherein the method comprises:

when a migrating IAB-node moves from a first donor device to a second donor device, performing at least one of the following processing by the second donor device:

enabling the migrating IAB-node to update a first TNL address used for a first F1-C connection to a second TNL address;

enabling the migrating IAB-node to update a third TNL address used for a second F1-C connection to a fourth TNL address;

configuring the migrating IAB-node with a fourth TNL address used for setting up a second F1-C connection;

adding for the migrating IAB-node the second TNL address used for a first F1-C connection;

configuring the migrating IAB-node with the third TNL address used for setting up a second F1-C connection; and adding for the migrating IAB-node the fourth TNL address used for a second F1-C connection, wherein the first F1-C connection is F1 connection between a DU of the migrating IAB-node and a CU of the first donor device, the second F1-C connection is F1 connection between the DU of the migrating IAB-node and a CU of the second donor device, the first TNL address and the third TNL address are TNL addresses routable to the DU of the first donor device, and the second TNL address and the fourth TNL address are TNL addresses routable to the DU of the second donor device.

2. The method according to supplement 1, wherein that the migrating IAB-node moves from the first donor device to the second donor device refers to one of the following:

that the migrating IAB-node is connection reestablished to the second donor device when a radio link failure occurs in a backhaul link of the migrating IAB-node under the first donor device;

that the migrating IAB-node is handed over from the first donor device to the second donor device; and that the migrating IAB-node maintains connection with the first donor device and adds an air interface connection with the second donor device.

3. The method according to supplement 2, wherein when the radio link failure occurs in the backhaul link of the migrating IAB-node under the first donor device, the second donor device performs the following processing:

enabling the migrating IAB-node to update the first TNL address used for the first F1-C connection to the second TNL address; and configuring the migrating IAB-node with the fourth TNL address used for setting up the second F1-C connection.

4. The method according to supplement 3, wherein the method comprises:

after the migrating IAB-node is connection reestablished to the second donor device, transmitting a first RRC reconfiguration message by the second donor device to the migrating IAB-node, the first RRC reconfiguration message containing the second TNL address used for the first F1-C connection, or the first RRC reconfiguration message containing the second TNL address used for the first F1-C connection and the fourth TNL address used for the second F1-C connection.

5. The method according to supplement 4, wherein the first RRC reconfiguration message further includes at least one of the following:

a BAP address allocated to the migrating IAB-node;

backhaul RLC channel configuration of the migrating IAB-node, and a default BAP routing identifier and default backhaul RLC channel identifier used for F1-C traffic and non-F1 traffic;

a sixth TNL address used by the migrating IAB-node to update a fifth TNL address used for its F1-U connection to the sixth TNL address; and a BAP routing identifier and a backhaul RLC channel identifier used for F1-U connection;

wherein the fifth TNL address is a TNL address routable to a DU of the first donor device, and the sixth TNL address is a TNL address routable to a DU of the second donor device.

6. The method according to supplement 4, wherein if the first RRC reconfiguration message does not include the fourth TNL address used for the second F1-C connection, after the second donor device transmits the first RRC reconfiguration message to the migrating IAB-node, the method further comprises:

transmitting a third RRC reconfiguration message by the second donor device to the migrating IAB-node, the third RRC reconfiguration message including the fourth TNL address used for the second F1-C connection.

6a. The method according to supplement 4 or 6, wherein after the second donor device sets up the second F1-C connection with the migrating IAB-node, the method further comprises:

transmitting a first message to the DU of the migrating IAB-node by the CU of the second donor device via the second F1-C connection by using the fourth TNL address, so that the migrating IAB-node sets up a second context for its served UE.

7. The method according to supplement 6, wherein the first message includes a first context identifier of the UE, so that the migrating IAB-node obtains a first context of the UE according to the first context identifier and sets up the second context by reusing the first context.

7a. The method according to supplement 7, wherein the first message further includes serving cell configuration information of the UE.

7b. The method according to supplement 4 or 6, wherein the method further comprises:

transmitting a second RRC reconfiguration message for the UE served by the migrating IAB-node by the second donor device to the first donor device, so that the first donor device forwards the second RRC reconfiguration message to the migrating IAB-node by using the second TNL address via the first F1-C connection; and receiving by the second donor device, a second RRC reconfiguration complete message transmitted by the migrating IAB-node via the second F1-C connection by using the fourth TNL address.

8. The method according to supplement 2, wherein in a case where the migrating IAB node is handed over from the first donor device to the second donor device, the second donor device performs the following processing:

configuring a fourth TNL address used for setting up the second F1-C connection for the migrating IAB node; or, configuring a fourth TNL address used for setting up the second F1-C connection for the migrating IAB node, and making the migrating IAB node update the first TNL address used for the first F1-C connection to the second TNL address.

9. The method according to supplement 2, wherein in a case where the migrating IAB node is handed over from the first donor device to the second donor device, the second donor device performs the following processing:

making the migrating IAB node update the third TNL address used for the second F1-C connection to the fourth TNL address.

10. The method according to supplement 8, wherein the method comprises:

transmitting a first RRC reconfiguration message for the migrating IAB-node to the first donor device, so that the first donor device forwards the first RRC reconfiguration message to the migrating IAB-node, the first RRC reconfiguration message including a handover command and the fourth TNL address used for the second F1-C connection, or, the first RRC reconfiguration message including a handover command and the second TNL address used for the first F1-C connection.

11. The method according to supplement 10, wherein the first RRC reconfiguration message further comprises at least one of the following:

a BAP address allocated to the migrating IAB-node;

backhaul RLC channel configuration of the migrating IAB-node, and a default BAP routing identifier and default backhaul RLC channel identifier used for F1-C traffic and non-F1 traffic;

a sixth TNL address used by the migrating IAB-node to update a fifth TNL address used for its F1-U connection to the sixth TNL address;

a BAP routing identifier and a backhaul RLC channel identifier used for the F1-U connection, wherein the fifth TNL address is a TNL address routable to the DU of the first donor device, and the sixth TNL address is a TNL address routable to the DU of the second donor device.

12. The method according to supplement 10, wherein if the first RRC reconfiguration message does not include the fourth TNL address used for the second F1-C connection, after the migrating IAB-node is handed over to the second donor, the method further comprises:

transmitting a third RRC reconfiguration message by the second donor device to the migrating IAB-node, the third RRC reconfiguration message including the fourth TNL address used for the second F1-C connection.

12a. The method according to supplement 10 or 12, wherein after the second donor device sets up the second F1-C connection with the migrating IAB node, the method further comprises:

transmitting a first message by the CU of the second donor device to the DU of the migrating IAB-node via the second F1-C connection by using the fourth TNL address, so that the migrating IAB-node sets up a second context for its served UE.

13. The method according to supplement 12, wherein the first message comprises a first context identifier of the UE, so that the migrating IAB node obtains the first context of the UE according to the first context identifier and sets up the second context by reusing the first context.

13a. The method according to supplement 13, wherein the first message further comprises serving cell configuration information of the UE.

14. The method according to supplement 10, wherein the method further comprises:

transmitting a second RRC reconfiguration message for the UE served by the migrating IAB node by the second donor device to the first donor device, so that the first donor device forwards the second RRC reconfiguration message to the migrating IAB node via the first F1-C connection by using the second TNL address or by using the first TNL address; and receiving by the second donor device, a second RRC reconfiguration complete message transmitted by the migrating IAB node via the second F1-C connection by using the fourth TNL address.

15. The method according to supplement 9, wherein the method further comprises:

transmitting a first RRC reconfiguration message for the migrating IAB-node by the second donor device to the first donor device, so that the first donor device forwards the first RRC reconfiguration message to the migrating IAB-node, the first RRC reconfiguration message including a handover command and a fourth TNL address used for the second F1-C connection.

16. The method according to supplement 15, wherein the first RRC reconfiguration message further comprises at least one of the following:

a BAP address allocated to the migrating IAB-node;

backhaul RLC channel configuration of the migrating IAB-node, and a default BAP routing identifier and default backhaul RLC channel identifier used for F1-C traffic and non-F1 traffic;

a sixth TNL address used by the migrating IAB-node to update a fifth TNL address used for its F1-U connection to the sixth TNL address;

a BAP routing identifier and a backhaul RLC channel identifier used for the F1-U connection, wherein the fifth TNL address is a TNL address routable to the DU of the first donor device, and the sixth TNL address is a TNL address routable to the DU of the second donor device.

16a. The method according to supplement 15, wherein before the second donor device transmits the first RRC reconfiguration message for the migrating IAB-node to the first donor device, the method further comprises:

transmitting a first message by the CU of the second donor device to the DU of the migrating IAB-node via the second F1-C connection by using the third TNL address, so that the migrating IAB-node sets up a second context for its served UE.

16b. The method according to supplement 16a, wherein the first message includes a first context identifier of the UE, so that the migrating IAB-node obtains a first context of the UE according to the first context identifier and sets up the second context by reusing the first context.

16c. The method according to supplement 16b, wherein the first message further includes serving cell configuration information of the UE.

16d. The method according to supplement 15, wherein the method further comprises:

transmitting a second RRC reconfiguration message for the UE by the second donor device to the first donor device, so that the first donor device forwards the second RRC reconfiguration message to the migrating IAB-node via the first F1-C connection by using the first TNL address; and receiving a second RRC reconfiguration complete message transmitted by the migrating IAB-node via the second F1-C connection by using the third TNL address, or receiving a second RRC reconfiguration complete message transmitted by the migrating IAB-node via the second F1-C connection by using the fourth TNL address, by the second donor device.

17. The method according to supplement 2, wherein in a case where the migrating IAB-node maintains the connection with the first donor device and adds the air-interface connection with the second donor device, the second donor device performs the following processing:

adding for the migrating IAB-node the second TNL address used for the first F1-C connection.

18. The method according to supplement 2, wherein in a case where the migrating IAB-node maintains the connection with the first donor device and adds the air-interface connection with the second donor device, the second donor device performs the following processing:

configuring the migrating IAB-node with a fourth TNL address or a third TNL address used for setting up the second F1-C connection; or, adding a second TNL address used for the first F1-C connection for the migrating IAB-node.

19. The method according to supplement 2, wherein in a case where the migrating IAB-node maintains the connection with the first donor device and adds the air-interface connection with the second donor device, the second donor device performs the following processing:

adding a fourth TNL address used for the second F1-C connection for the migrating IAB-node; or, adding a fourth TNL address used for the second F1-C connection for the migrating IAB-node, and adding a second TNL address used for the first F1-C connection for the migrating IAB-node.

20. The method according to supplement 17, wherein the method comprises:

transmitting a first RRC reconfiguration message for the migrating IAB-node by the second donor device to the first donor device, so that the first donor device forwards the first RRC reconfiguration message to the migrating IAB-node, the first RRC reconfiguration message including secondary cell group (SCG) configuration information and a second TNL address used for the first F1-C connection.

21. The method according to supplement 20, wherein the first RRC reconfiguration message further includes at least one of the following:

a BAP address allocated to the migrating IAB-node;

backhaul RLC channel configuration for a secondary cell group of the migrating IAB-node;

a BAP routing identifier and backhaul RLC channel identifier used for the second F1-C connection;

a sixth TNL address added for the F1-U connection of the migrating IAB-node; and a BAP routing identifier and backhaul RLC channel identifier used for the F1-U connection of the migrating IAB-node.

22. The method according to supplement 18, wherein the method comprises:

transmitting a first RRC reconfiguration message for the migrating IAB-node by the second donor device to the first donor device, so that the first donor device forwards the first RRC reconfiguration message to the migrating IAB-node, the first RRC reconfiguration message including secondary cell group (SCG) configuration information and the fourth TNL address or third TNL address used for the second F1-C connection, or, the first RRC reconfiguration message including secondary cell group (SCG) configuration information and a second TNL address used for the first F1-C connection.

23. The method according to supplement 22, wherein the first RRC reconfiguration message further includes at least one of the following:

a BAP address allocated to the migrating IAB-node;

backhaul RLC channel configuration for a secondary cell group of the migrating IAB-node;

a BAP routing identifier and backhaul RLC channel identifier used for the second F1-C connection;

a sixth TNL address added for the F1-U connection of the migrating IAB-node; and a BAP routing identifier and backhaul RLC channel identifier used for the F1-U connection of the migrating IAB-node.

24. The method according to supplement 22, wherein if the first RRC reconfiguration message does not include the fourth TNL address used for the second F1-C connection, after the migrating IAB-node adds the air-interface connection with the second donor device, the method further comprises:

transmitting a third RRC reconfiguration message by the second donor device to the migrating IAB-node, the third RRC reconfiguration message including a fourth TNL address used for the second F1-C connection.

24a. The method according to supplement 22 or 24, wherein after the second donor device sets up the second F1-C connection with the migrating IAB-node, the method further comprises:

transmitting a first message by the CU of the second donor device to the migrating IAB-node via the second F1-C connection by using the third TNL address or the fourth TNL address, so that the migrating IAB-node sets up a second context for its served UE.

25. The method according to supplement 24a, wherein the first message includes a first context identifier of the UE, so that the migrating IAB-node obtains a first context of the UE according to the first context identifier and sets up the second context by reusing the first context.

25a. The method according to supplement 25, wherein the first message further includes serving cell configuration information of the UE.

26. The method according to supplement 22 or 24, wherein the method further comprises:

transmitting a second RRC reconfiguration message for the UE by the second donor device to the first donor device, so that the first donor device forwards the second RRC reconfiguration message to the migrating IAB-node via the first F1-C connection by using the first TNL address or the second TNL address; and receiving a second RRC reconfiguration complete message transmitted by the migrating IAB-node via the second F1-C connection by using the third TNL address, or receiving a second RRC reconfiguration complete message transmitted by the migrating IAB-node via the second F1-C connection by using the fourth TNL address, by the second donor device.

27. The method according to supplement 19, wherein the method comprises:

transmitting a first RRC reconfiguration message for the migrating IAB-node by the second donor device to the first donor device, so that the first donor device forwards the first RRC reconfiguration message to the migrating IAB-node, the first RRC reconfiguration message including secondary cell group (SCG) configuration information and a fourth TNL address used for the second F1-C connection, or, the first RRC reconfiguration message including secondary cell group (SCG) configuration information, a fourth TNL address used for the second F1-C connection and a second TNL address used for the first F1-C connection.

28. The method according to supplement 27, wherein the first RRC reconfiguration message further includes at least one of the following:

a BAP address allocated to the migrating IAB-node;

backhaul RLC channel configuration for a secondary cell group of the migrating IAB-node;

a BAP routing identifier and backhaul RLC channel identifier used for the second F1-C connection;

a sixth TNL address added for the F1-U connection of the migrating IAB-node; and a BAP routing identifier and backhaul RLC channel identifier used for the F1-U connection of the migrating IAB-node.

29. The method according to supplement 27, wherein before the second donor device transmits the first RRC reconfiguration message for the migrating IAB-node to the first donor device, the method further comprises:

transmitting a first message by the CU of the second donor device to the DU of the migrating IAB-node via the second F1-C connection by using the third TNL address or the fourth TNL address, so that the migrating IAB-node sets up a second context for its served UE.

29a. The method according to supplement 29, wherein the first message includes a first context identifier of the UE, so that the migrating IAB-node obtains a first context of the UE according to the first context identifier and sets up the second context by reusing the first context.

30. The method according to supplement 29a, wherein the first message further includes serving cell configuration information of the UE.

31. The method according to supplement 27, wherein the method further comprises:

transmitting a second RRC reconfiguration message for the UE by the second donor device to the first donor device, so that the first donor device forwards the second RRC reconfiguration message to the migrating IAB-node via the first F1-C connection by using the first TNL address; and receiving a second RRC reconfiguration complete message transmitted by the migrating IAB-node via the second F1-C connection by using the third TNL address, or, receiving a second RRC reconfiguration complete message transmitted by the migrating IAB-node via the second F1-C connection by using the fourth TNL address, by the second donor device.

32. A group migrating method, applicable to a migrating IAB-node, the migrating IAB-node moving from a first donor device to a second donor device, wherein the method comprises:

receiving by the migrating IAB-node via the first donor device a first RRC reconfiguration message transmitted by the second donor device, the first RRC reconfiguration message including at least one of the following:

a second TNL address used for a first F1-C connection, so as to update a first TNL address used for the first F1-C connection to the second TNL address, or to add the second TNL address for the first F1-C connection;

a fourth TNL address used for a second F1-C connection, so as to update a third TNL address used for the second F1-C connection to the fourth TNL address, or to setup the second F1-C connection with a CU of the second donor device by using the fourth TNL address, or to add the fourth TNL address for the second F1-C connection; and a third TNL address used for the second F1-C connection, so as to add the third TNL address for the second F1-C connection, or to setup the second F1-C connection with the CU of the second donor device by using the third TNL address;

wherein the first F1-C connection is F1 connection between a DU of the migrating IAB-node and a CU of the first donor device, the second F1-C connection is F1 connection between the DU of the migrating IAB-node and the CU of the second donor device, the first TNL address and the third TNL address are TNL addresses routable to the DU of the first donor device, and the second TNL address and the fourth TNL address are TNL addresses routable to the DU of the second donor device.

33. The method according to supplement 32, wherein that the migrating IAB-node moves from the first donor device to the second donor device refers to one of the following:

that the migrating IAB-node is connection reestablished to the second donor device when a radio link failure occurs in a backhaul link of the migrating IAB-node under the first donor device;

that the migrating IAB-node is handed over from the first donor device to the second donor device; and that the migrating IAB-node maintains connection with the first donor device and adds an air interface connection with the second donor device.

34. The method according to supplement 33, wherein after the migrating IAB-node is connection reestablished to the second donor device, the migrating IAB-node receives the first RRC reconfiguration message, wherein the first RRC reconfiguration message includes a second TNL address used for the first F1-C connection, and the migrating IAB-node updates the first TNL address used for the first F1-C connection to the second TNL address;

or, the first RRC reconfiguration message includes a second TNL address used for the first F1-C connection and a fourth TNL address used for the second F1-C connection, and the migrating IAB-node updates the first TNL address used for the first F1-C connection to the second TNL address and sets up the second F1-C connection with the CU of the second donor device by using the fourth TNL address.

35. The method according to supplement 34, wherein the first RRC reconfiguration message further includes at least one of the following:

a BAP address allocated to the migrating IAB-node;

backhaul RLC channel configuration of the migrating IAB-node, and a default BAP routing identifier and default backhaul RLC channel identifier used for F1-C traffic and non-F1 traffic;

a sixth TNL address used by the migrating IAB-node to update a fifth TNL address used for its F1-U connection to the sixth TNL address; and a BAP routing identifier and a backhaul RLC channel identifier used for F1-U connection;

wherein the fifth TNL address is a TNL address routable to a DU of the first donor device, and the sixth TNL address is a TNL address routable to a DU of the second donor device.

36. The method according to supplement 34, wherein if the first RRC reconfiguration message does not include the fourth TNL address used for the second F1-C connection, after the migrating IAB-node receives the first RRC reconfiguration message, the method further comprises:

receiving by the migrating IAB-node, a third RRC reconfiguration message transmitted by the second donor device, wherein the third RRC reconfiguration message includes the fourth TNL address used for the second F1-C connection; and setting up a second F1-C connection with the CU of the second donor device by the migrating IAB-node by using the fourth TNL address.

36a. The method according to supplement 34 or 36, wherein the method further comprises:

setting up the second F1-C connection with the second donor device, and receiving a first message transmitted by the CU of the second donor device by using the fourth TNL address via the second F1-C connection, by the migrating IAB-node; and setting up a second context by the migrating IAB-node for its served UE according to the first message.

37. The method according to supplement 36, wherein the first message includes a first context identifier of the UE, and the migrating IAB-node obtains a first context of the UE according to the first context identifier and sets up the second context by reusing the first context.

38. The method according to supplement 37, wherein the first message further includes serving cell configuration information of the UE.

39. The method according to supplement 34 or 36, wherein the method further comprises:

receiving a second RRC reconfiguration message for a UE served by the migrating IAB-node forwarded by the first donor device via the first F1-C connection by using the second TNL address, and transmitting the second RRC reconfiguration message to the UE served by the migrating IAB-node, by the migrating IAB-node; and receiving a second RRC reconfiguration complete message transmitted by the UE served by the migrating IAB-node, and transmitting the second RRC reconfiguration complete message to the second donor device via the second F1-C connection by using the fourth TNL address, by the migrating IAB-node.

40. The method according to supplement 34 or 36, wherein the method further comprises:

receiving by the migrating IAB-node, a second message transmitted by the first donor device via the first F1-C connection by using the second TNL address, the second message including a sixth TNL address used for an F1-U connection, or including a sixth TNL address used for an F1-U connection and a BAP routing identifier and a backhaul RLC channel identifier used for an F1-U connection; and updating a fifth TNL address used for the F1-U connection to the sixth TNL address by the migrating IAB-node.

41. The method according to supplement 33, wherein in a case where the migrating IAB-node is handed over from the first donor device to the second donor device, the migrating IAB-node receives the first RRC reconfiguration message, wherein the first RRC reconfiguration message includes a handover command and the fourth TNL address used for the second F1-C connection, and the migrating IAB-node sets up the second F1-C connection with the CU of the second donor device by using the fourth TNL address, or, the first RRC reconfiguration message includes a handover command and the second TNL address used for the first F1-C connection, and the migrating IAB-node updates the first TNL address used for the first F1-C connection to the second TNL address.

42. The method according to supplement 41, wherein the first RRC reconfiguration message further includes at least one of the following:

a BAP address allocated to the migrating IAB-node;
backhaul RLC channel configuration of the migrating IAB-node, and a default BAP routing identifier and default backhaul RLC channel identifier used for F1-C traffic and non-F1 traffic;
a sixth TNL address used by the migrating IAB-node to update a fifth TNL address used for its F1-U connection to the sixth TNL address; and
a BAP routing identifier and a backhaul RLC channel identifier used for the F1-U connection of the migrating IAB-node.

43. The method according to supplement 41, wherein if the first RRC reconfiguration message does not include the fourth TNL address used for the second F1-C connection, after the migrating IAB-node is handed over to the second donor device, the method further comprises:

receiving by the IAB-node, a third RRC reconfiguration message transmitted by the second donor device, wherein the third RRC reconfiguration message includes the fourth TNL address used for the second F1-C connection; and setting up the second F1-C connection with the CU of the second donor device by the migrating IAB-node by using the fourth TNL address.

43a. The method according to supplement 41 or 43, wherein the method further comprises:

receiving a second RRC reconfiguration message for the UE served by the migrating IAB-node forwarded by the first donor device via the first F1-C connection by using the second TNL address or by using the first TNL address, and transmitting the second RRC reconfiguration message to the UE served by the migrating IAB-node, by the migrating IAB-node; and receiving a second RRC reconfiguration complete message transmitted by the UE served by the migrating IAB-node, and transmitting the second RRC reconfiguration complete message to the second donor device via the second F1-C connection by using the fourth TNL address, by the migrating IAB-node.

44. The method according to supplement 41, wherein if the first RRC reconfiguration message includes the second TNL address, the method further comprises:

receiving a second message transmitted by the first donor device via the first F1-C connection by using the second TNL address, the second message including the sixth TNL address used for the F1-U connection, or including the sixth TNL address used for the F1-U connection and the BAP routing identifier and backhaul RLC channel identifier used for the F1-U connection; and updating a fifth TNL address used for the F1-U connection to the sixth TNL address by the migrating IAB-node.

45. The method according to supplement 33, wherein in a case where the migrating IAB-node is handed over from the first donor device to the second donor device, the migrating IAB-node receives the first RRC reconfiguration message, the first RRC reconfiguration message including a handover command and the fourth TNL address used for the second F1-C connection;

and the migrating IAB-node updates a third TNL address used for the second F1-C connection to the fourth TNL address.

46. The method according to supplement 45, wherein the first RRC reconfiguration message further includes at least one of the following:

a BAP address allocated to the migrating IAB-node;
backhaul RLC channel configuration of the migrating IAB-node, and a default BAP routing identifier and default backhaul RLC channel identifier used for F1-C traffic and non-F1 traffic;
a sixth TNL address used by the migrating IAB-node to update a fifth TNL address used for its F1-U connection to the sixth TNL address; and
a BAP routing identifier and a backhaul RLC channel identifier used for the F1-U connection of the migrating IAB-node.

47. The method according to supplement 45, wherein before the migrating IAB-node receives the first RRC reconfiguration message, the method further comprises:

receiving by the migrating IAB-node, a third RRC reconfiguration message transmitted by the first donor device, wherein the third RRC reconfiguration message includes a third TNL address used for the second F1-C; and setting up the second F1-C connection with the CU of the second donor device by the migrating IAB-node by using the third TNL address.

47a. The method according to supplement 47, wherein the method further comprises:

receiving a second RRC reconfiguration message for the UE served by the migrating IAB-node forwarded by the first donor device via the first F1-C connection by using the first TNL address, and transmitting the second RRC reconfiguration message to the UE served by the migrating IAB-node, by the migrating IAB-node; and receiving a second RRC reconfiguration complete message transmitted by the UE served by the migrating IAB-node, and transmitting the second RRC reconfiguration complete message to the second donor device via the second F1-C connection by using the third TNL address or the fourth TNL address, by the migrating IAB-node.

48. The method according to supplement 33, wherein in a case where the migrating IAB-node maintains connection with the first donor device and adds an air interface connection with the second donor device, the migrating IAB-node receives the first RRC reconfiguration message, wherein the first RRC reconfiguration message includes secondary cell group (SCG) configuration information and a second TNL address used for the first F1-C connection, and the migrating IAB-node adds the second TNL address for the first F1-C connection.

49. The method according to supplement 48, wherein the first RRC reconfiguration message further includes at least one of the following:

a BAP address allocated to the migrating IAB-node;

backhaul RLC channel configuration of the migrating IAB-node;

a BAP routing identifier and backhaul RLC channel identifier used for the second F1-C connection;

a sixth TNL address added for the F1-U connection of the migrating IAB-node; and a BAP routing identifier and backhaul RLC channel identifier used for the F1-U connection of the migrating IAB-node;

wherein the sixth TNL address is a TNL address routable to the DU of the second donor device.

50. The method according to supplement 33, wherein in a case where the migrating IAB-node maintains connection with the first donor device and adds an air interface connection with the second donor device, the migrating IAB-node receives the first RRC reconfiguration message, wherein the first RRC reconfiguration message includes secondary cell group (SCG) configuration information and a fourth TNL address or a third TNL address used for the second F1-C connection, and the migrating IAB-node sets up the second F1-C connection with the CU of the second donor device by using the fourth TNL address or the third TNL address;

or, the first RRC reconfiguration message includes secondary cell group (SCG) configuration information and a second TNL address used for the first F1-C connection, and the migrating IAB-node adds the second TNL address for the first F1-C connection.

51. The method according to supplement 50, wherein the first RRC reconfiguration message further includes at least one of the following:

a BAP address allocated to the migrating IAB-node;

backhaul RLC channel configuration of the migrating IAB-node;

a BAP routing identifier and backhaul RLC channel identifier used for the second F1-C connection;

a sixth TNL address added for the F1-U connection of the migrating IAB-node; and a BAP routing identifier and backhaul RLC channel identifier used for the F1-U connection of the migrating IAB-node;

wherein the sixth TNL address is a TNL address routable to the DU of the second donor device.

52. The method according to supplement 50, wherein if the first RRC reconfiguration message does not include the fourth TNL address used for the second F1-C connection, after the migrating IAB-node adds the air-interface connection with the second donor device, the method further comprises:

receiving by the migrating IAB-node, a third RRC reconfiguration message transmitted by the second donor device, the third RRC reconfiguration message including a fourth TNL address used for the second F1-C connection; and setting up the second F1-C connection with the CU of the second donor device by the migrating IAB-node by using the fourth TNL address.

52a. The method according to supplement 50 or 52, wherein the method further comprises:

receiving a second RRC reconfiguration message for the UE served by the migrating IAB-node forwarded by the first donor device via the first F1-C connection by using the first TNL address or the second TNL address, and transmitting the second RRC reconfiguration message to the UE served by the migrating IAB-node, by the migrating IAB-node; and receiving a second RRC reconfiguration complete message transmitted by the UE served by the migrating IAB-node, and transmitting the second RRC reconfiguration complete message to the second donor device via the second F1-C connection by using the third TNL address or the fourth TNL address, by the migrating IAB-node.

53. The method according to supplement 33, wherein in a case where the migrating IAB-node maintains connection with the first donor device and adds an air interface connection with the second donor device, the migrating IAB-node receives the first RRC reconfiguration message, wherein the first RRC reconfiguration message includes secondary cell group (SCG) configuration information and a fourth TNL address used for the second F1-C connection, and the migrating IAB-node adds the fourth TNL address for the second F1-C connection;

or, the first RRC reconfiguration message includes secondary cell group (SCG) configuration information, a fourth TNL address used for the second F1-C connection and a second TNL address used for the first F1-C connection, and the migrating IAB-node adds the fourth TNL address for the second F1-C connection and adds the second TNL address for the first F1-C connection.

54. The method according to supplement 53, wherein the first RRC reconfiguration message further includes at least one of the following:

a BAP address allocated to the migrating IAB-node;

backhaul RLC channel configuration of the migrating IAB-node;

a BAP routing identifier and backhaul RLC channel identifier used for the second F1-C connection;

a sixth TNL address added for the F1-U connection of the migrating IAB-node; and a BAP routing identifier and backhaul RLC channel identifier used for the F1-U connection of the migrating IAB-node;

wherein the sixth TNL address is a TNL address routable to the DU of the second donor device.

55. The method according to supplement 53, wherein before the migrating IAB-node receives the first RRC reconfiguration message, the method further comprises:

receiving by the migrating IAB-node, a third RRC reconfiguration message transmitted by the first donor device, the third RRC reconfiguration message including a third TNL address used for the second F1-C connection; and setting up the second F1-C connection with the CU of the second donor device by the migrating IAB-node by using the third TNL address.

56. The method according to supplement 53, wherein the method further comprises:

receiving by the migrating IAB-node a second RRC reconfiguration message for the UE served by the migrating IAB-node forwarded by the first donor device via the first F1-C connection by using the first TNL address, and transmitting the second RRC reconfiguration message to the UE served by the migrating IAB-node, by the migrating IAB-node; and receiving a second RRC reconfiguration complete message transmitted by the UE served by the migrating IAB-node, and transmitting the second RRC reconfiguration complete message to the second donor device via the second F1-C connection by using the third TNL address or the fourth TNL address, by the migrating IAB-node.

57. A group migrating method, applicable to a first donor device, wherein a migrating IAB-node moves from the first donor device to a second donor device, and the method comprises:

receiving a second TNL address used for a first F1-C connection of the migrating IAB-node transmitted by the second donor device; and updating a first TNL address used for the first F1-C connection of the migrating IAB-node to the second TNL address, or adding the second TNL address for the first F1-C connection of the migrating IAB-node;

wherein the first F1-C connection is F1 connection between a DU of the migrating IAB-node and a CU of the first donor device, the first TNL address is a TNL address routable to the DU of the first donor device, and the second TNL address is a TNL address routable to the DU of the second donor device.

57a. The method according to supplement 57, wherein that the migrating IAB-node moves from the first donor to the second donor device refers to one of the following:

that the migrating IAB-node is connection reestablished to the second donor device when a radio link failure occurs in a backhaul link of the migrating IAB-node under the first donor device;

that the migrating IAB-node is handed over from the first donor device to the second donor device; and that the migrating IAB-node maintains connection with the first donor device and adds an air interface connection with the second donor device.

58. The method according to supplement 57a, wherein the method further comprises:

receiving a sixth TNL address used for the F1-U connection of the migrating IAB-node transmitted by the second donor device; and updating a fifth TNL address used for the F1-U connection of the migrating IAB-node to the sixth TNL address, or adding the sixth TNL address for the F1-U connection of the migrating IAB-node, by the first donor device;

wherein the fifth TNL address is a TNL address routable to the DU of the first donor device, and the sixth TNL address is a TNL address routable to the DU of the second donor device.

59. The method according to supplement 58, wherein the method further comprises:

transmitting a second message by the first donor device to the migrating IAB-node via the first F1-C connection by using the first TNL address, the second message including a sixth TNL address used for the F1-U connection of the migrating IAB-node and/or a BAP routing identifier and backhaul RLC channel identifier used for the F1-U connection of the migrating IAB-node.

60. The method according to supplement 57a, wherein the method further comprises:

receiving by the first donor device, a second RRC reconfiguration message for the UE served by the migrating IAB-node transmitted by the second donor device, and transmitting the second RRC reconfiguration message by the first donor device to the migrating IAB-node via the first F1-C connection by using the second TNL address, so that the migrating IAB-node forwards the second RRC reconfiguration message to its served UE.

61. The method according to supplement 57a, wherein in a case where the migrating IAB-node is handed over from the first donor device to the second donor device, before the first TNL address used for the first F1-C connection of the migrating IAB-node is updated to the second TNL address, the method further comprises:

receiving by the first donor device, the second RRC reconfiguration message for the UE served by the migrating IAB-node transmitted by the second donor device; and transmitting the second RRC reconfiguration message to the migrating IAB-node via the first F1-C connection by using the first TNL address, so that the migrating IAB-node forwards the second RRC reconfiguration message to its served UE.

62. A group migrating method, applicable to a first donor device, wherein a migrating IAB-node moves from the first donor device to a second donor device, and the method comprises:

transmitting by the first donor device, a third TNL address used for setting up a second F1-C connection by the migrating IAB-node, to the second donor device, wherein the second F1-C connection is F1 connection between the DU of the IAB-node and the CU of the second donor device, and the third TNL address is a TNL address routable to the DU of the first donor device.

63. The method according to supplement 62, wherein that the migrating IAB-node moves from the first donor device to the second donor device refers to one of the following:

that the migrating IAB-node is handed over from the first donor device to the second donor device; and that the migrating IAB-node maintains connection with the first donor device and adds an air interface connection with the second donor device.

64. The method according to supplement 62, wherein the method further comprises:

receiving a second TNL address used for the first F1-C connection of the migrating IAB-node transmitted by the second donor, and adding the second TNL address for the first F1-C connection of the migrating IAB-node, by the first donor device, wherein the second TNL address is a TNL address routable to the DU of the second donor device, and the first F1-C connection is F1 connection between the DU of the IAB-node and the CU of the first donor device.

65. The method according to supplement 64, wherein the method further comprises:

receiving by the first donor device, a sixth TNL address used for an F1-U connection of the migrating IAB-node transmitted by the second donor device; and updating a fifth TNL address used for the F1-U connection of the migrating IAB-node to the sixth TNL address or adding the sixth TNL address for the F1-U connection of the migrating IAB-node, by the first donor device, wherein the fifth TNL address is a TNL address routable to the DU of the second donor device, and the sixth TNL address is a TNL address routable to the DU of the second donor device.

66. The method according to supplement 62, wherein the method further comprises:

transmitting a third RRC reconfiguration message by the first donor device to the migrating IAB-node, wherein the third RRC reconfiguration message includes the third TNL address, so that the migrating IAB-node sets up the second F1-C connection with the CU of the second donor device.

67. The method according to supplement 66, wherein the method further comprises:

receiving by the first donor device, a second RRC reconfiguration message for the UE served by the migrating IAB-node transmitted by the second donor device; and transmitting the second RRC reconfiguration message to the migrating IAB-node by the first donor device via the first F1-C connection by using a first TNL address or a second TNL address, so that the migrating IAB-node forwards the second RRC reconfiguration message to its served UE;

wherein the first TNL address is a TNL address routable to the DU of the first donor device, and the second TNL address is a TNL address routable to the DU of the second donor device.

68. The method according to supplement 66, wherein the migrating IAB-node maintains the connection with the first donor device and adds an air-interface connection with the second donor device, and the method further comprises:

transmitting a second message by the first donor device to the migrating IAB-node via the first F1-C connection by using the first TNL address or by using the second TNL address, the second message including at least one of the following:

a sixth TNL address used for the F1-U connection; and a BAP routing identifier and a backhaul RLC channel identifier used for the F1-U connection.

69. A donor device, comprising a memory and a processor, the memory storing a computer program, wherein the processor is configured to execute the computer program to carry out the method as described in any one of supplements 1-31 and 57-68.

70. An IAB-node, comprising a memory and a processor, the memory storing a computer program, wherein the processor is configured to execute the computer program to carry out the method as described in any one of supplements 32-56.

71. A communication system, comprising a donor device, an IAB-node and a terminal equipment, wherein the donor device is configured to carry out the method as described in any one of supplements 1-31 and 57-68, and the IAB-node is configured to carry out the method as described in any one of supplements 32-56.

What is claimed is:

1. A group migrating apparatus, configured in a second donor device, wherein the apparatus comprises:

processor circuitry configured to, when an IAB-node moves from a first donor device to the second donor device, perform at least one of the following processing:

enabling the IAB-node to update a first TNL address used for a first F1-C connection to a second TNL address;

enabling the IAB-node to update a third TNL address used for a second F1-C connection to a fourth TNL address;

configuring the IAB-node with a fourth TNL address used for setting up a second F1-C connection;

adding for the IAB-node a second TNL address used for a first F1-C connection;

configuring the IAB-node with a third TNL address used for setting up a second F1-C connection; and adding for the IAB-node a fourth TNL address used for a second F1-C connection;

wherein the first F1-C connection is F1 connection between a DU of the IAB-node and a CU of the first donor device, the second F1-C connection is F1 connection between the DU of the IAB-node and a CU of the second donor device, the first TNL address and the third TNL address are TNL addresses routable to the DU of the first donor device, and the second TNL address and the fourth TNL address are TNL addresses routable to the DU of the second donor device;

wherein that the IAB-node moves from the first donor device to the second donor device refers to one of the following:

that the IAB-node is connection reestablished to the second donor device when a radio link failure occurs in a backhaul link of the IAB-node under the first donor device;

that the IAB-node is handed over from the first donor device to the second donor device; and that the IAB-node maintains connection with the first donor device and adds an air interface connection with the second donor device;

wherein in a case where the IAB-node maintains connection with the first donor device and adds an air interface connection with the second donor device, the receiver receives a first RRC reconfiguration message; and wherein the first RRC reconfiguration message includes secondary cell group (SCG) configuration information and the second TNL address used for the first F1-C connection, and the IAB-node adds the second TNL address for the first F1-C connection.

2. The apparatus according to claim 1, wherein when the radio link failure occurs in the backhaul link of the IAB-node under the first donor device, the processor circuitry performs the following processing:

enabling the IAB-node to update the first TNL address used for the first F1-C connection to the second TNL address; and configuring the IAB-node with the fourth TNL address used for setting up the second F1-C connection.

3. The apparatus according to claim 1, wherein, after the IAB-node is connection reestablished to the second donor device, the processor circuitry transmits a first RRC reconfiguration message to the IAB-node, the first RRC reconfiguration message containing the second TNL address used for the first F1-C connection, or the first RRC reconfiguration message containing the second TNL address used for the first F1-C connection and the fourth TNL address used for the second F1-C connection.

4. The apparatus according to claim 3, wherein after the second F1-C connection is setup between the second donor device and the IAB-node, the processor circuitry transmits a first message to the DU of the IAB-node at the CU of the second donor device via the second F1-C connection by using the fourth TNL address, so that the IAB-node sets up a second context for its served UE;

wherein the first message includes a first context identifier of the UE, so that the IAB-node obtains a first context of the UE according to the first context identifier and sets up the second context by reusing the first context.

5. A group migrating apparatus, configured in a IAB-node, the IAB-node moving from a first donor device to a second donor device, wherein the apparatus comprises:

a receiver configured to receive, from the first donor device, a first message, the first message including at least one of the following:

a second TNL address used for a first F1-C connection, so as to update a first TNL address used for the first F1-C connection to the second TNL address, or to add the second TNL address for the first F1-C connection;

a fourth TNL address used for the second F1-C connection, so as to update a third TNL address used for the second F1-C connection to the fourth TNL address, or to set up the second F1-C connection with a CU of the second donor device by using the fourth TNL address, or to add the fourth TNL address for the second F1-C connection; and a third TNL address used for the second F1-C connection, so as to add the third TNL address for the second F1-C connection, or to set up the second F1-C connection with the CU of the second donor device by using the third TNL address;

wherein the first F1-C connection is F1 connection between a DU of the IAB-node and a CU of the first donor device, the second F1-C connection is F1 connection between the DU of the IAB-node and the CU of the second donor device, the first TNL address and the third TNL address are TNL addresses routable to the first donor device, and the second TNL address and the fourth TNL address are TNL addresses routable to the second donor device;

wherein the apparatus further comprises: first setting processor circuitry and second setting processor circuitry, the first setting processor circuitry setting up the second F1-C connection with the second donor device, the receiver receiving a second message transmitted by the CU of the second donor device via the second F1-C connection by using the fourth TNL address, and the second setting processor circuitry setting up a second context for a UE served by the IAB-node according to the second message; and wherein the second message includes a first context identifier of the UE, and the IAB-node obtains a first context of the UE according to the first context identifier and sets up the second context by reusing the first context.

6. The apparatus according to claim 5, wherein that the IAB-node moves from the first donor device to the second donor device refers to one of the following:

that the IAB-node is connection reestablished to the second donor device when a radio link failure occurs in a backhaul link of the IAB-node under the first donor device;

that the IAB-node is handed over from the first donor device to the second donor device; and that the IAB-node maintains connection with the first donor device and adds an interface connection with the second donor device.

7. The apparatus according to claim 6, wherein the apparatus further comprises processor circuitry, after the IAB-node is connection reestablished to the second donor device, the receiver receives the first message;

and the first message includes the second TNL address used for the first F1-C connection, and the processor circuitry updates the first TNL address used for the first F1-C connection to the second TNL address;

or, the first message includes the second TNL address used for the first F1-C connection and a fourth TNL address used for the second F1-C connection, and the processor circuitry updates the first TNL address used for the F1-C connection to the second TNL address and sets up the second F1-C connection with the CU of the second donor device by using the fourth TNL address.

8. The apparatus according to claim 6, wherein the apparatus further comprises: first setting processor circuitry and processor circuitry, and in a case where the IAB-node is handed over from the first donor device to the second donor device, the receiver receives the first message;

the first message includes a handover command and the fourth TNL address used for the second F1-C connection, and the first setting processor circuitry sets up the second F1-C connection with the CU of the second donor device by using the fourth TNL address;

or, the first message includes a handover command and the second TNL address used for the first F1-C connection, and the processor circuitry updates the first TNL address used for the first F1-C connection to the second TNL address.

9. The apparatus according to claim 7, wherein the first message further includes at least one of the following:

a BAP address allocated to the IAB-node;

backhaul RLC channel configuration of the IAB-node, and a default BAP routing identifier and default backhaul RLC channel identifier used for F1-C traffic and non-F1 traffic;

a sixth TNL address used by the IAB-node to update a fifth TNL address used for its F1-U connection to the sixth TNL address; and a BAP routing identifier and a backhaul RLC channel identifier used for F1-U connection;

wherein the fifth TNL address is a TNL address routable to a DU of the first donor device, and the sixth TNL address is a TNL address routable to a DU of the second donor device.

10. The apparatus according to claim 7, wherein the apparatus further comprises processor circuitry, and in a case where the IAB-node is handed over from the first donor device to the second donor device, the receiver receives the first message, the first message including a handover command and the fourth TNL address used for the second F1-C connection, and the processor circuitry updates the third TNL address used for the second F1-C connection to the fourth TNL address.

11. The apparatus according to claim 7, wherein in a case where the IAB-node maintains connection with the first donor device and adds an air interface connection with the second donor device, the receiver receives the first message;

wherein the first message includes secondary cell group (SCG) configuration information and a fourth TNL address or a third TNL address used for the second F1-C connection, and the apparatus further comprises first setting processor circuitry, the first setting processor circuitry setting up the second F1-C connection with the CU of the second donor device by using the fourth TNL address or the third TNL address;

or, the first message includes secondary cell group (SCG) configuration information and the second TNL address used for the first F1-C connection, and the apparatus further comprises processor circuitry, the processor circuitry adding the second TNL address for the first F1-C connection.

12. The apparatus according to claim 11, wherein if the first message does not include the fourth TNL address used for the second F1-C connection, after the processor circuitry adds the air interface connection with the second donor device, the receiver receives a third message transmitted by the second donor device, wherein the third message includes the fourth TNL address used for the second F1-C connection;

and the first setting processor circuitry sets up the second F1-C connection with the CU of the second donor device by using the fourth TNL address.

13. The apparatus according to claim 7, wherein in a case where the IAB-node maintains connection with the first donor device and adds an air interface connection with the second donor device, the receiver receives the first message;

wherein the first message includes secondary cell group (SCG) configuration information and a fourth TNL address used for the second F1-C connection, and the apparatus further comprises processor circuitry, the processor circuitry adding the fourth TNL address for the second F1-C connection;

or, the first message includes secondary cell group (SCG) configuration information, the fourth TNL address used for the second F1-C connection and the second TNL address used for the first F1-C connection, and the apparatus further comprises processor circuitry, the processor circuitry adding the fourth TNL address for the second F1-C connection and adding the second TNL address for the first F1-C connection.

14. The apparatus according to claim 5, wherein the apparatus further comprises a transmitter, the receiver receives a RRC reconfiguration message for a UE served by the IAB-node forwarded by the first donor device via the first F1-C connection by using the second TNL address or by using the first TNL address, and the transmitter transmits the RRC reconfiguration message to the UE served by the IAB-node;

and the receiver receives a RRC reconfiguration complete message transmitted by the UE served by the IAB-node, and the transmitter transmits the RRC reconfiguration complete message to the second donor device via the second F1-C connection by using the fourth TNL address.

15. The apparatus according to claim 5, wherein the apparatus further comprises a transmitter, the receiver receives a RRC reconfiguration message for the UE served by the IAB-node forwarded by the first donor device via the first F1-C connection by using the first TNL address, and the transmitter transmits the RRC reconfiguration message to the UE served by the IAB-node;

and the receiver receives a RRC reconfiguration complete message transmitted by the UE served by the IAB-node, and the transmitter transmits the RRC reconfiguration complete message to the second donor device via the second F1-C connection by using the third TNL address or the fourth TNL address.

16. A group migrating apparatus, configured in a first donor device, an IAB-node moving from the first donor device to a second donor device, wherein the apparatus comprises:

a receiver configured to receive a second TNL address used for a first F1-C connection of the IAB-node transmitted by the second donor device; and processor circuitry configured to update a first TNL address used for the first F1-C connection of the IAB-node to the second TNL address, or add the second TNL address for the first F1-C connection of the IAB-node;

wherein the first F1-C connection is F1 connection between a DU of the IAB-node and a CU of the first donor device, the first TNL address is a TNL address routable to the DU of the first donor device, and the second TNL address is a TNL address routable to the DU of the second donor device;

wherein that the IAB-node moves from the first donor device to the second donor device refers to one of the following:

that the IAB-node is connection reestablished to the second donor device when a radio link failure occurs in a backhaul link of the IAB-node under the first donor device;

that the IAB-node is handed over from the first donor device to the second donor device; and that the IAB-node maintains connection with the first donor device and adds an air interface connection with the second donor device;

wherein in a case where the IAB-node maintains connection with the first donor device and adds an air interface connection with the second donor device, the receiver receives a first RRC reconfiguration message; and wherein the first RRC reconfiguration message includes secondary cell group (SCG) configuration information and the second TNL address used for the first F1-C connection, and the IAB-node adds the second TNL address for the first F1-C connection.

* * * * *